US012743040B2

(12) United States Patent
Hirayama et al.

(10) Patent No.: US 12,743,040 B2
(45) Date of Patent: Sep. 22, 2026

(54) TONER CARTRIDGE AND IMAGE FORMING APPARATUS

(71) Applicant: CANON KABUSHIKI KAISHA, Tokyo (JP)

(72) Inventors: Akinobu Hirayama, Shizuoka (JP); Teruhiko Sasaki, Shizuoka (JP); Tachio Kawai, Tokyo (JP); Daisuke Abe, Shizuoka (JP); Toshiki Fujino, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/177,770

(22) Filed: Apr. 14, 2025

(65) Prior Publication Data

US 2026/0147292 A1 May 28, 2026

Related U.S. Application Data

(63) Continuation of application No. PCT/JP2023/036454, filed on Oct. 2, 2023.

(30) Foreign Application Priority Data

Oct. 14, 2022 (JP) ................................ 2022-165826
Sep. 21, 2023 (JP) ................................ 2023-155615

(51) Int. Cl.
*G03G 15/08* (2006.01)
*G03G 21/16* (2006.01)

(52) U.S. Cl.
CPC ..... *G03G 15/0891* (2013.01); *G03G 15/0875* (2013.01); *G03G 15/0879* (2013.01);
(Continued)

(58) Field of Classification Search
CPC ........... G03G 15/0891; G03G 15/0875; G03G 15/0879; G03G 15/0886; G03G 21/1647;
(Continued)

(56) References Cited

U.S. PATENT DOCUMENTS 5,819,144 A * 10/1998 Okada ................ G03G 15/0875 399/258
10,203,628 B1 2/2019 Williamson
(Continued)

FOREIGN PATENT DOCUMENTS

JP 2011-053558 A 3/2011
JP 2013-246268 A 12/2013
(Continued)

OTHER PUBLICATIONS

International Search Report and Written Opinion for International Patent Application No. PCT/JP2023/036454.
(Continued)

*Primary Examiner* — Sandra Brase
(74) *Attorney, Agent, or Firm* — Venable LLP

(57) ABSTRACT

A toner cartridge includes a toner accommodating chamber, a toner discharge chamber, a communication passage, a discharge opening provided in the toner discharge chamber, a coupling for receiving a driving force from outside, a feeding member for conveying the toner in an axial direction of the coupling, and a first sheet and a second sheet which are provided in the toner discharge chamber and rotate about a rotation axis by a driving force received from the coupling to discharge toner through the discharge opening. The first sheet is configured to be flexed by contacting an inner wall of the toner discharge chamber and then be released from flexure, when making on full rotation about the rotation axis. The second sheet is configured to be displaceable relative to and contactable with the first sheet.

31 Claims, 48 Drawing Sheets

(52) U.S. Cl.
CPC ..... *G03G 15/0886* (2013.01); *G03G 21/1647* (2013.01); *G03G 2215/068* (2013.01); *G03G 2215/0827* (2013.01); *G03G 2221/163* (2013.01)

(58) Field of Classification Search
CPC ..... G03G 2215/068; G03G 2215/0827; G03G 2221/163
See application file for complete search history.

(56) References Cited

U.S. PATENT DOCUMENTS

| | | | | |
|---|---|---|---|---|
| 2011/0052268 | A1 | 3/2011 | Mano et al. | |
| 2012/0033999 | A1 | 2/2012 | Ichikawa | |
| 2013/0011164 | A1* | 1/2013 | Ohgoshi | G03G 15/0875 399/258 |
| 2013/0322929 | A1 | 12/2013 | Kobayashi | |
| 2022/0050404 | A1 | 2/2022 | Asanuma et al. | |
| 2023/0384711 | A1 | 11/2023 | Hirayama et al. | |

FOREIGN PATENT DOCUMENTS

| | | | |
|---|---|---|---|
| JP | 2013-246403 | A | 12/2013 |
| JP | 2021-185407 | A | 12/2021 |
| JP | 2022-142766 | A | 9/2022 |

OTHER PUBLICATIONS

Aug. 18, 2026 Extended Search Report in European Patent Application No. 23 877 232.1.

* cited by examiner (a)

(b)

(a)

(b)

(a)

(b)

(a)

(b)

(a)

(b)

(a)

(b)

(c)

(a)

(b)

(a)

(b)

(a)

(b)

TONER CARTRIDGE AND IMAGE FORMING APPARATUS

TECHNICAL FIELD

The present invention relates to an image forming apparatus for forming an image on a recording material, and a toner cartridge usable with the image forming apparatus.

BACKGROUND ART

In general, in an electrophotographic image forming apparatus, a toner cartridge containing toner is detachably mounted to the main assembly of the image forming apparatus in order to replenish the toner (developer) consumed with image forming operation.

A method has been proposed in which a pump is provided in the toner cartridge and the pump is used to replenish toner from the toner cartridge to the main assembly of the image forming apparatus (see JP 2021-185407 A). In addition, a toner cartridge has been proposed in which a sheet is mounted on a screw transporting the toner, and the sheet is used to supplementally discharge the toner from a discharge opening.

Furthermore, a toner cartridge has been proposed which includes a toner stirring member for stirring the toner in the toner accommodating container, and a toner feeding member for discharging the toner in the toner accommodating container to outside through a toner discharge opening (see JP 2011-53558 A). The toner feeding member has a rectangular discharge blade which is positioned facing the toner discharge opening.

SUMMARY OF THE INVENTION

Problem to be Solved by the Invention

The present invention provides a further development of the conventional structure.

Means for Solving the Problem

The present invention relates to a toner cartridge for supplying toner to outside, comprising: a toner accommodating chamber for accommodating toner; a toner discharge chamber having a smaller volume than the toner accommodating chamber; a communication passage for fluid communication between the toner accommodating chamber and the toner discharge chamber; a discharge opening which is provided in the toner discharge chamber and through which the toner is capable of discharging from the toner discharge chamber to the outside of the toner cartridge; a coupling for receiving a driving force from outside; a feeding member for feeding the toner from the toner accommodating chamber to the toner discharge chamber through the communication passage in an axial direction of the coupling; and a first sheet and a second sheet which are provided in the toner discharge chamber and rotatable about a rotation axis to discharge the toner to the outside of the toner cartridge through the discharge opening, wherein as viewed along the rotation axis with the toner cartridge in an orientation with the discharge opening facing downward, the rotation axis is closer to a central portion of the toner cartridge than the discharge opening in a horizontal direction, wherein the first sheet is configured to be flexed by contacting an inner wall of the toner discharge chamber and then be released from flexure, when the first sheet makes one full rotation about the rotation axis, and wherein the second sheet is configured to be displaceable relative to and contactable with the first sheet.

Effects of the Invention

According to the present invention, it is possible to develop the conventional technology.

Figure 5:
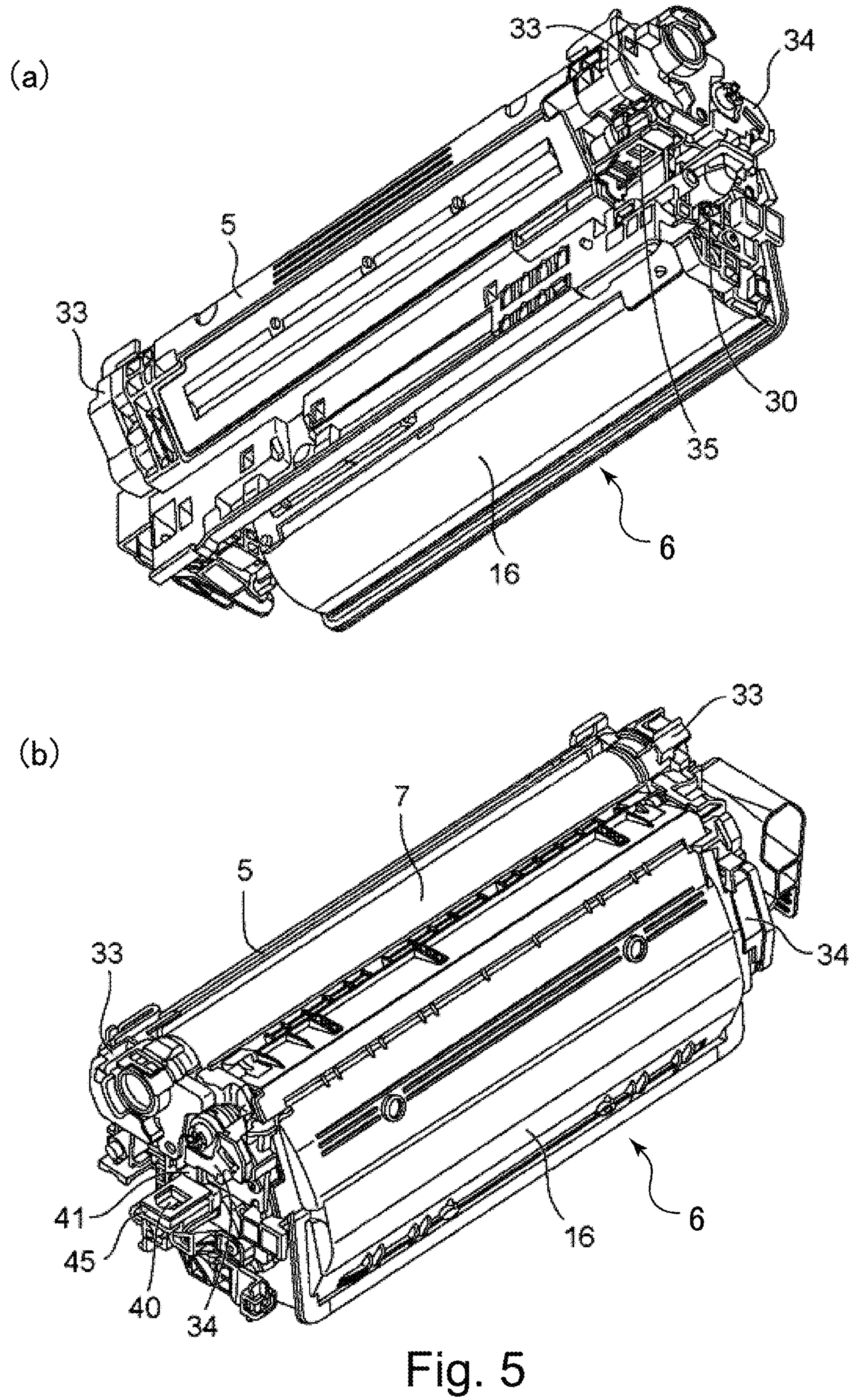

Part (a) of FIG. 5 is an overall perspective view of the process cartridge as viewed from a rear side, and part (b) of FIG. 5 is another overall perspective view of the process cartridge as viewed from the rear side.

Figure 6:
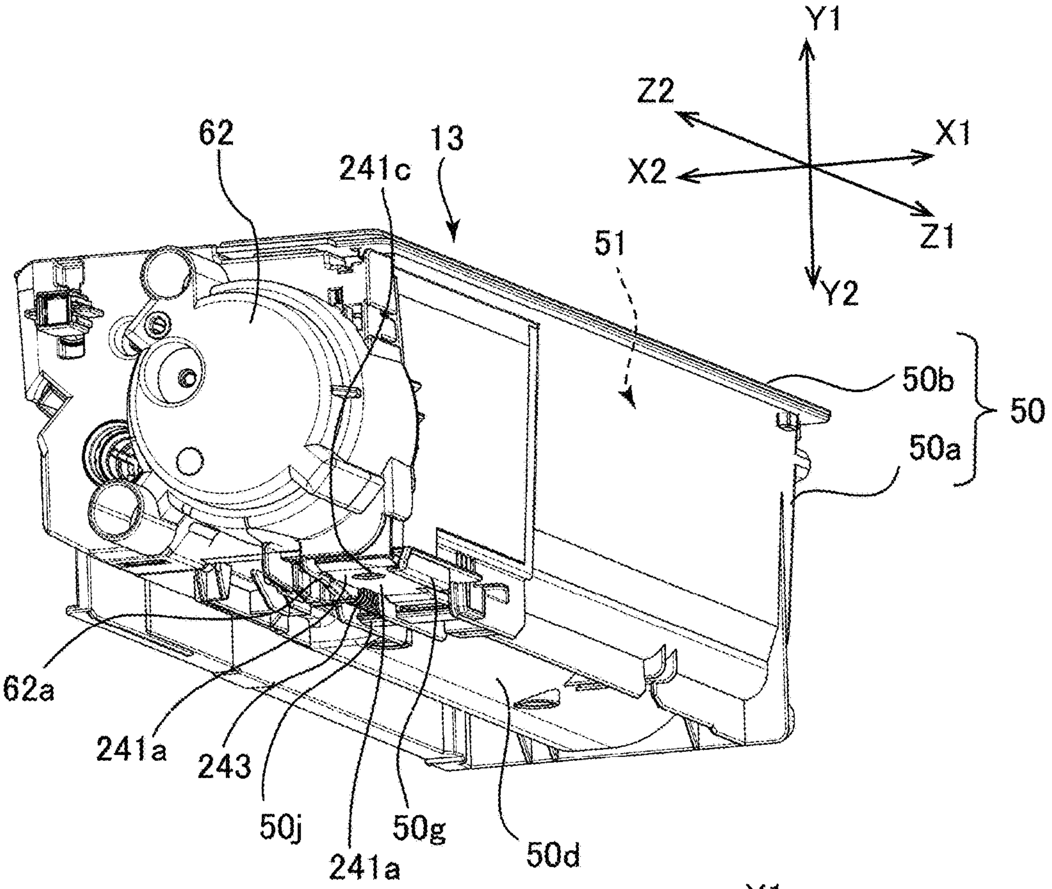
Figure 6:
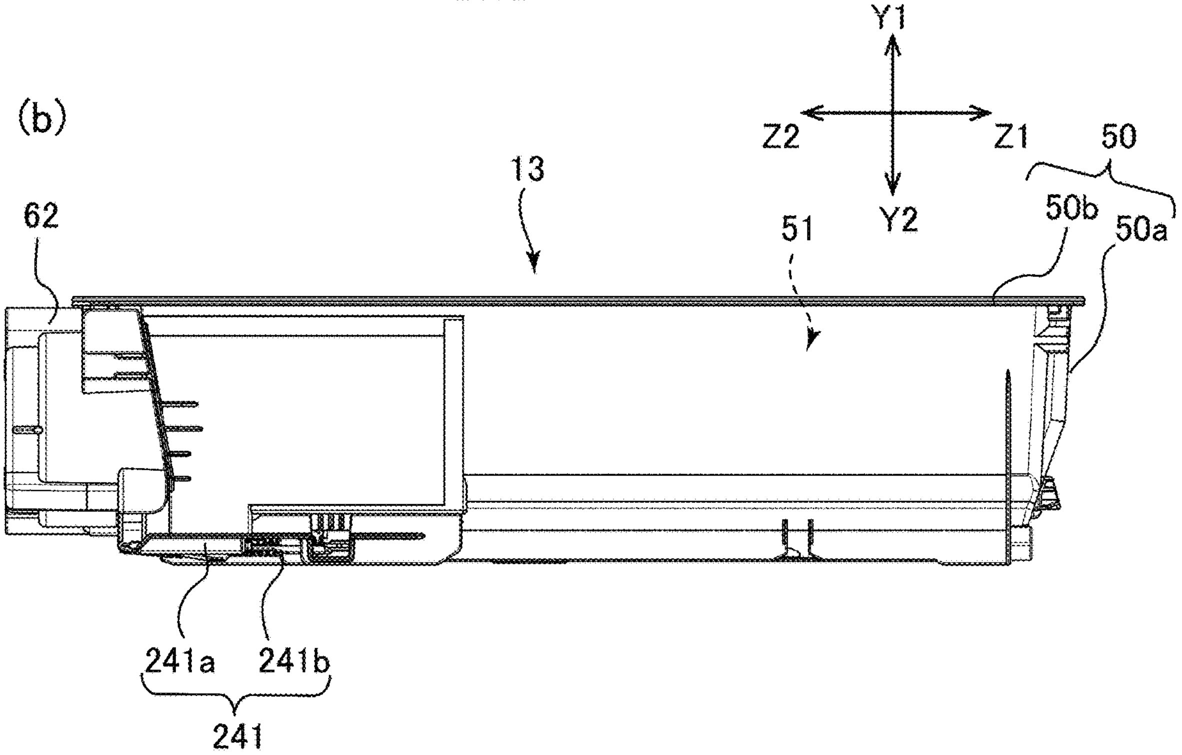

Part (a) of FIG. 6 is a perspective view of the toner cartridge, and part (b) of FIG. 6 is a front view of the toner cartridge.

Figure 7:
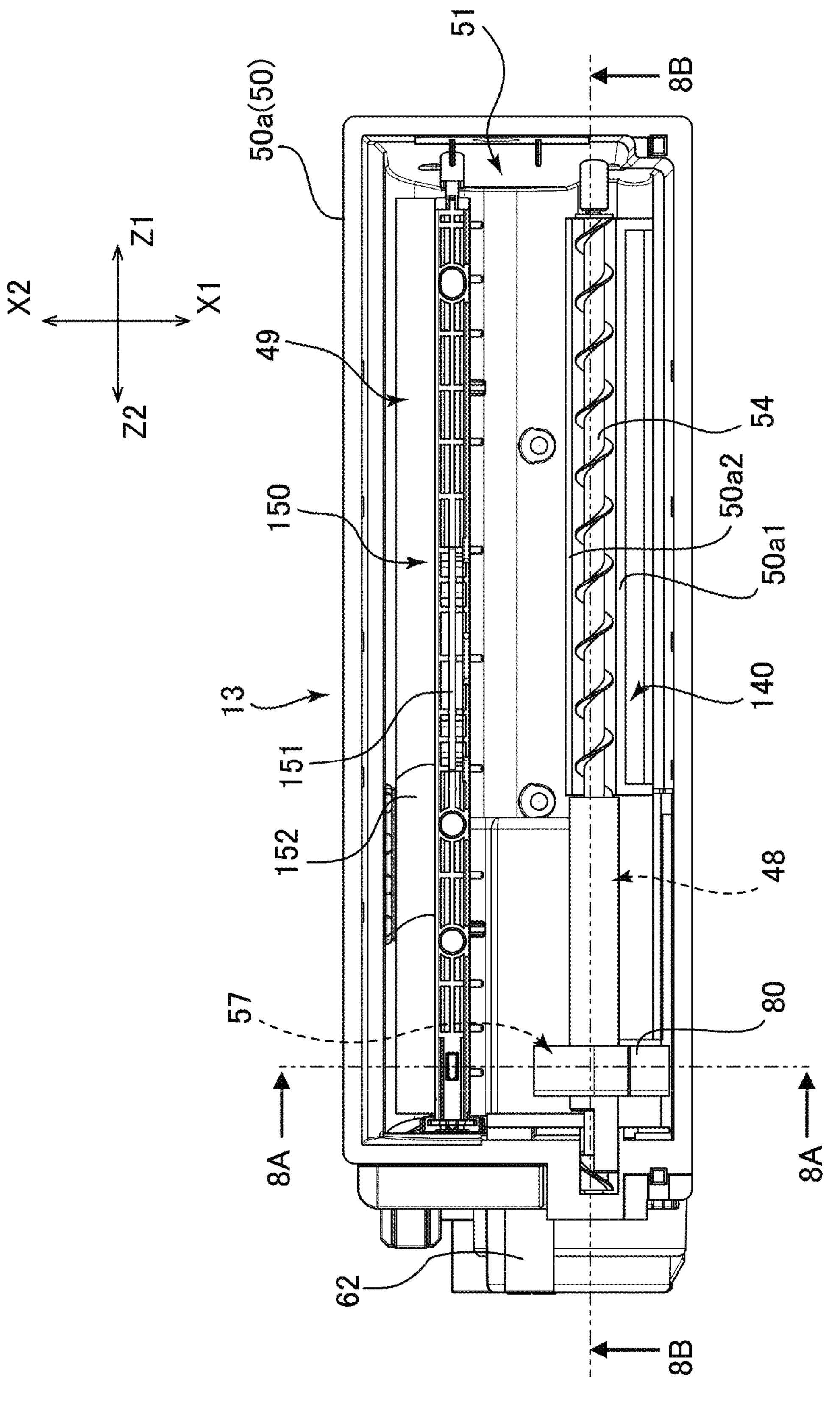

FIG. 7 is a plan view of the toner cartridge with a lid of the supply frame omitted.

Figure 8:
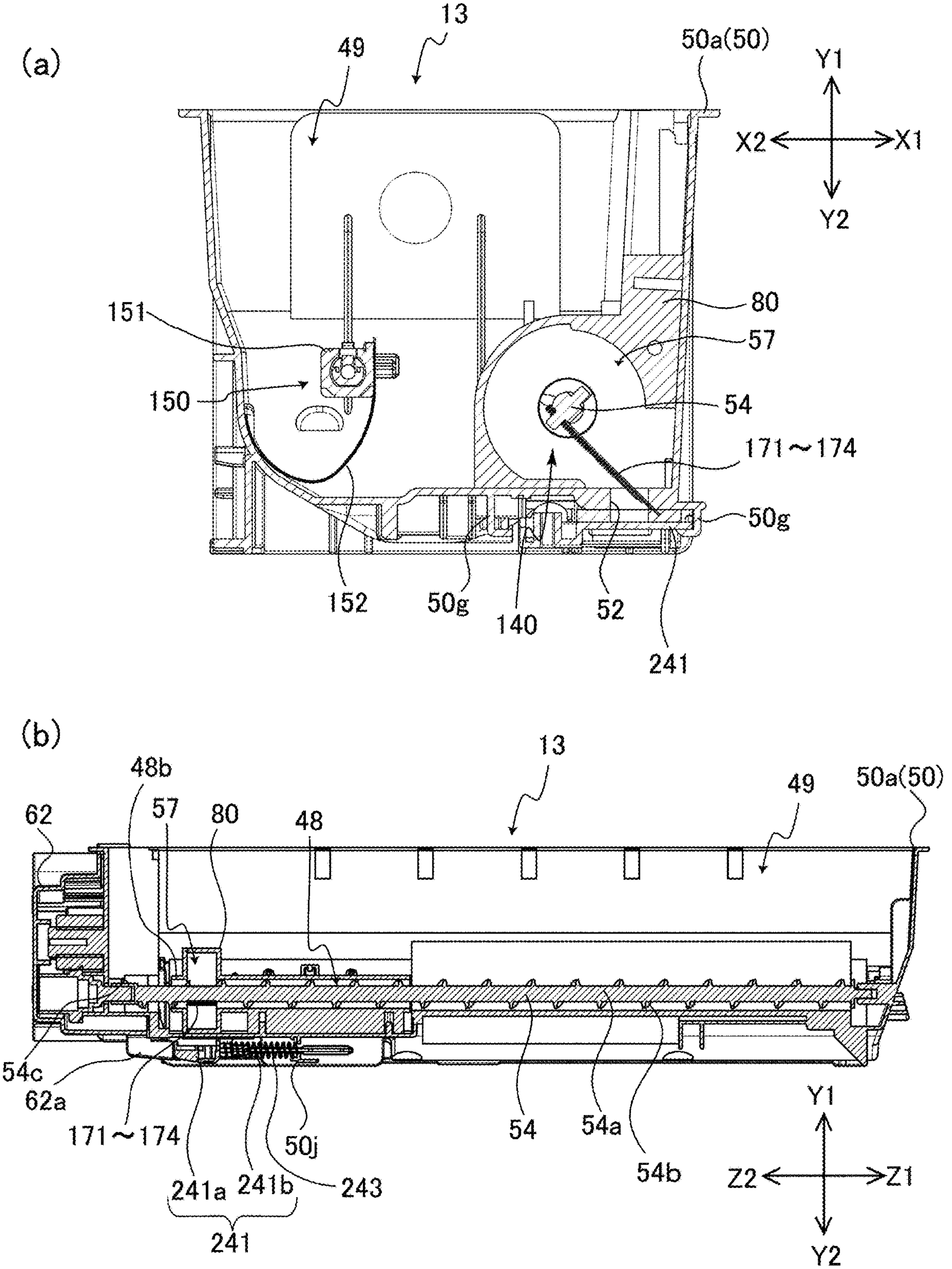

Part (a) of FIG. 8 is a cross-sectional view taken along a line 8A-8A indicated in FIG. 7, and part (b) of FIG. 8 is a sectional view taken along a line 8B-8B indicated in FIG. 7.

Figure 9:
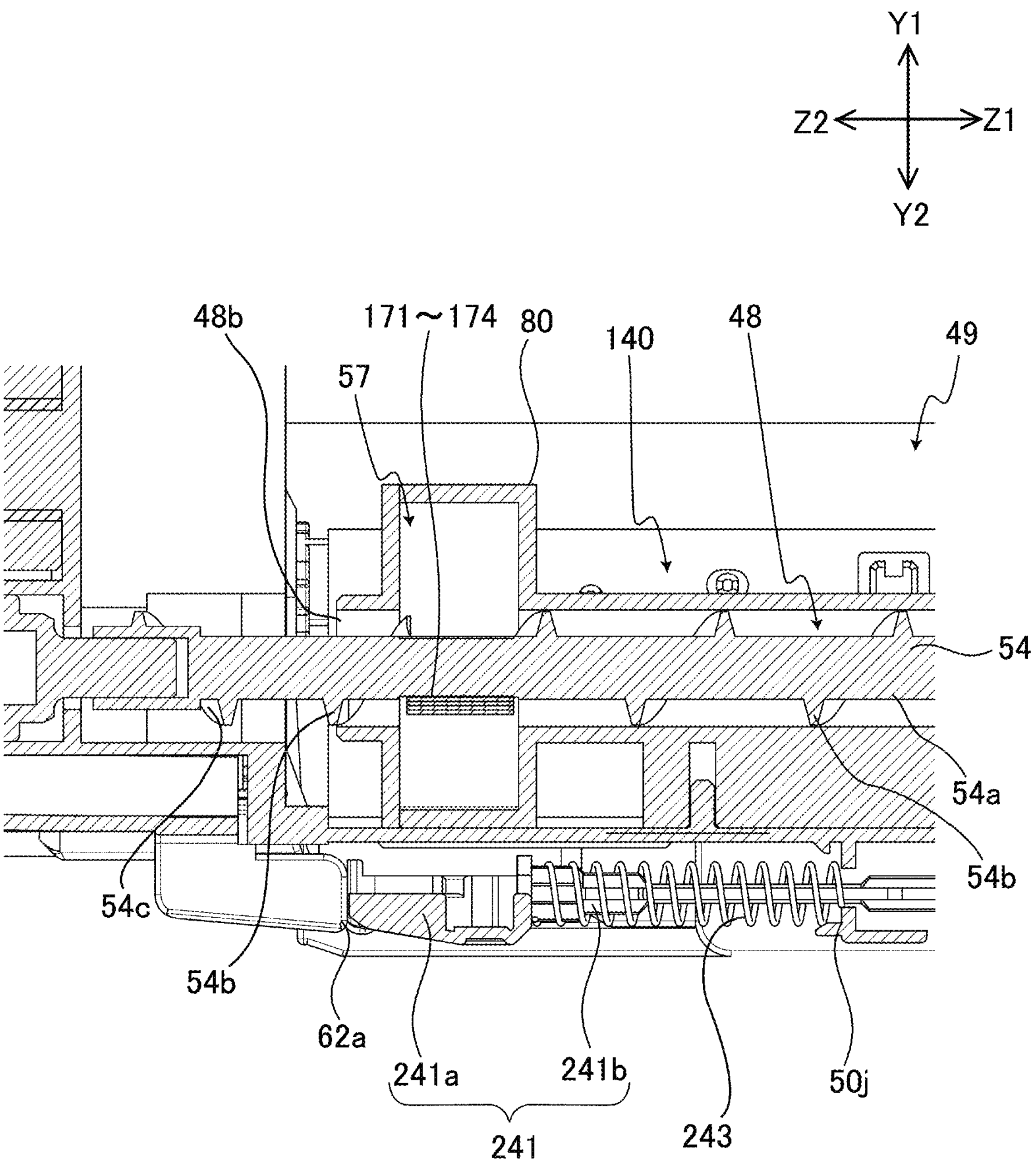

FIG. 9 is an enlarged view of part (b) of FIG. 8.

Figure 10:
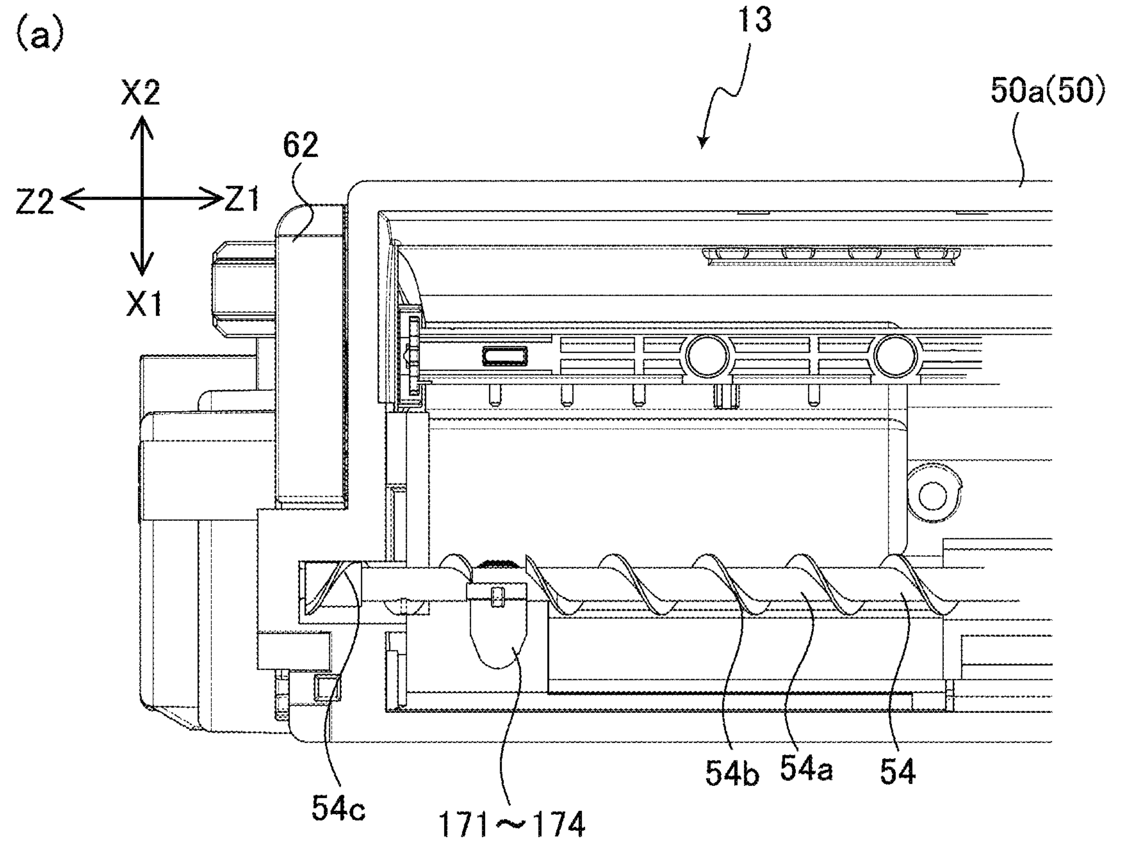
Figure 10:
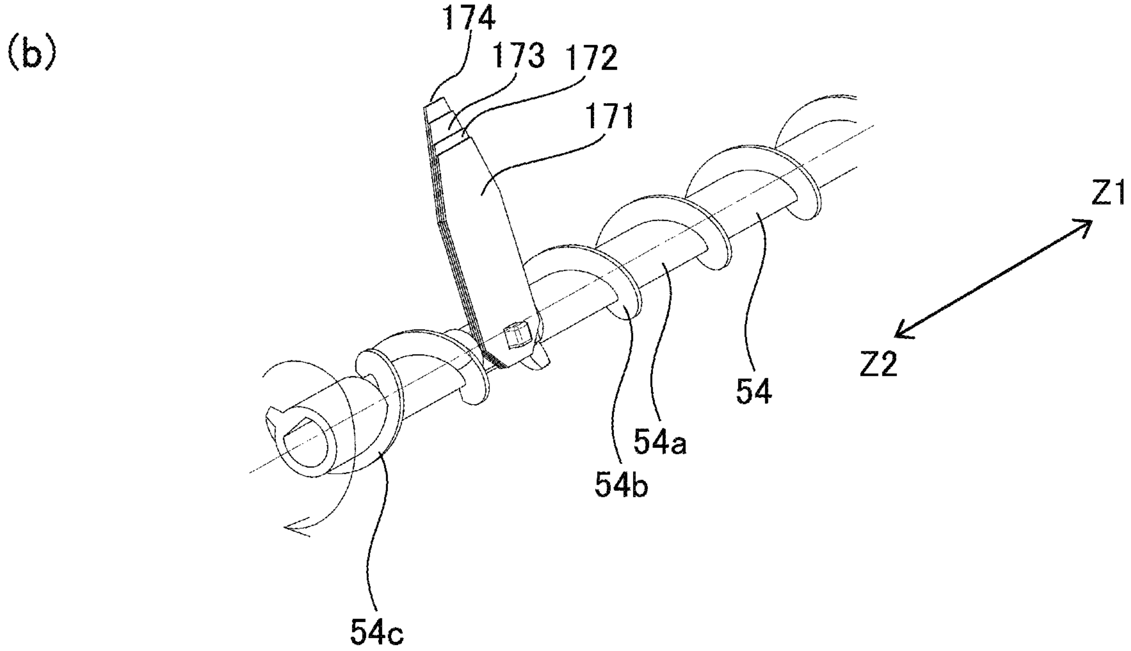

Part (a) of FIG. 10 is a plan view of the toner cartridge with the lid of the supply frame and a screw case omitted, and part (b) of FIG. 10 is a perspective view of the screw and the discharge sheet.

Figure 11:
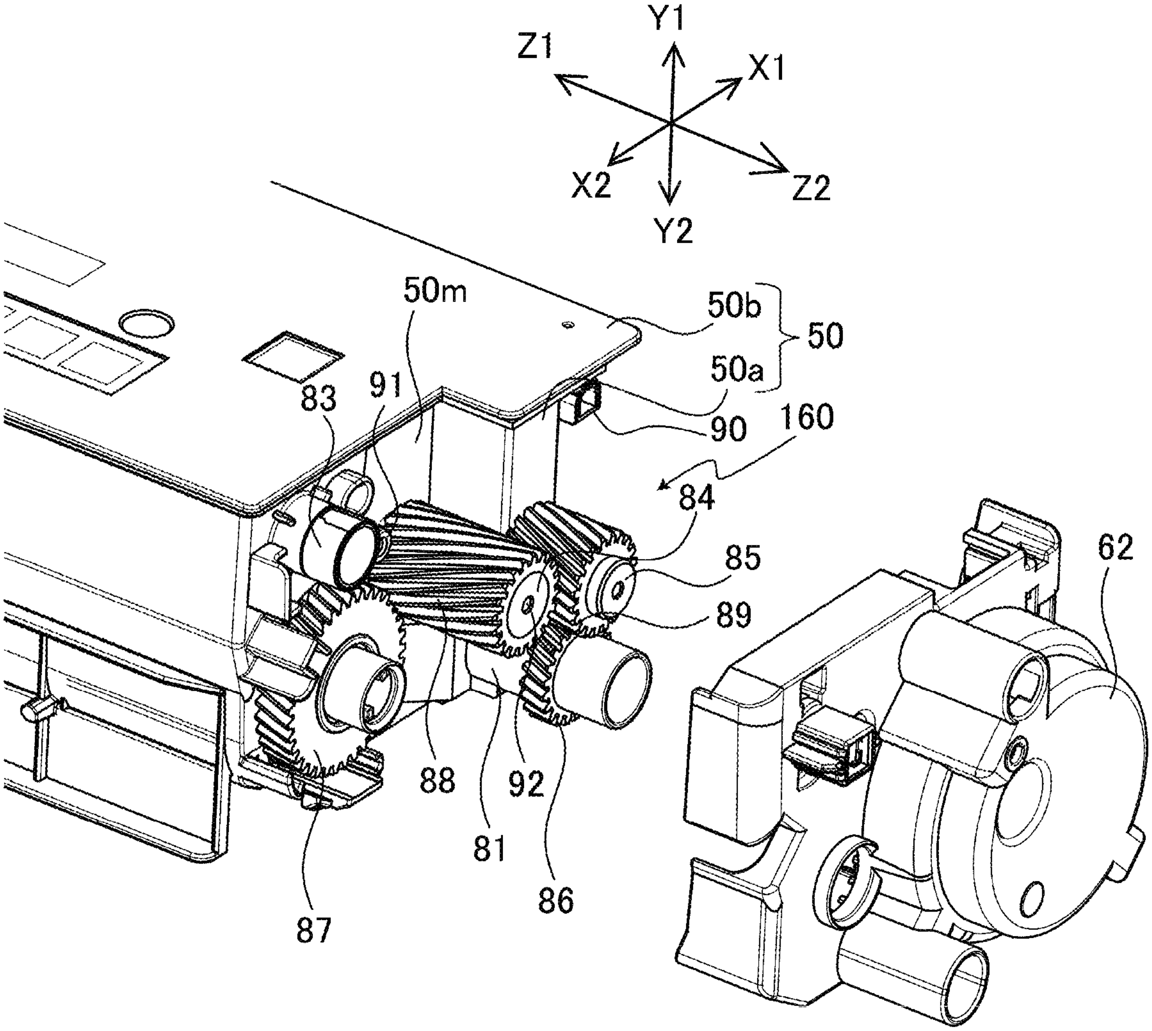

FIG. 11 is an exploded perspective view of the toner cartridge with the side cover omitted.

Figure 12:
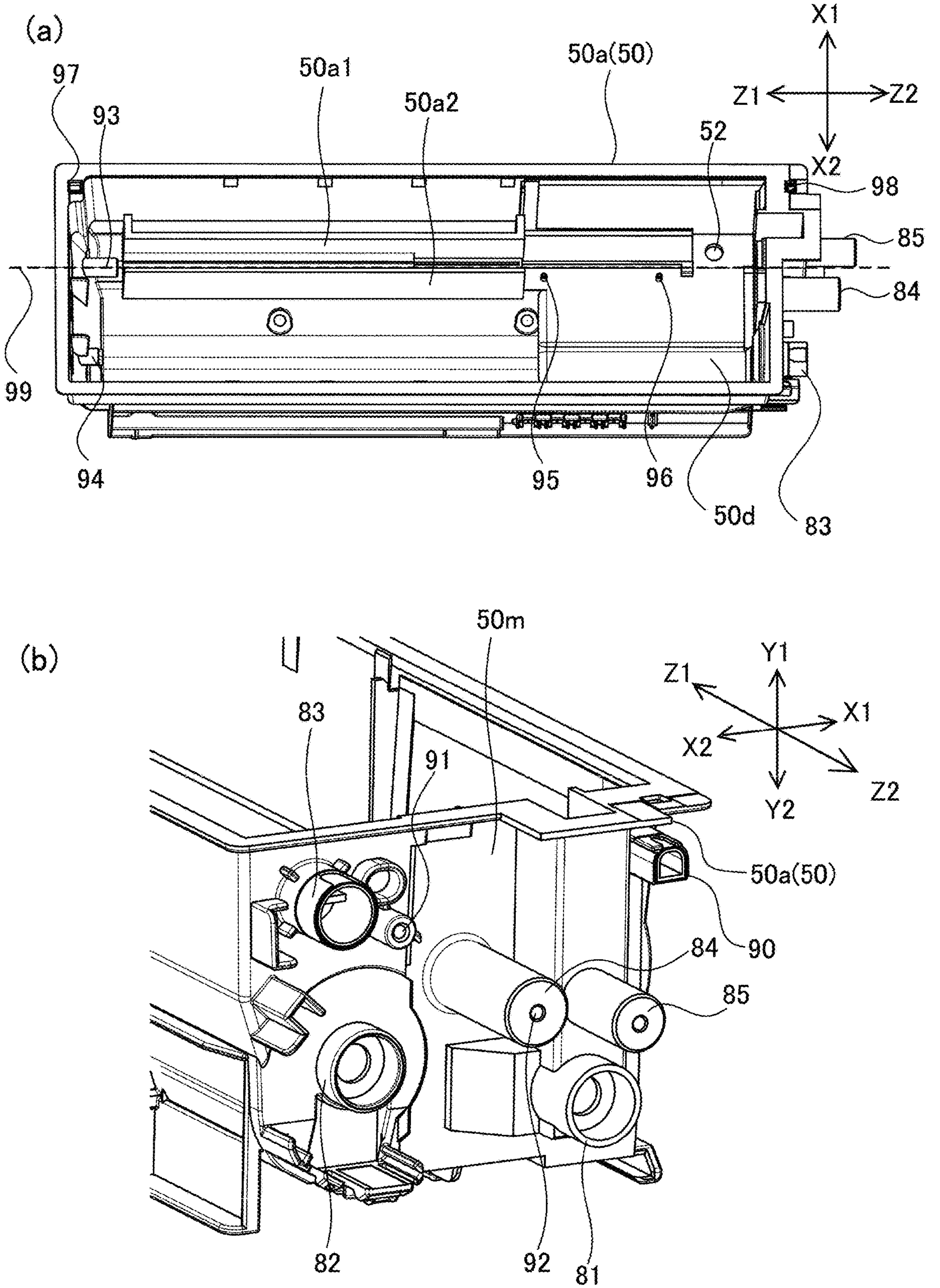

Part (a) of FIG. 12 is a perspective view of the container portion of the supply frame, and part (b) of FIG. 12 is a perspective view of a support structure for a drive train by the container portion.

Figure 13:
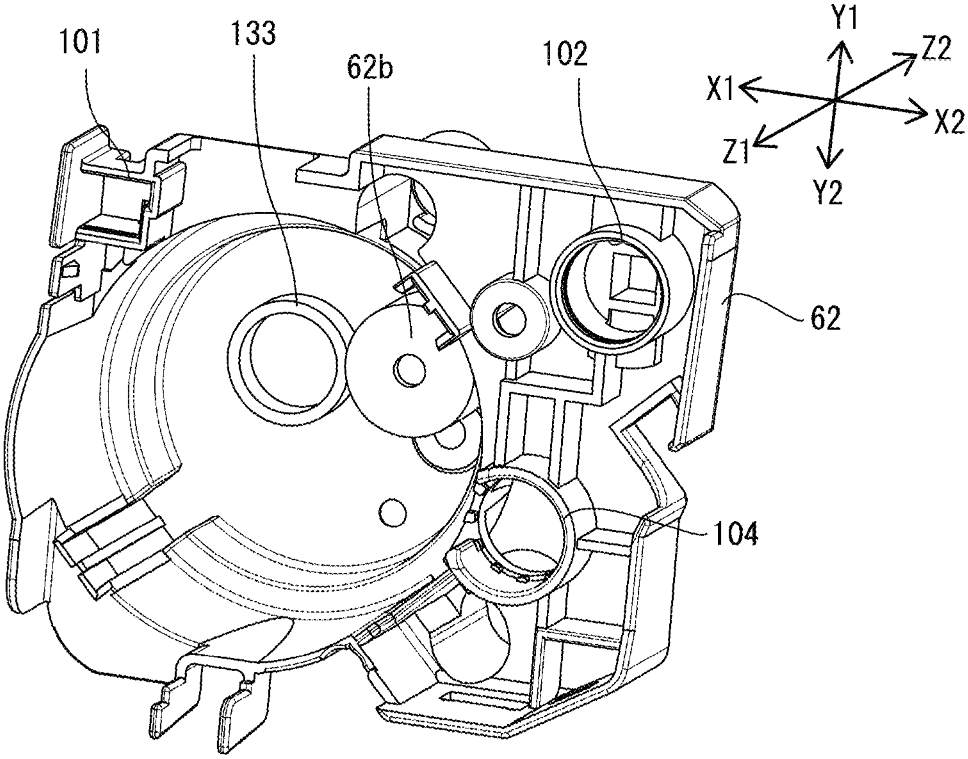
Figure 13:
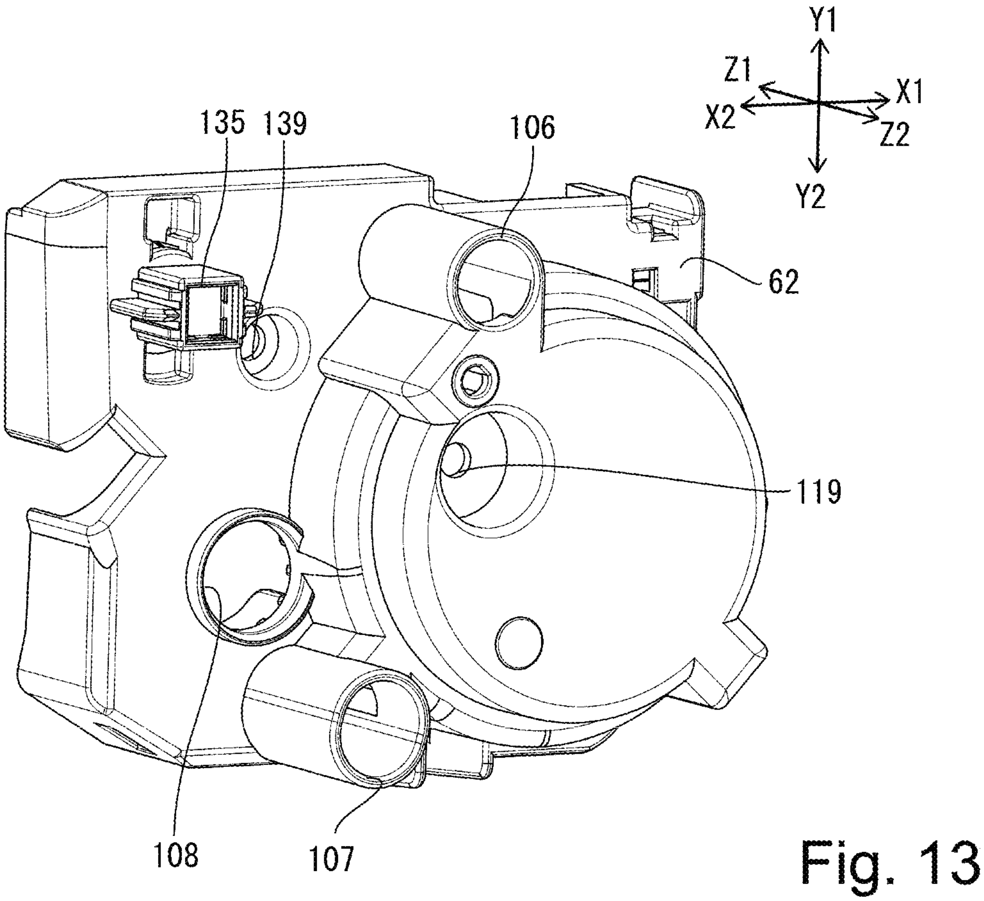

Part (a) of FIG. 13 is a perspective view of the side cover, and part (b) of FIG. 13 is another perspective view of the side cover.

Figure 14:
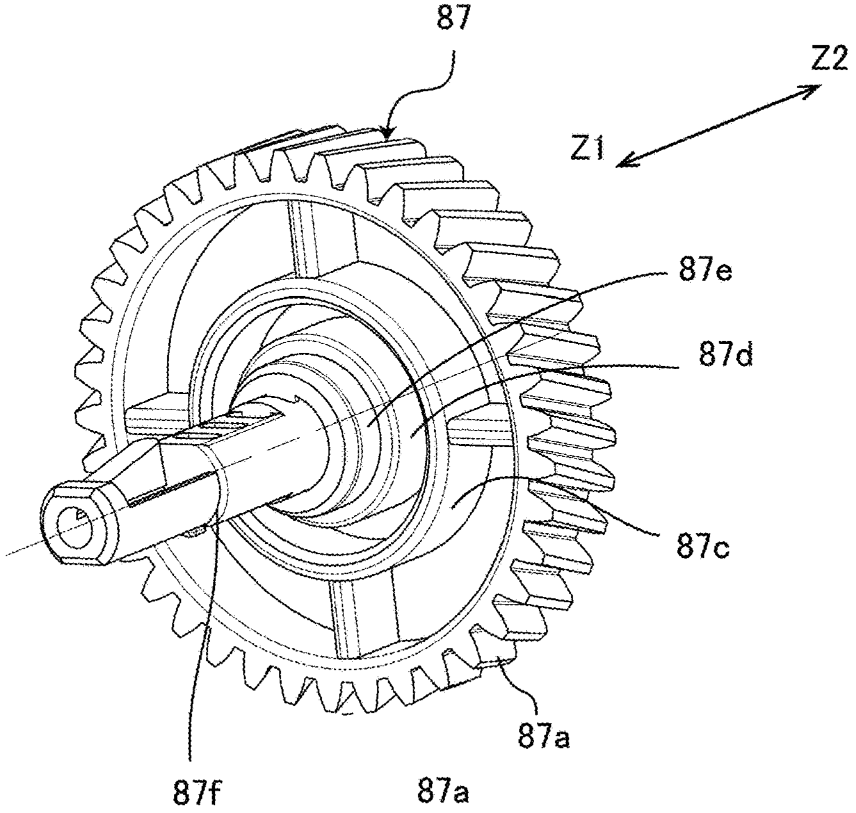
Figure 14:
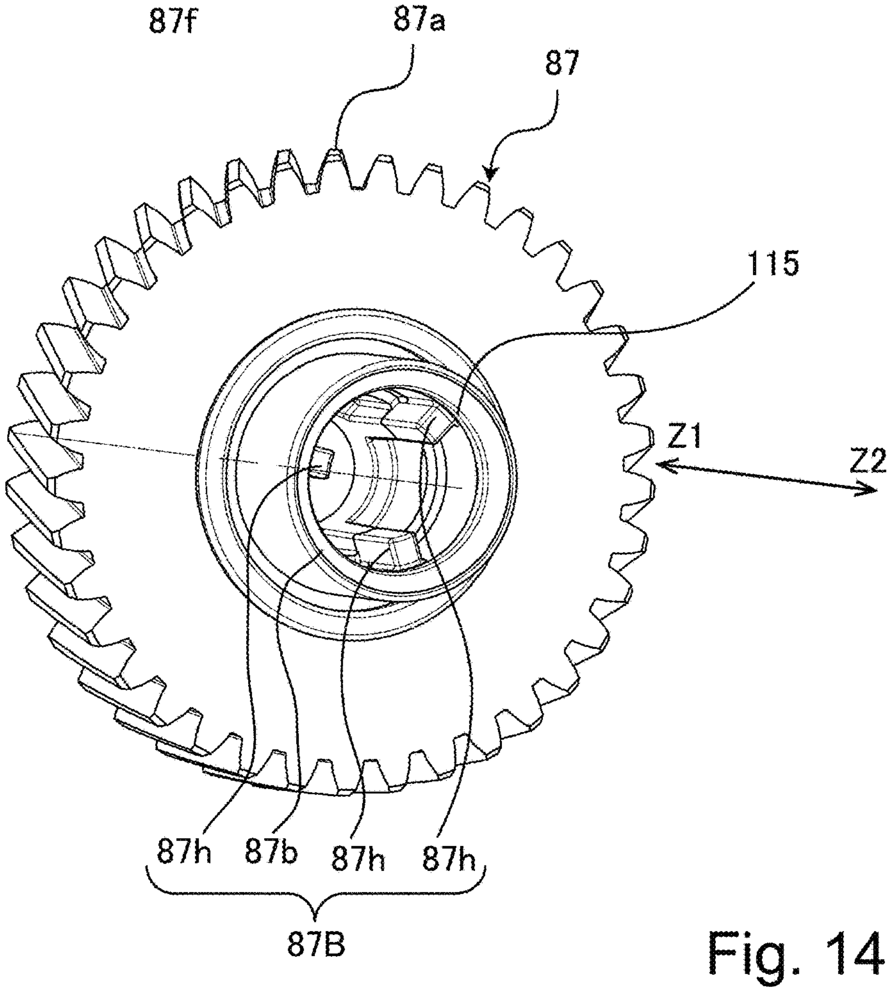

Part (a) of FIG. 14 is a perspective view of the stirring gear, and part (b) of FIG. 14 is another perspective view of the stirring gear.

Figure 15:
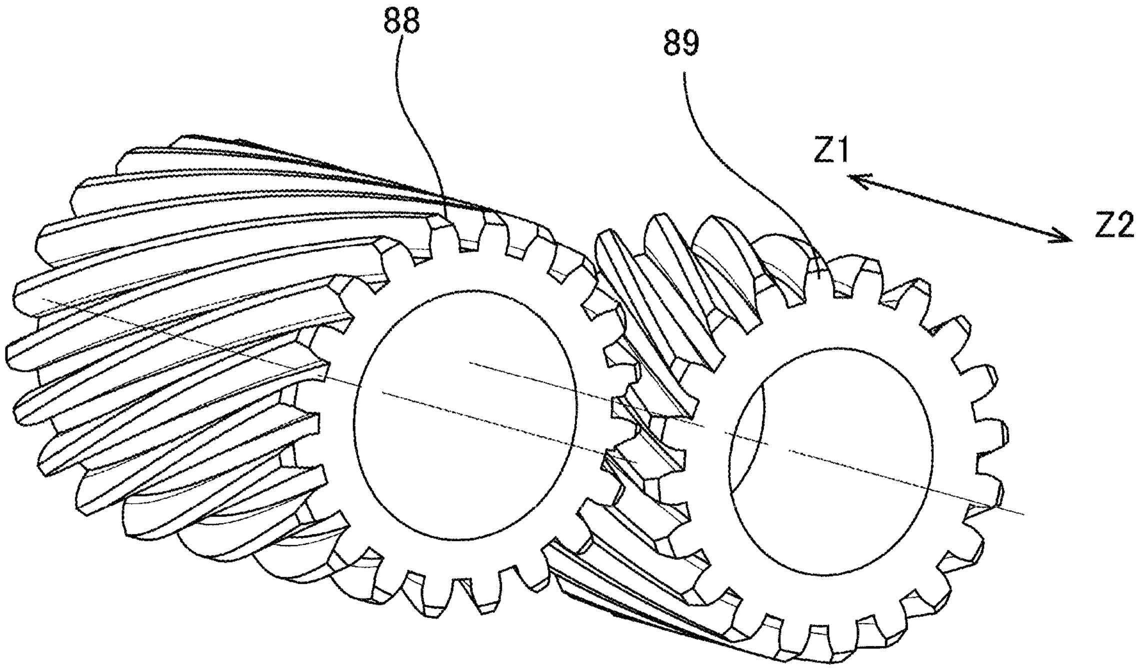

FIG. 15 is a perspective view of an idler gear.

Figure 16:
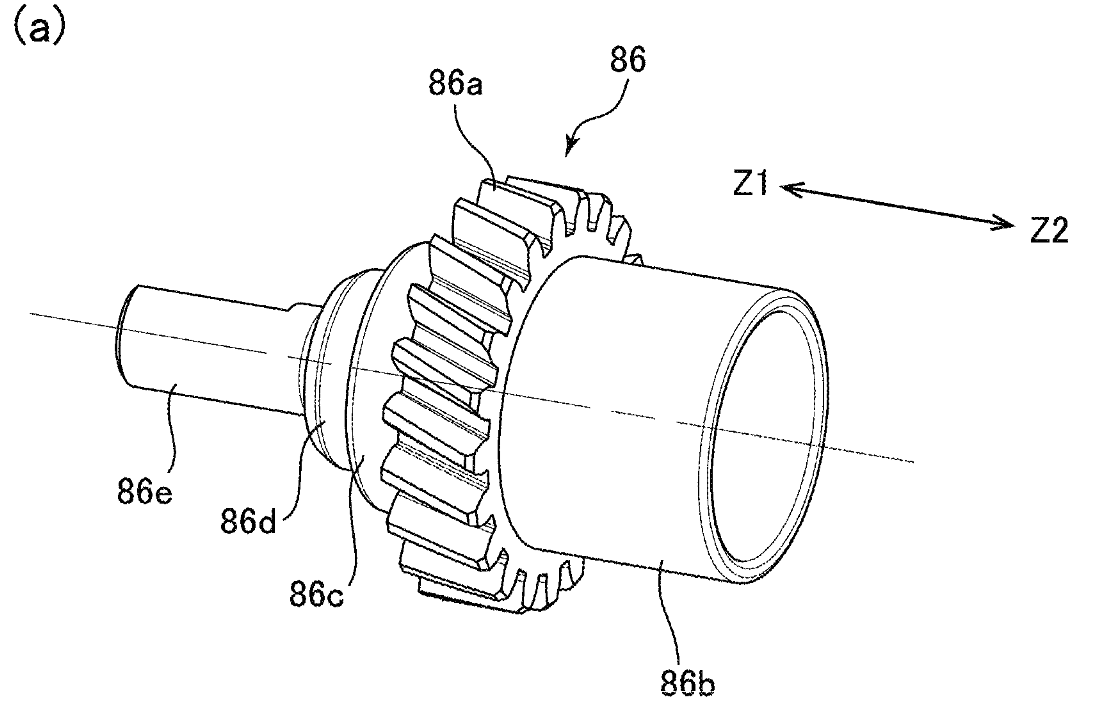
Figure 16:
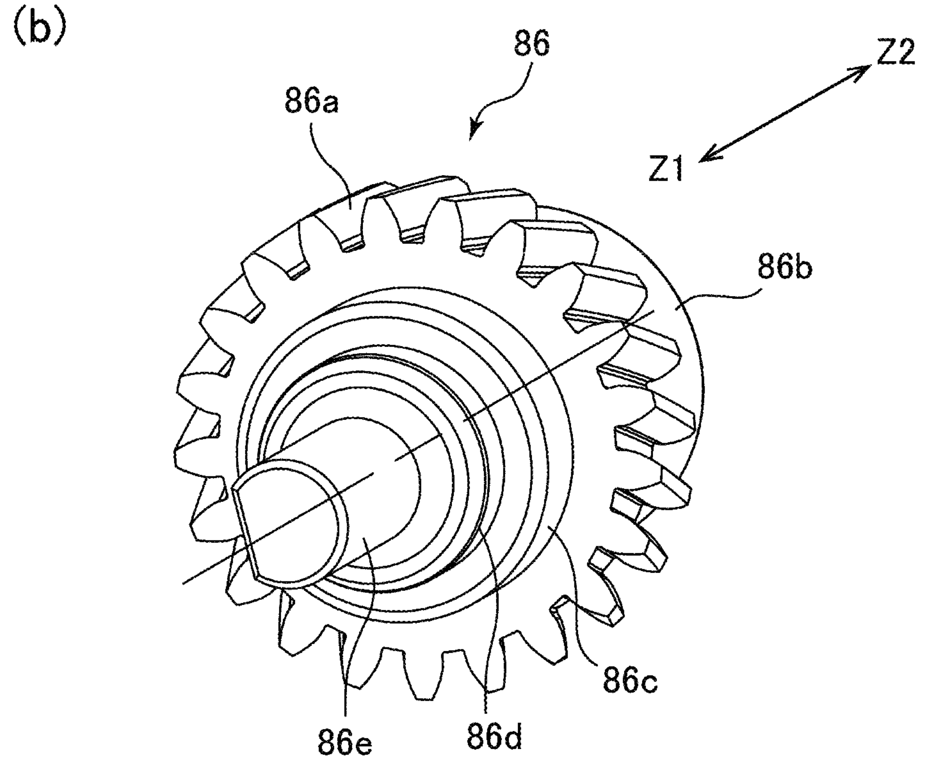

Part (a) of FIG. 16 is a perspective view of a screw gear, and part (b) of FIG. 16 is another perspective view of the screw gear.

Figure 17:
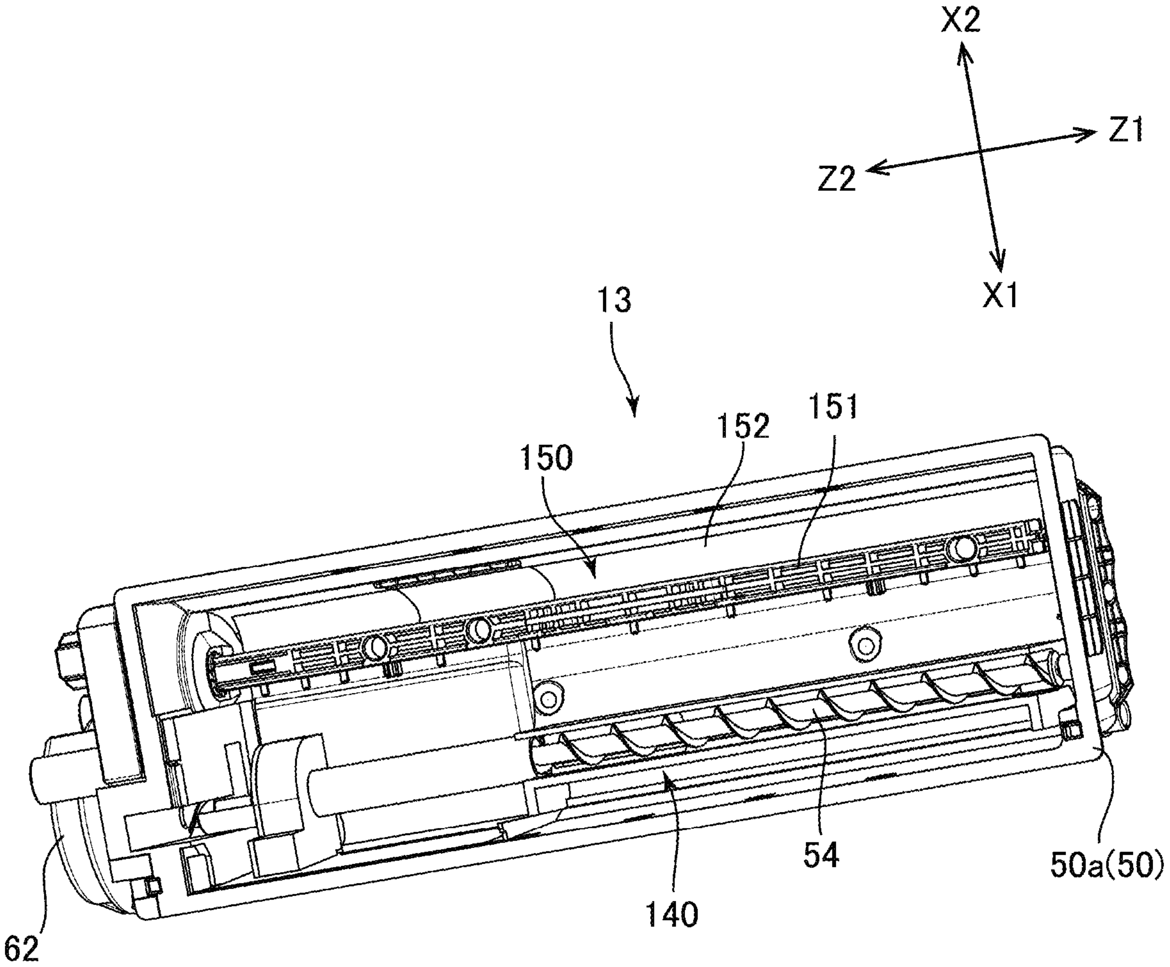

FIG. 17 is a perspective view of the toner cartridge with the lid portion omitted.

Figure 18:
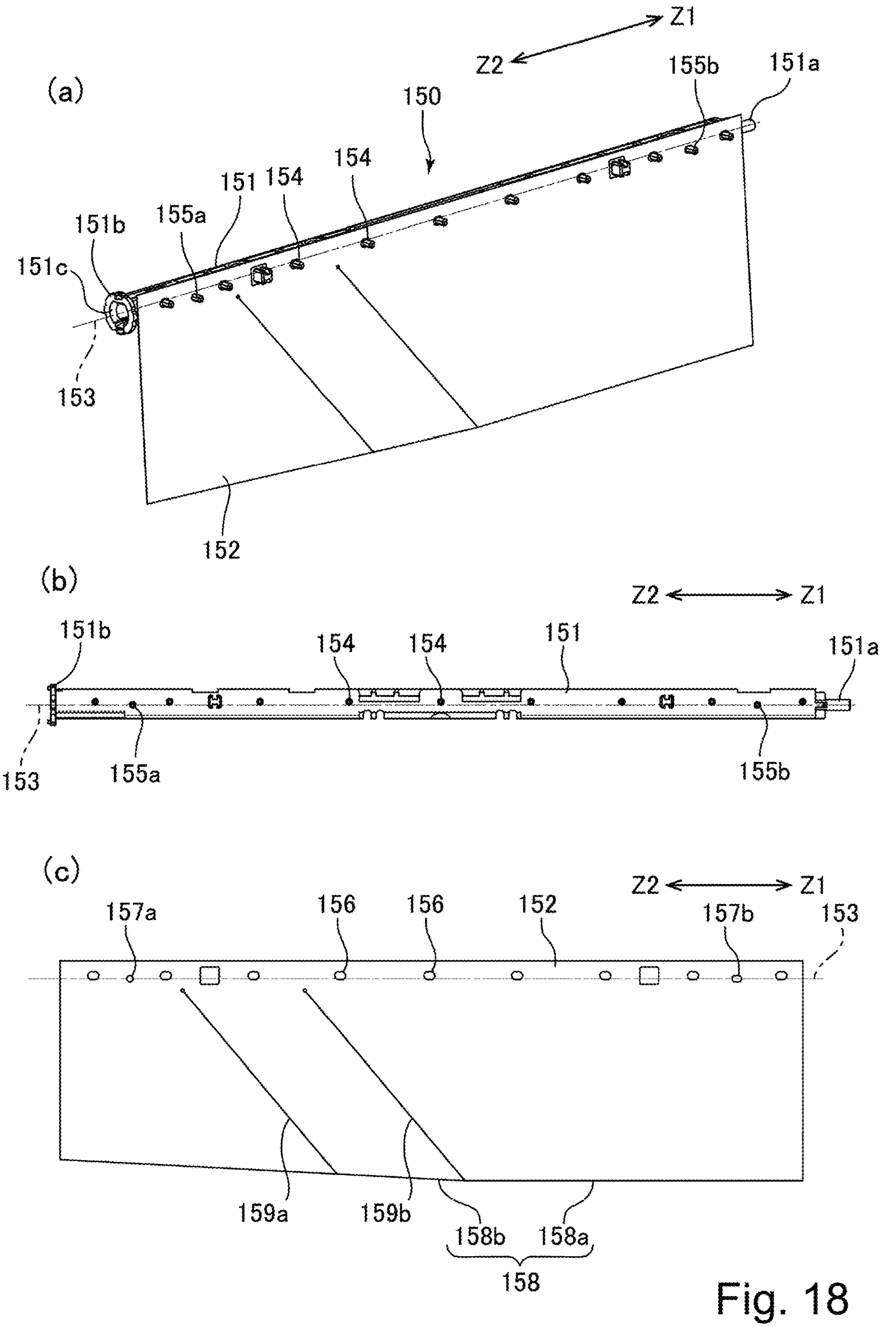

Part (a) of FIG. 18 is a perspective view of the stirring unit, part (b) of FIG. 18 is a front view of a stirring shaft, and part (c) of FIG. 18 is a front view showing the stirring sheet.

Figure 19:
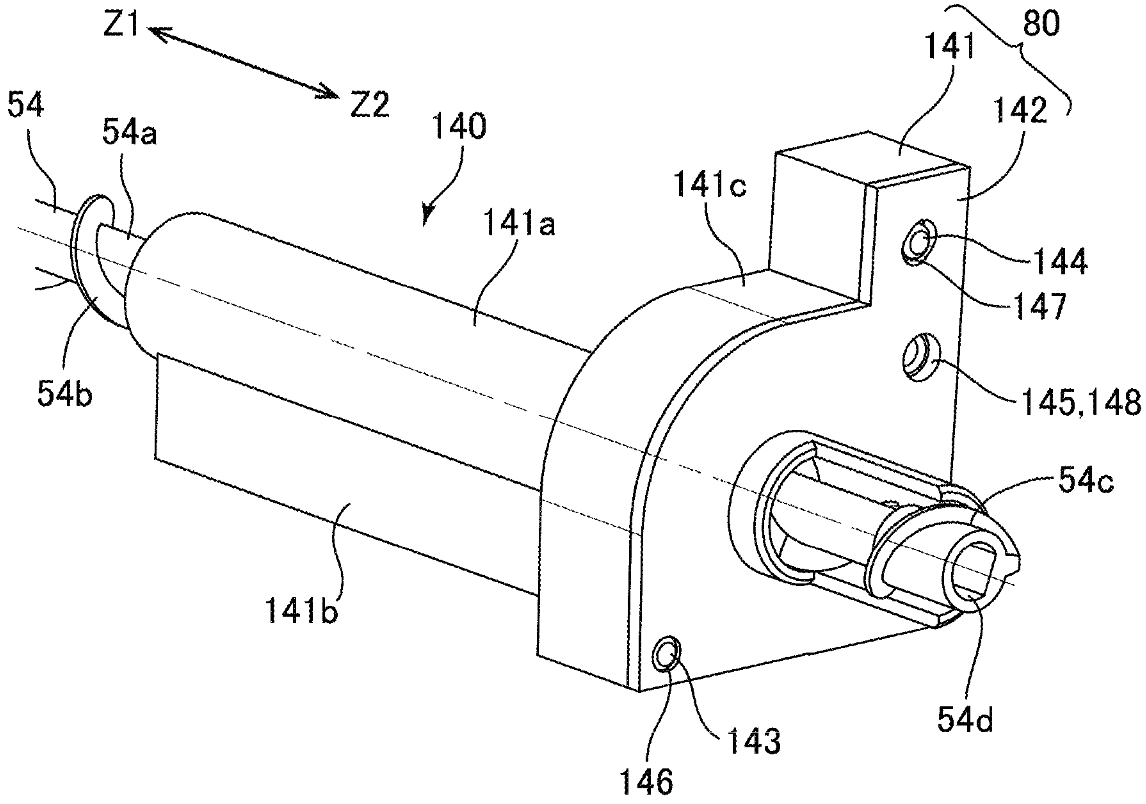

FIG. 19 is an enlarged perspective view of a screw unit.

Figure 20:
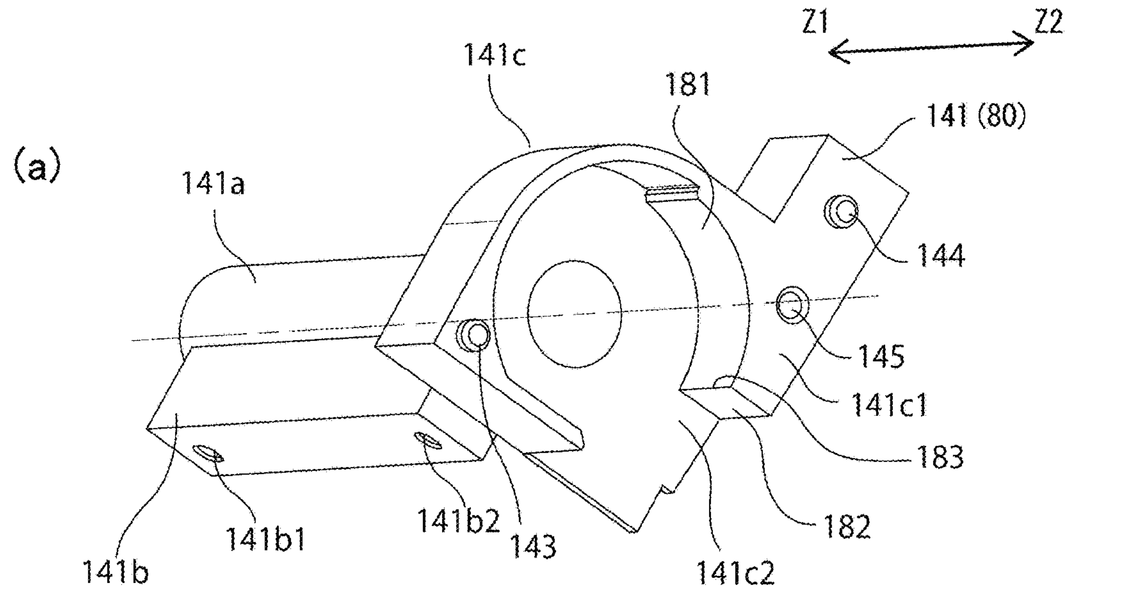
Figure 20:
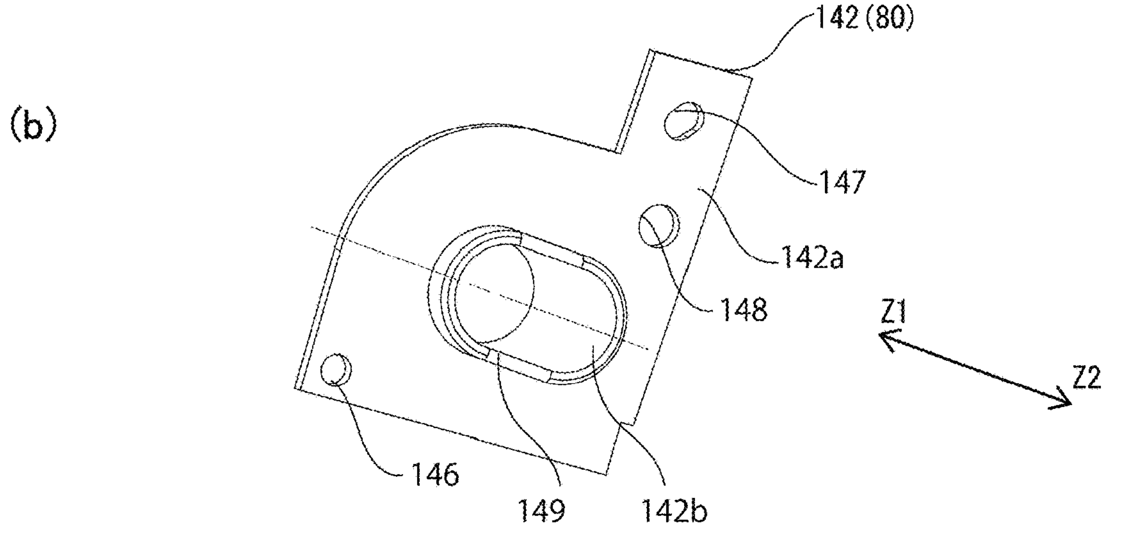
Figure 20:
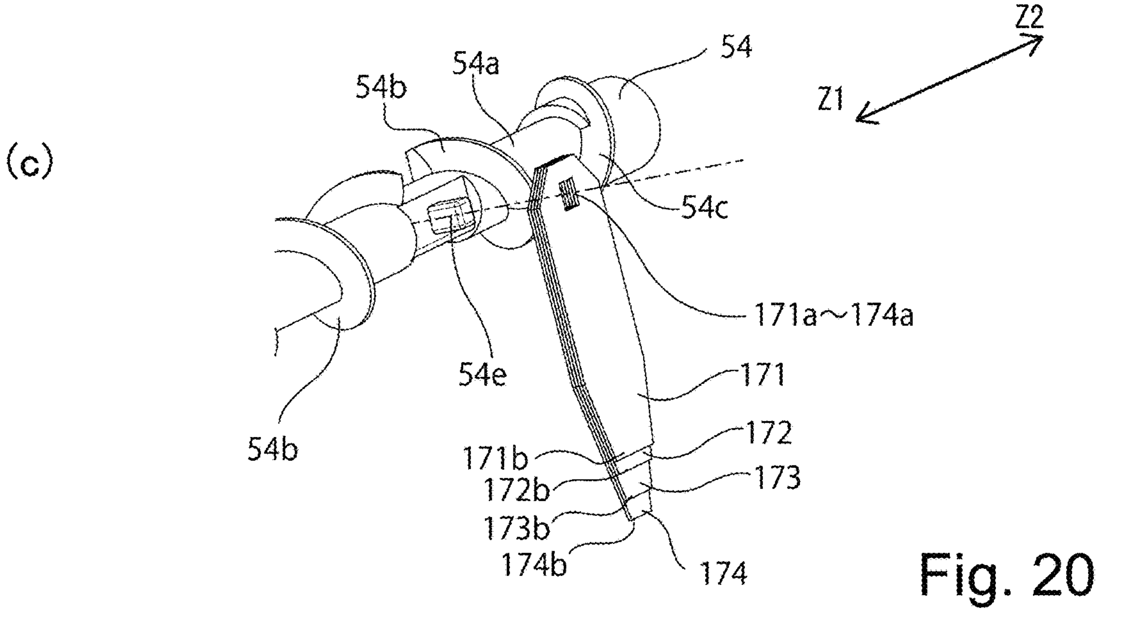

Part (a) of FIG. 20 is a perspective view of a first case of the screw case, part (b) of FIG. 20 is a perspective view of a second case of the screw case, and part (c) of FIG. 20 is an exploded perspective view of the screw and the discharge sheet.

Figure 21:
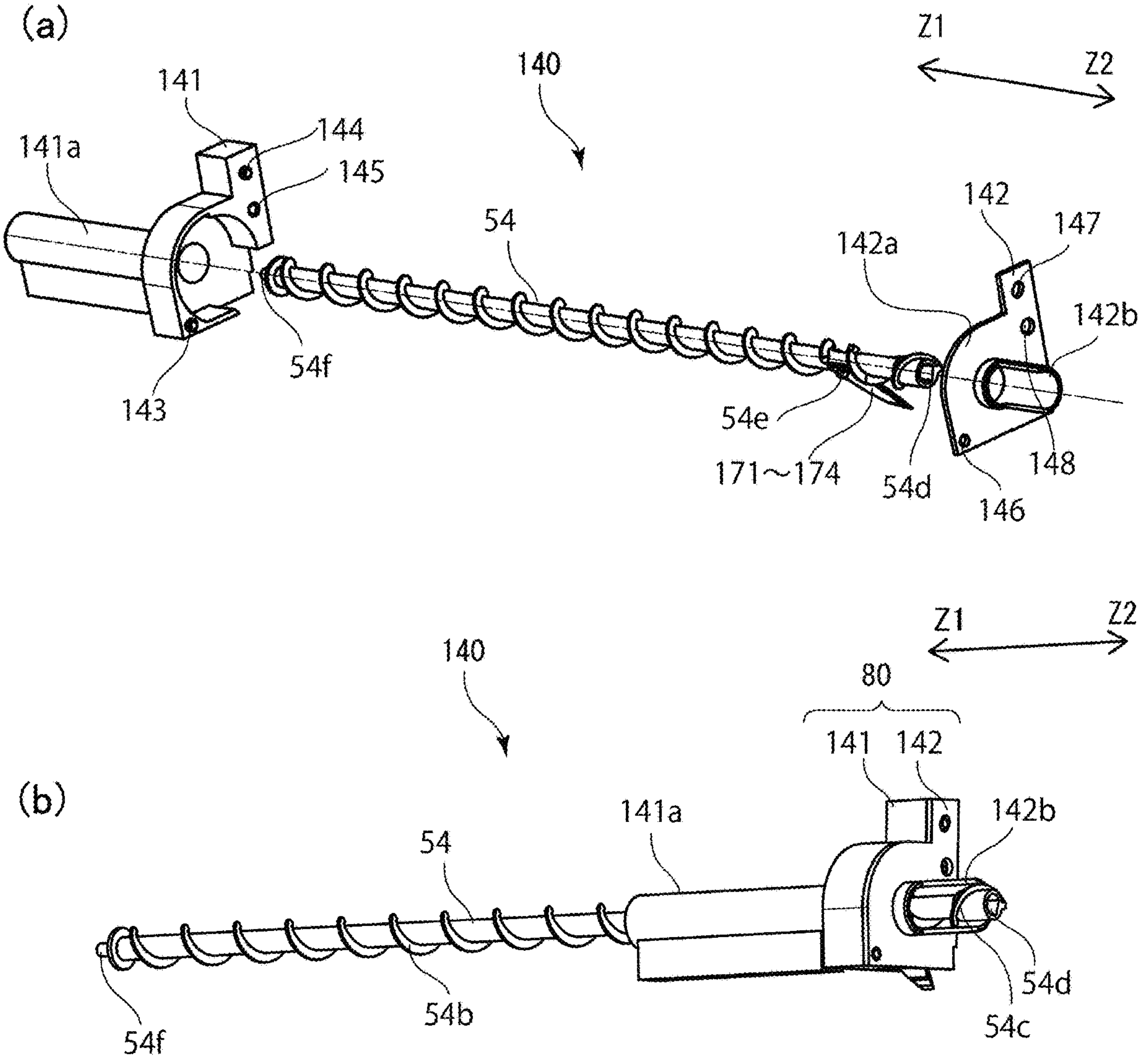

Part (a) of FIG. 21 is an exploded perspective view of the screw unit, and part (b) of FIG. 21 is a perspective view of the screw unit after assembly.

Figure 22:
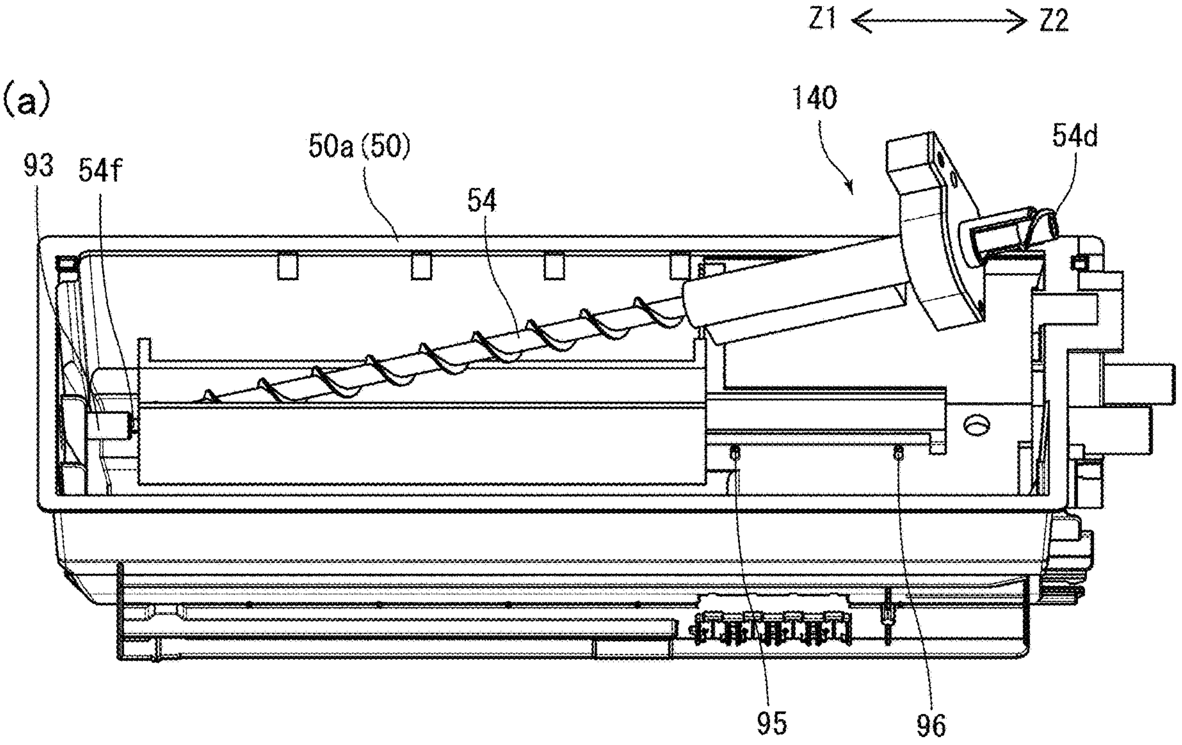
Figure 22:
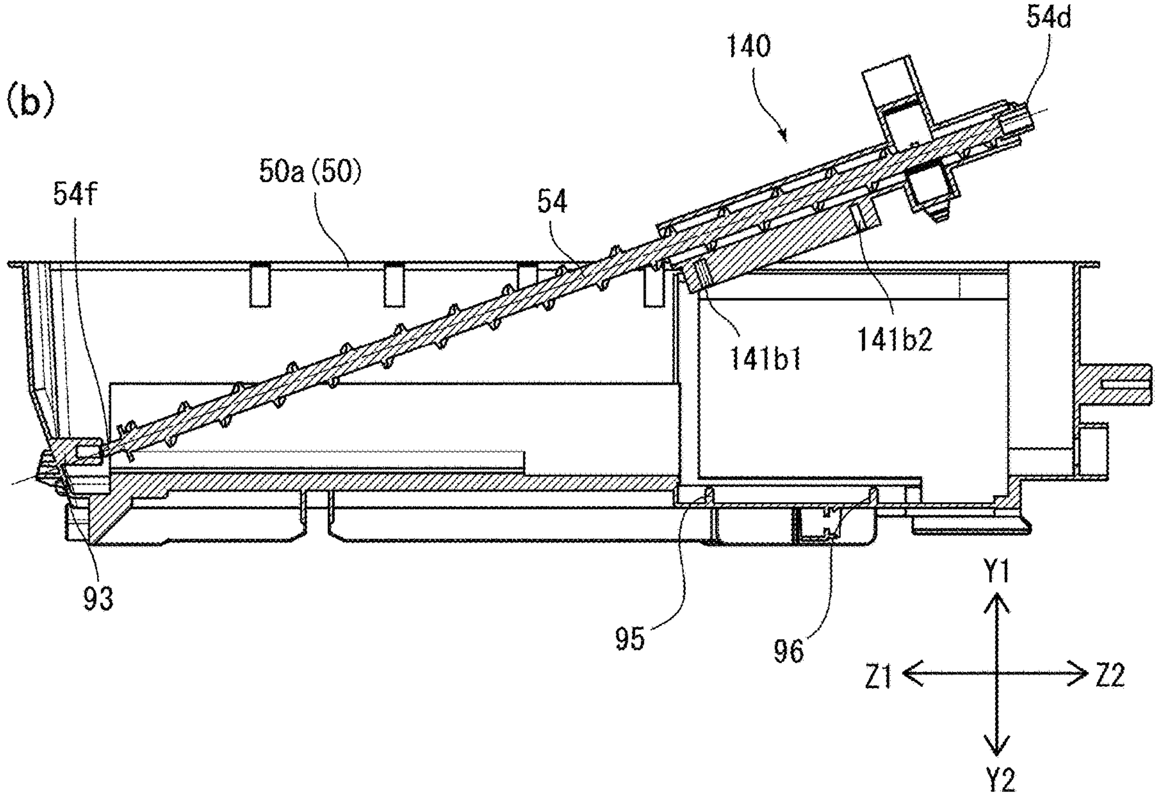

Part (a) of FIG. 22 is a perspective view showing the screw unit which is being assembled to the supply frame, and part (b) of FIG. 22 is a sectional view of the screw unit which is being assembled to the supply frame.

Figure 23:
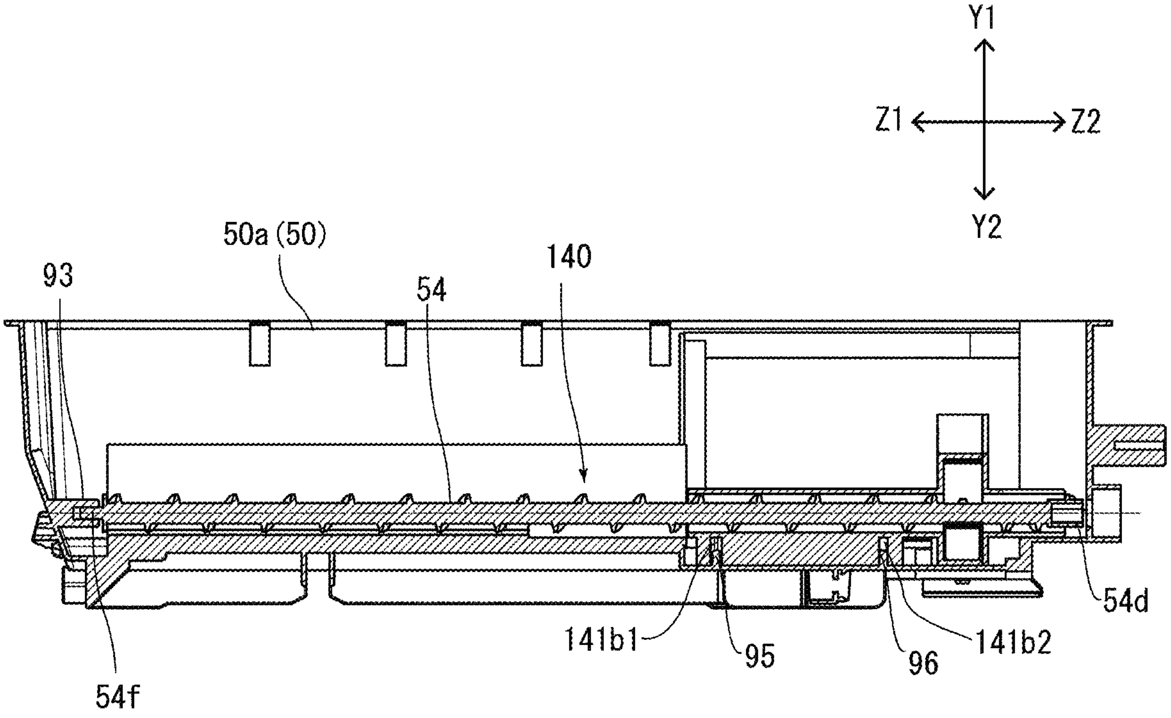

FIG. 23 is a sectional view of the screw unit assembled to the supply frame.

Figure 24:
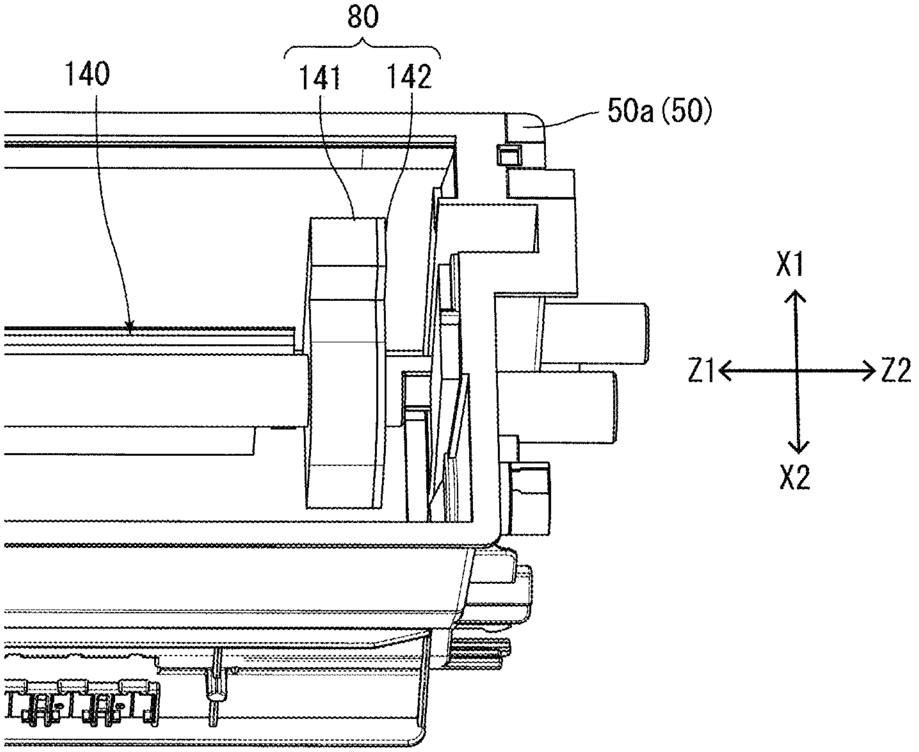
Figure 24:
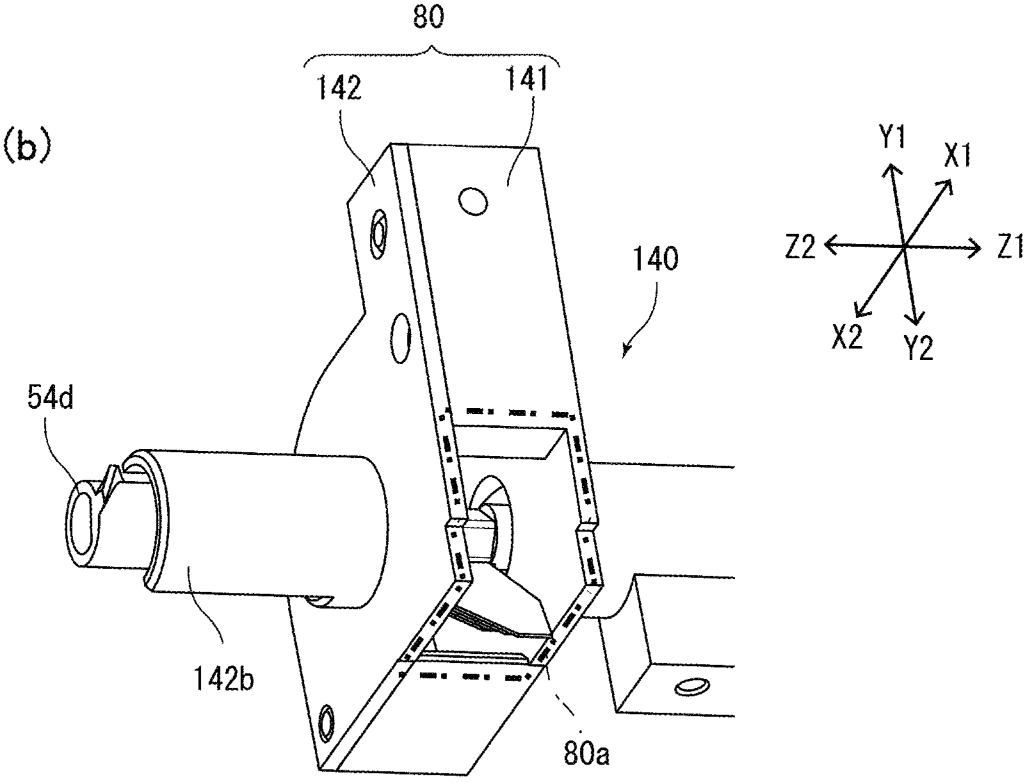

Part (a) of FIG. 24 is a perspective view of the screw case adhered to the container portion of the supply frame, and part (b) of FIG. 24 is a perspective view of a bottom side of the screw case.

Figure 25:
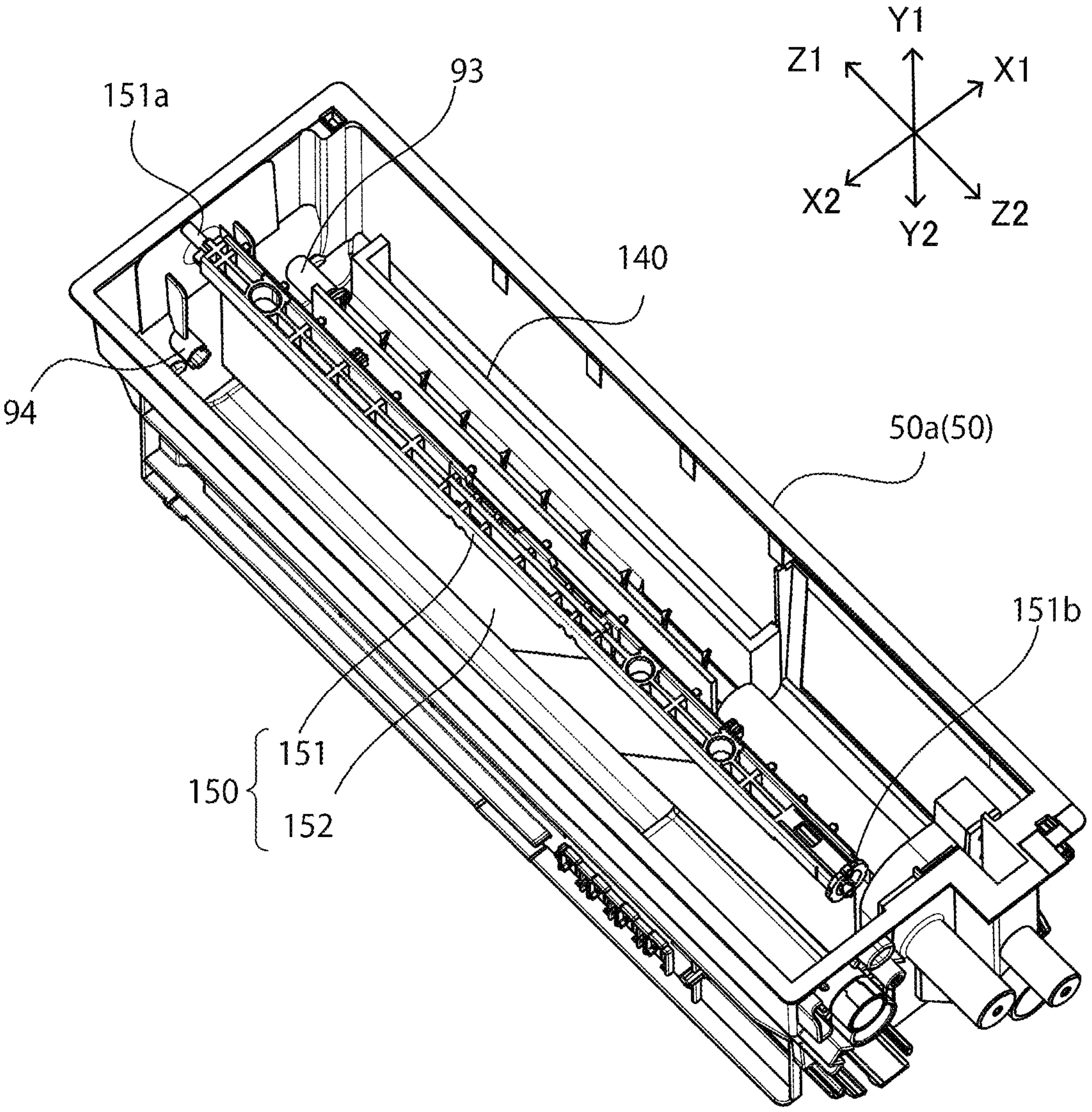

FIG. 25 is a perspective view showing the stirring unit which is being attached to the container portion.

Figure 26:
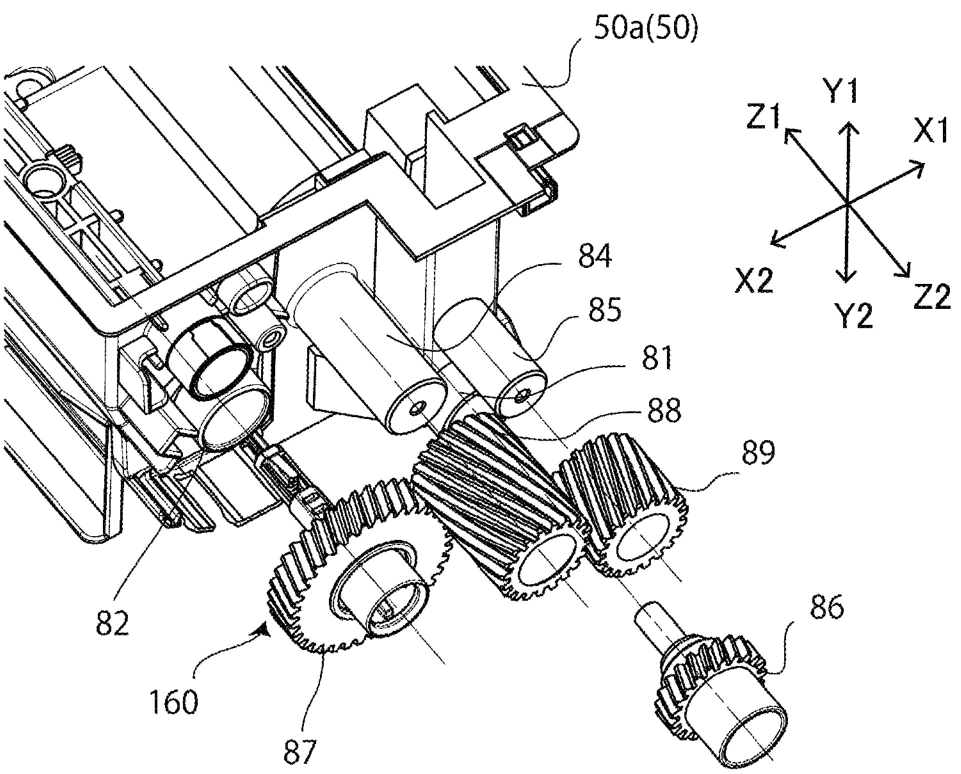
Figure 26:
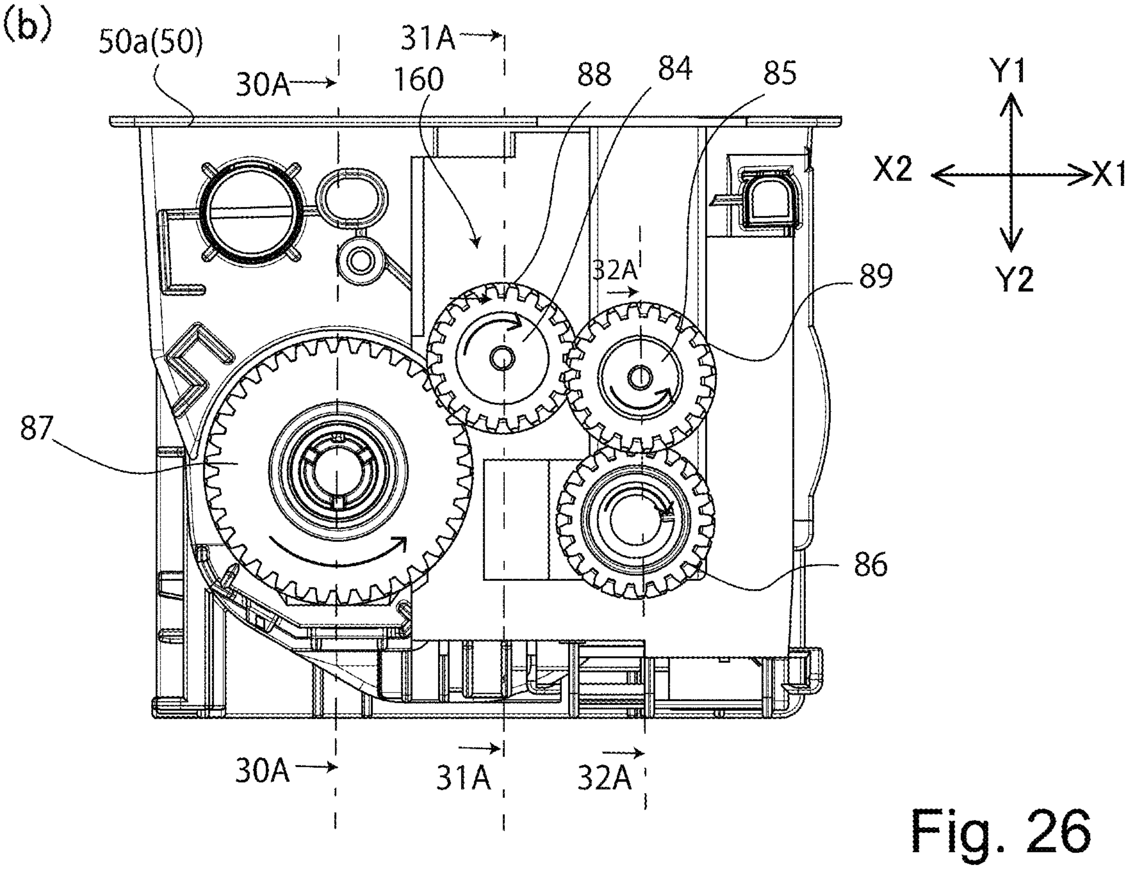

Part (a) of FIG. 26 is an exploded perspective view of gears of the drive train and the container portion, and part (b) of FIG. 26 is a front view of the assembled drive train.

Figure 27:
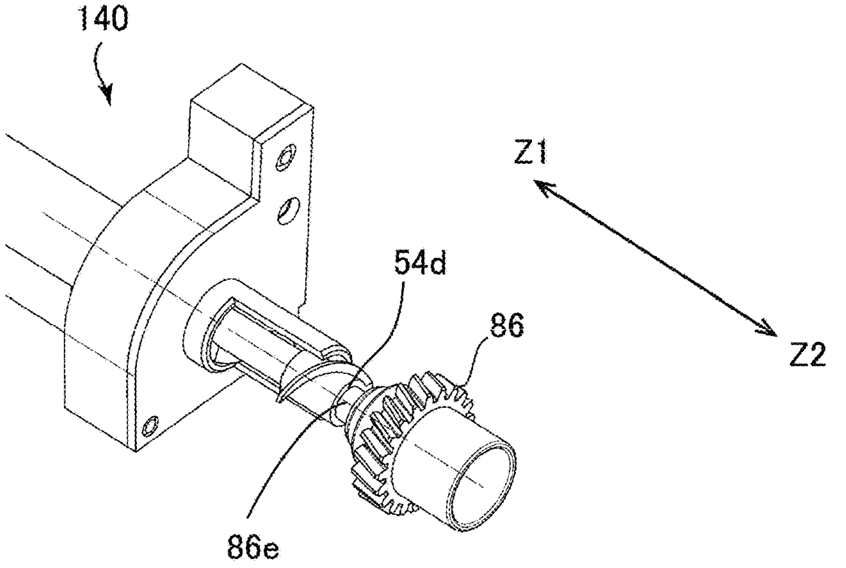
Figure 27:
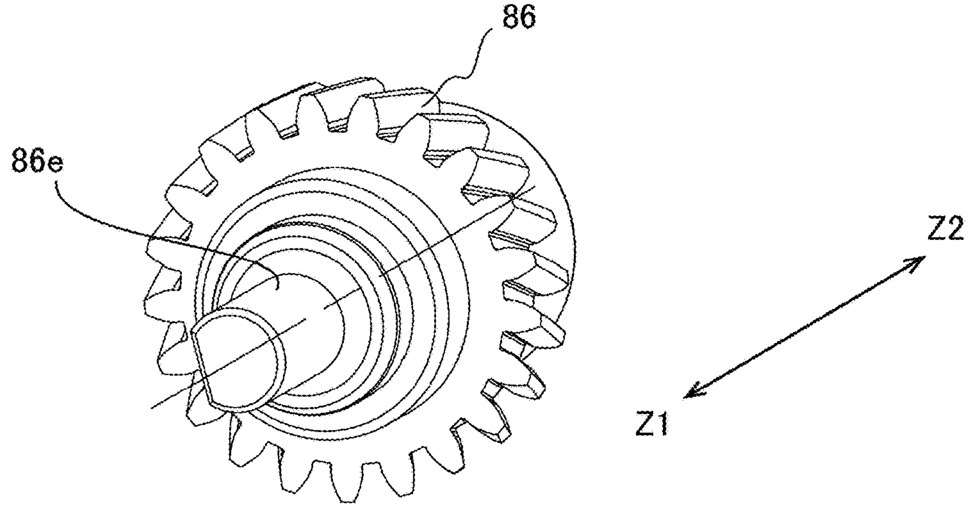
Figure 27:
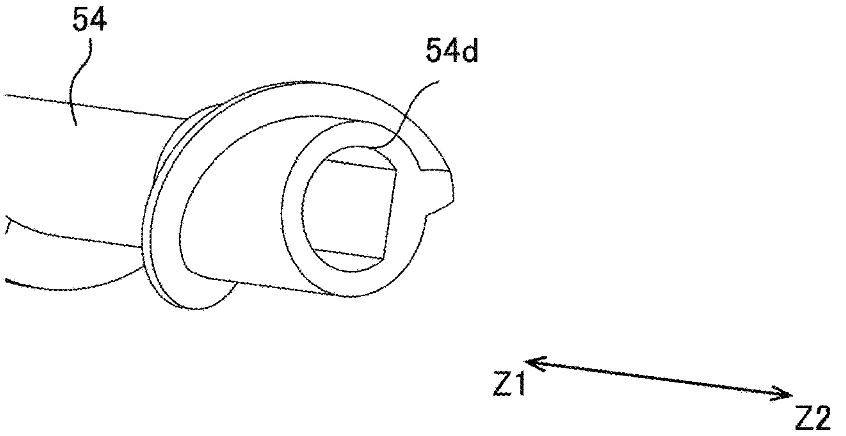

Part (a) of FIG. 27 is a perspective view showing mounting of the screw gear to the gear attachment portion of the screw unit, part (b) of FIG. 27 is a perspective view showing the screw gear, and part (c) of FIG. 27 is a perspective view showing the gear mounting portion of the screw.

Figure 28:
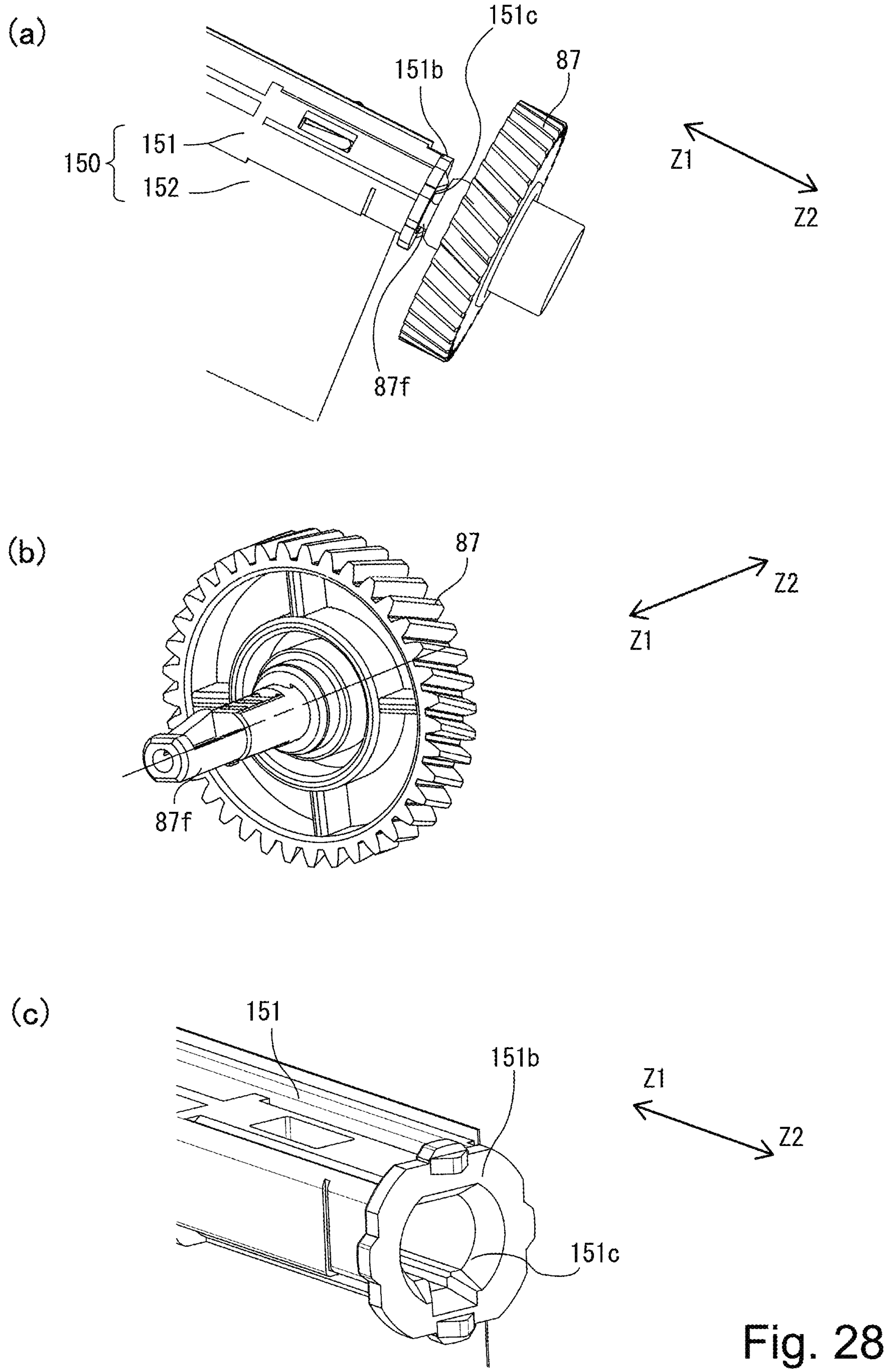

Part (a) of FIG. 28 is a perspective view showing mounting of the stirring gear to the gear mounting portion of the stirring unit, part (b) of FIG. 28 is a perspective view showing the stirring gear, and part (c) of FIG. 28 is a perspective view of the gear mounting portion of the stirring shaft.

Figure 29:
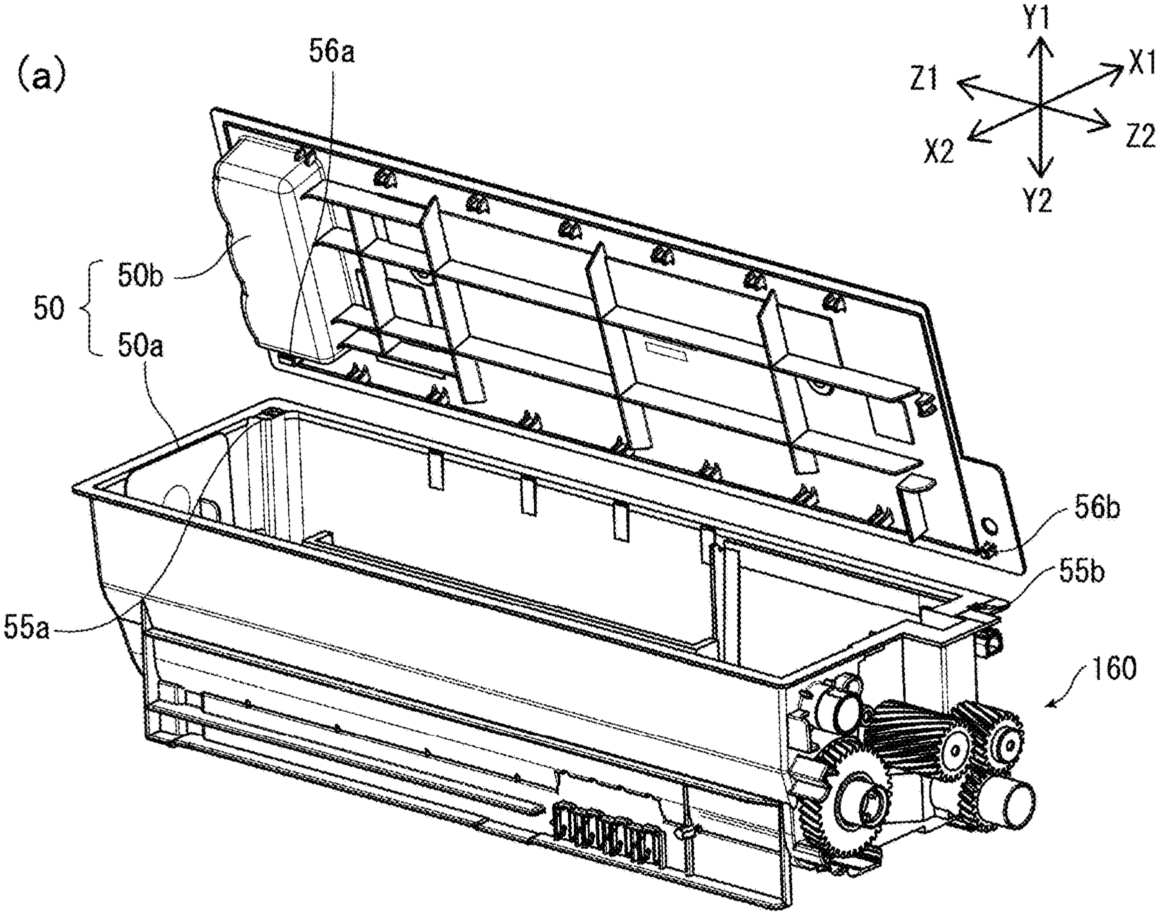
Figure 29:
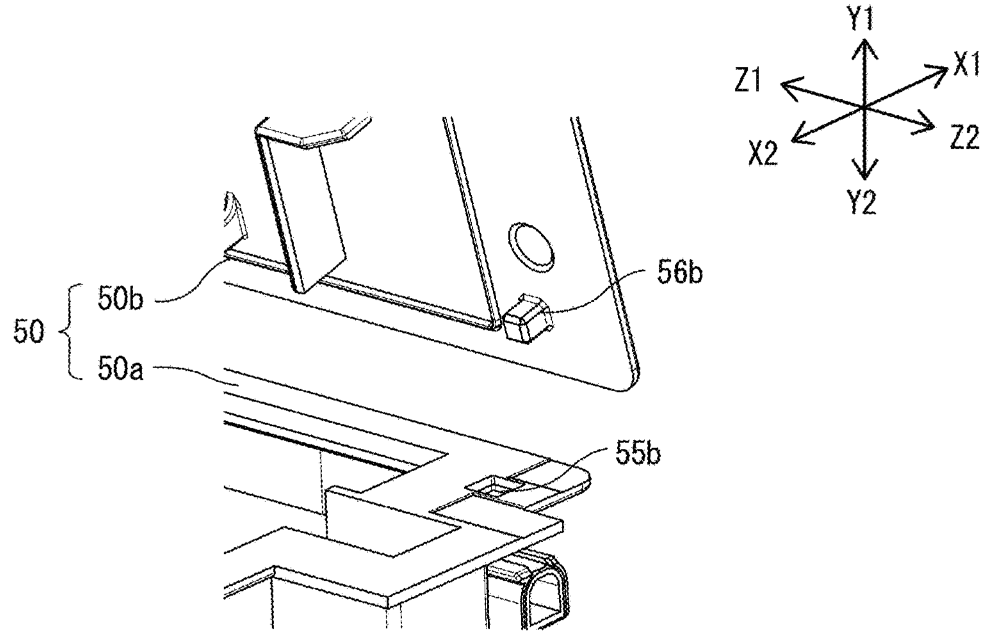

Part (a) of FIG. 29 is an exploded perspective view of the supply frame, and part (b) of FIG. 29 is an enlarged view of a positioning structure between the container portion and the lid portion.

Figure 30:
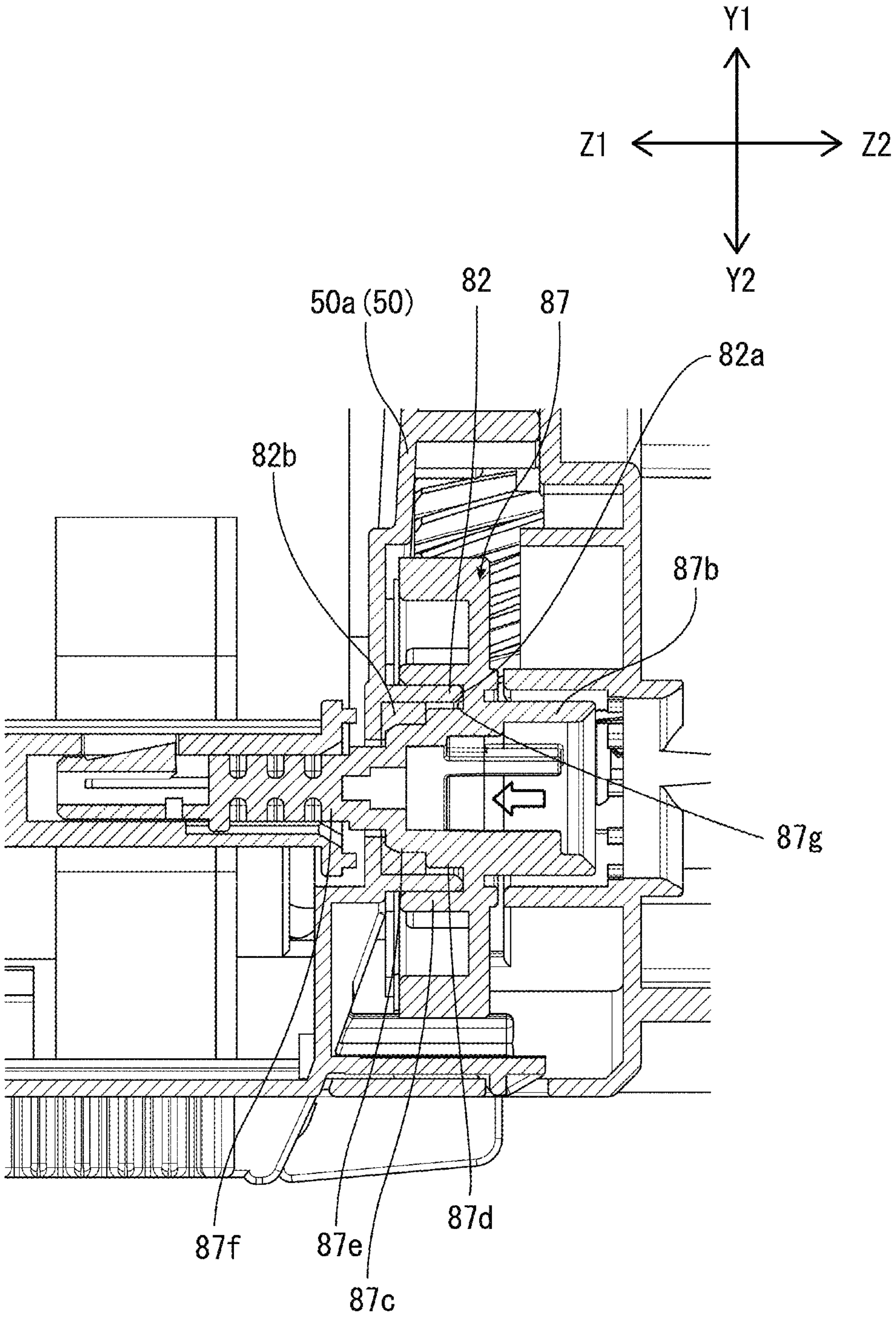

FIG. 30 is a sectional view taken along a line 30A-30A indicated in part (b) of FIG. 26.

Figure 31:
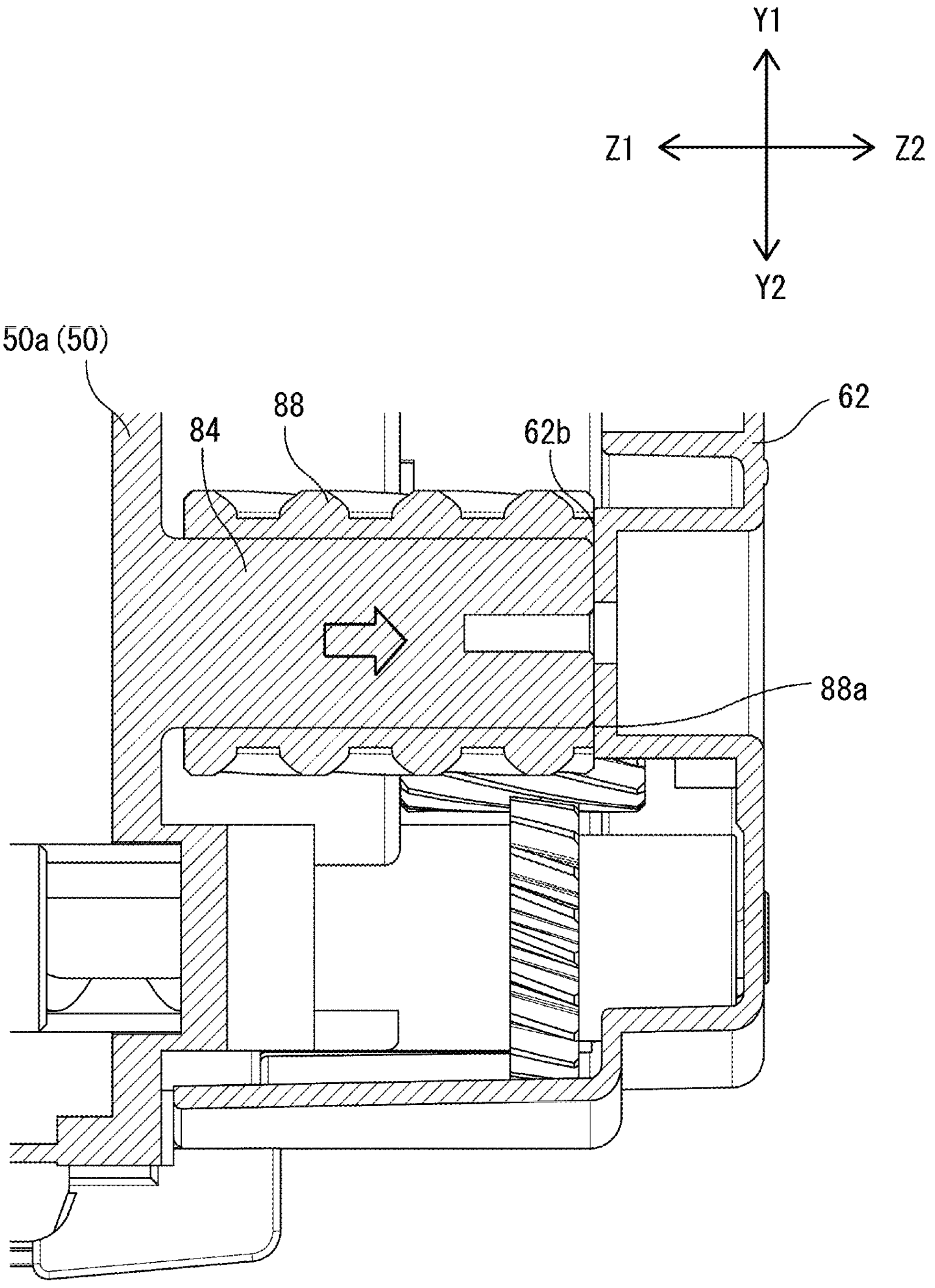

FIG. 31 is a sectional view taken along a line 31A-31A indicated in part (b) of FIG. 26.

Figure 32:
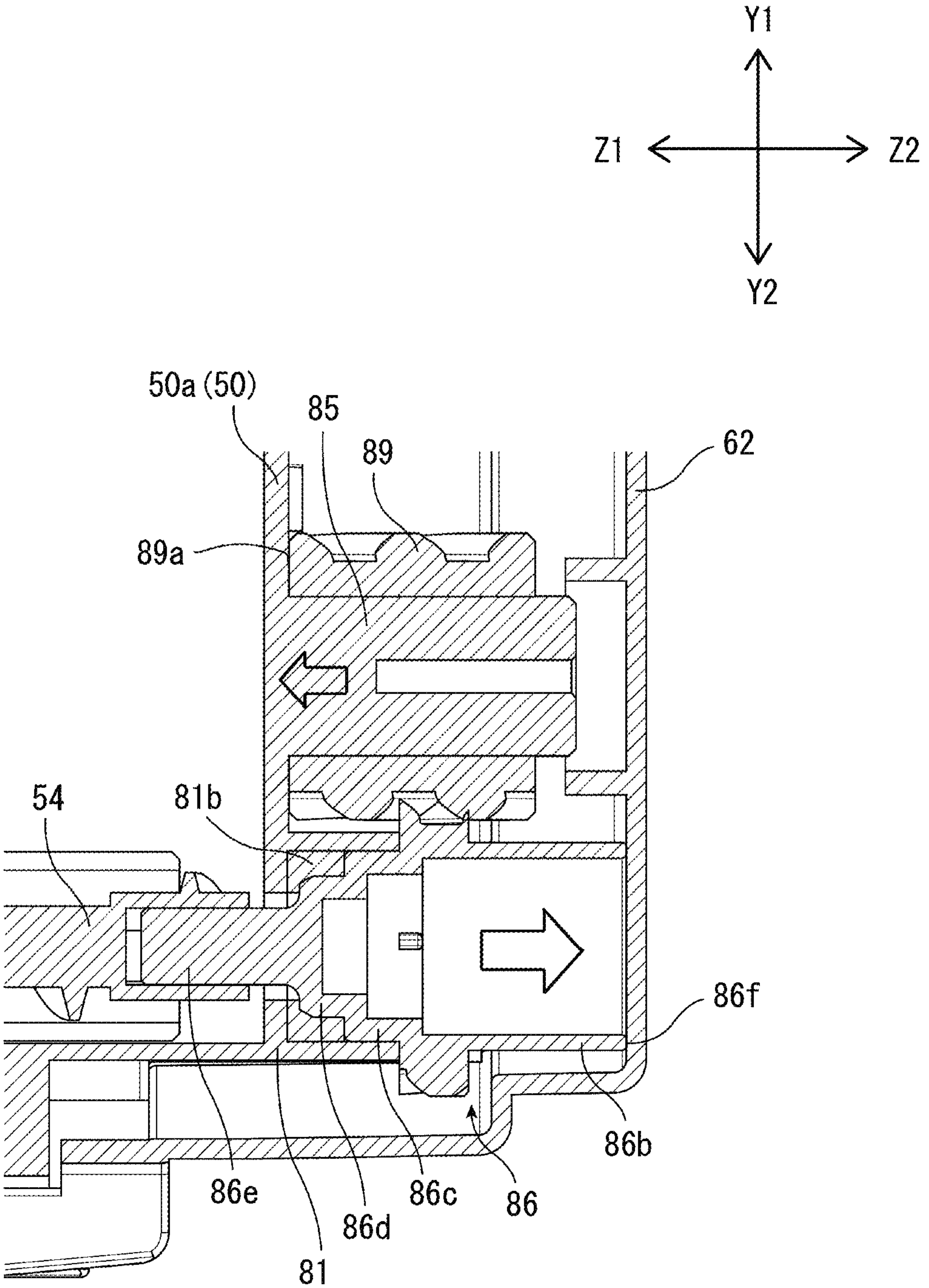

FIG. 32 is a sectional view taken along a line 32A-32A indicated in part (b) of FIG. 26.

Figure 33:
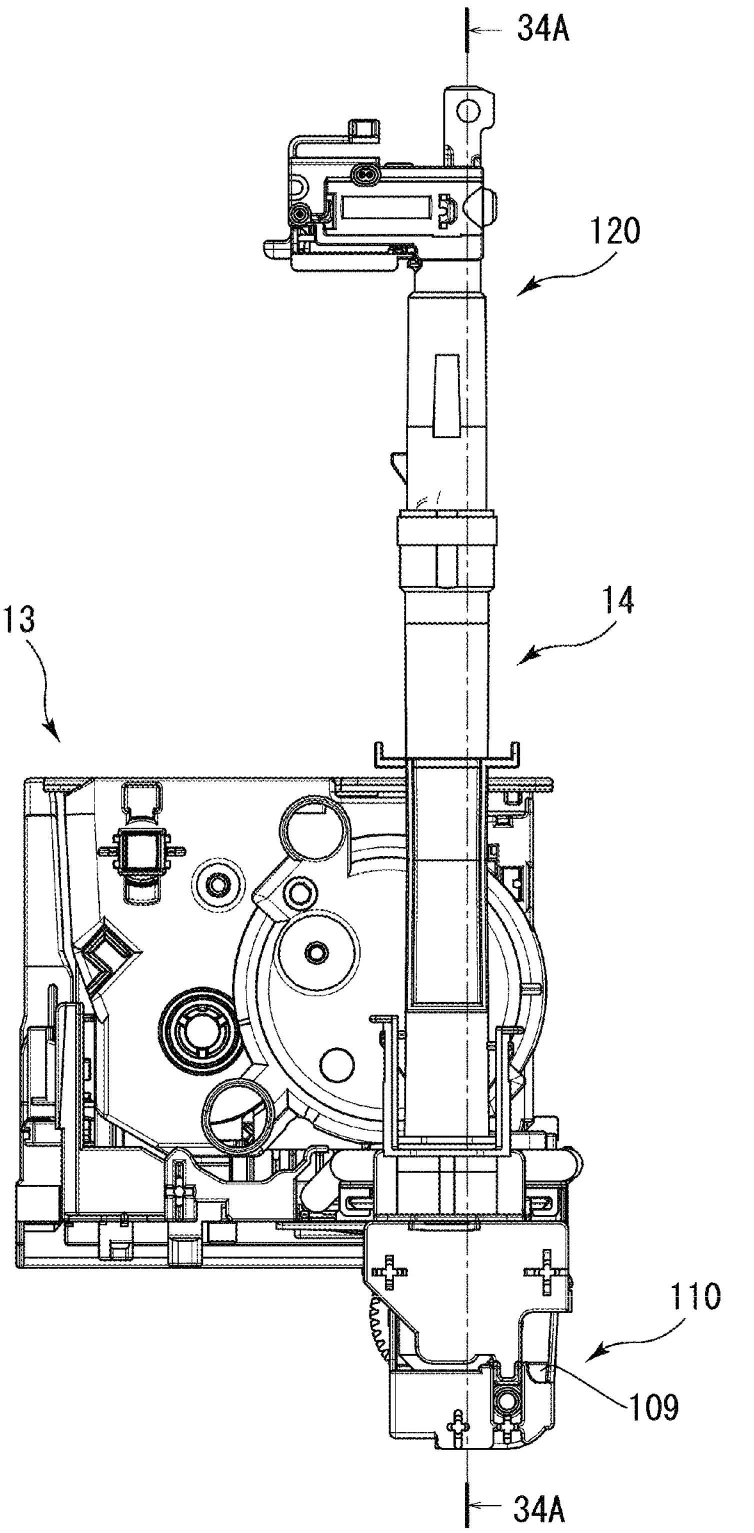

FIG. 33 is a side view of the toner transport device and the toner cartridge.

Figure 34:
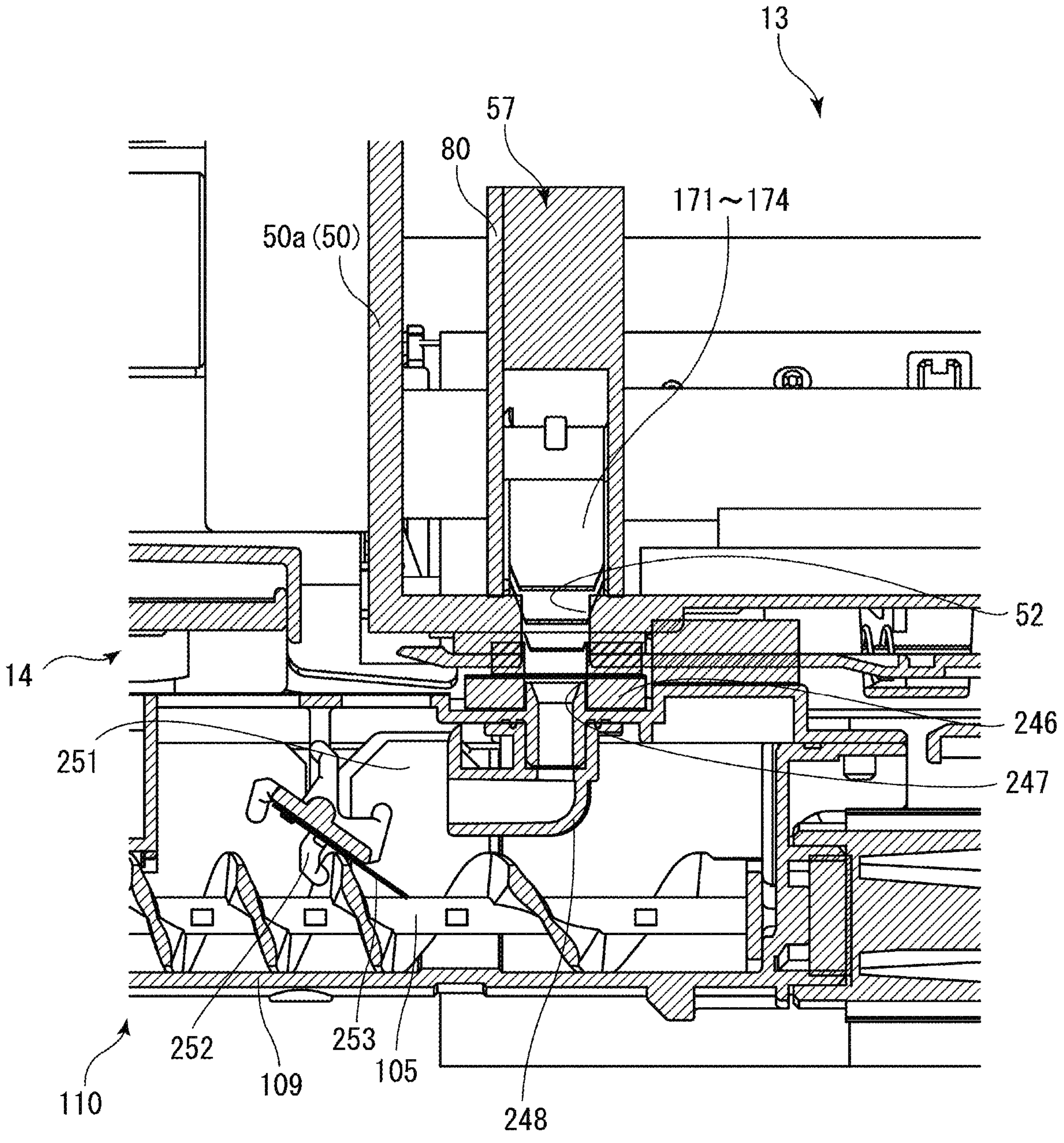

FIG. 34 is a partially enlarged view taken along a line 34A-34A indicated in FIG. 33.

Figure 35:
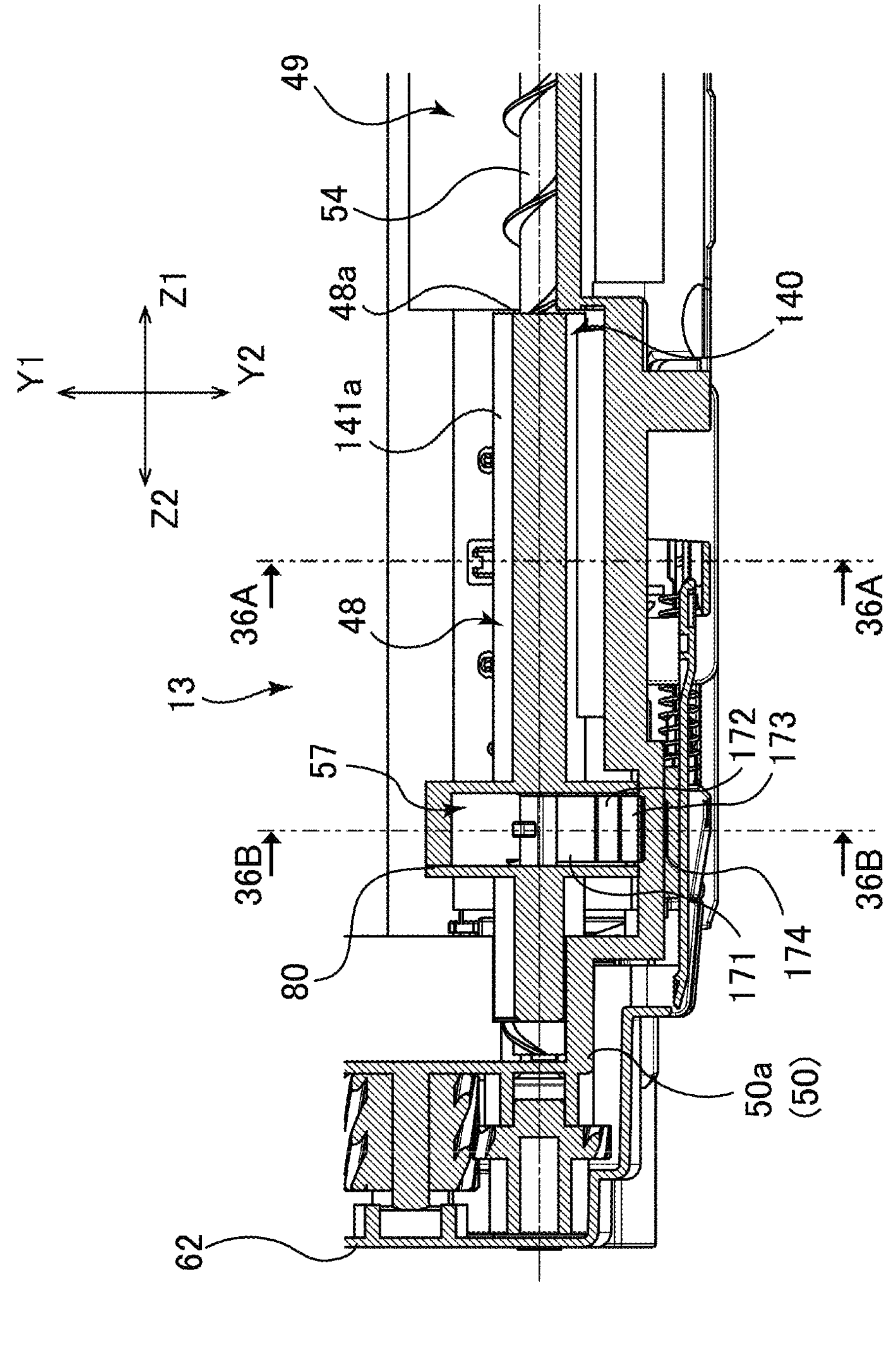

FIG. 35 is a sectional view of the screw unit 140.

Figure 36:
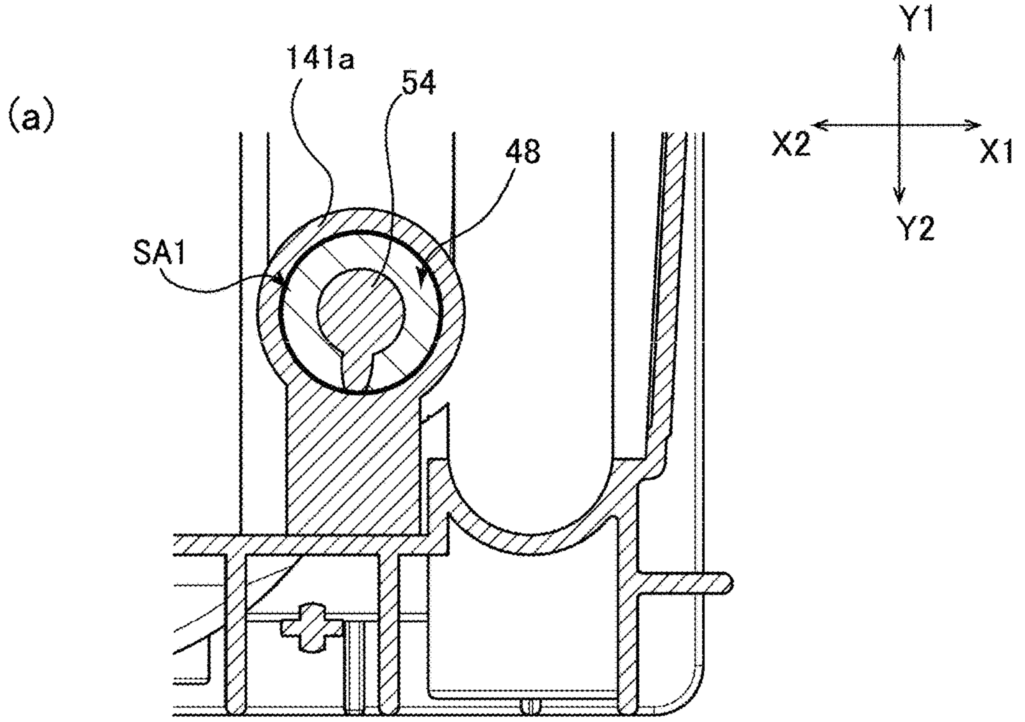
Figure 36:
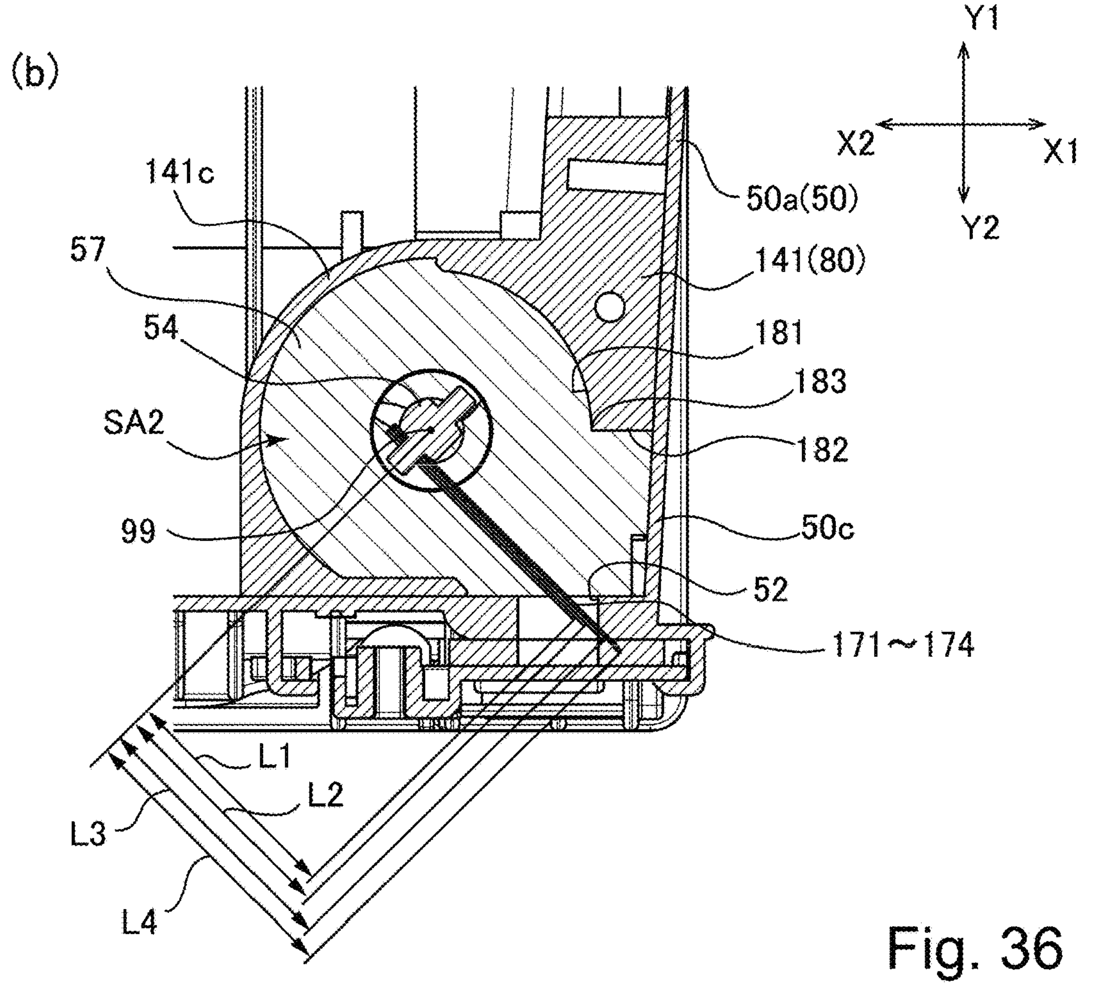

Part (a) of FIG. 36 is a cross-sectional view taken along a line 36A-36A indicated in FIG. 35, and part (b) of FIG. 36 is a cross-sectional view taken along a line 36B-36B indicated in FIG. 35.

Figure 37:
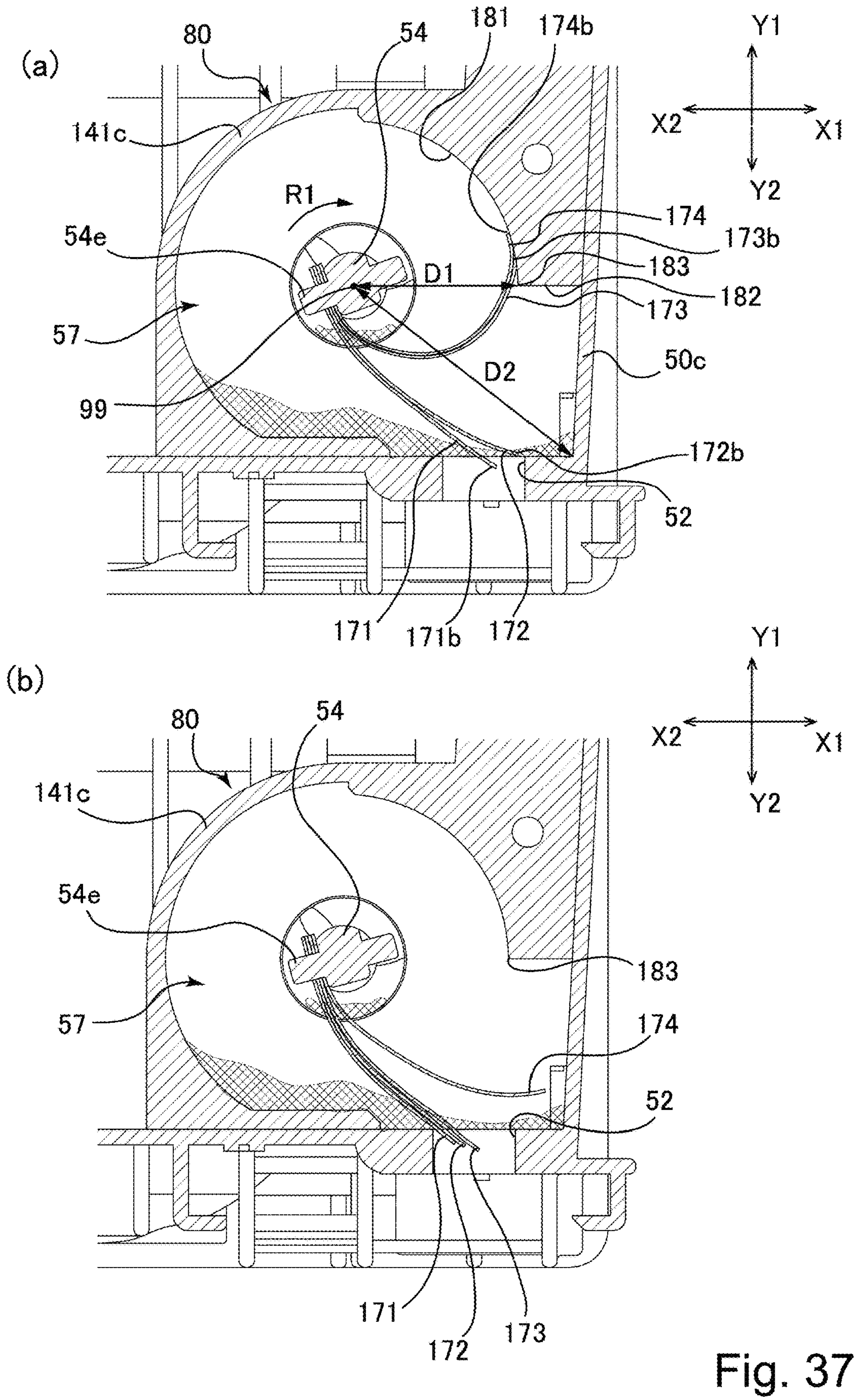

Part (a) of FIG. 37 and part (b) of FIG. 37 are cross-sectional views for illustrating operation of the discharge sheet.

Figure 38:
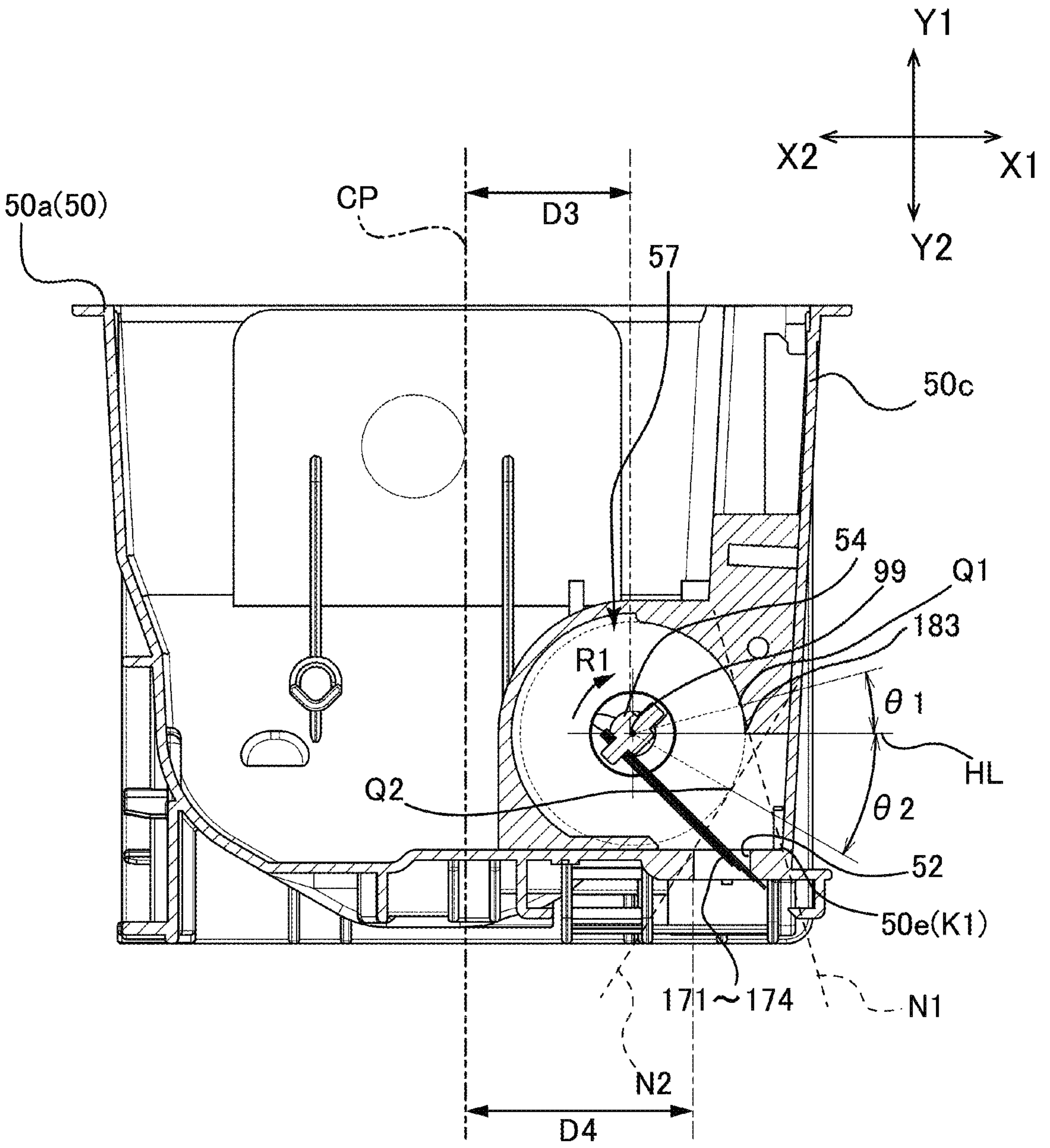

FIG. 38 is a cross-sectional view for illustrating arrangement of a jump platform.

Figure 39:
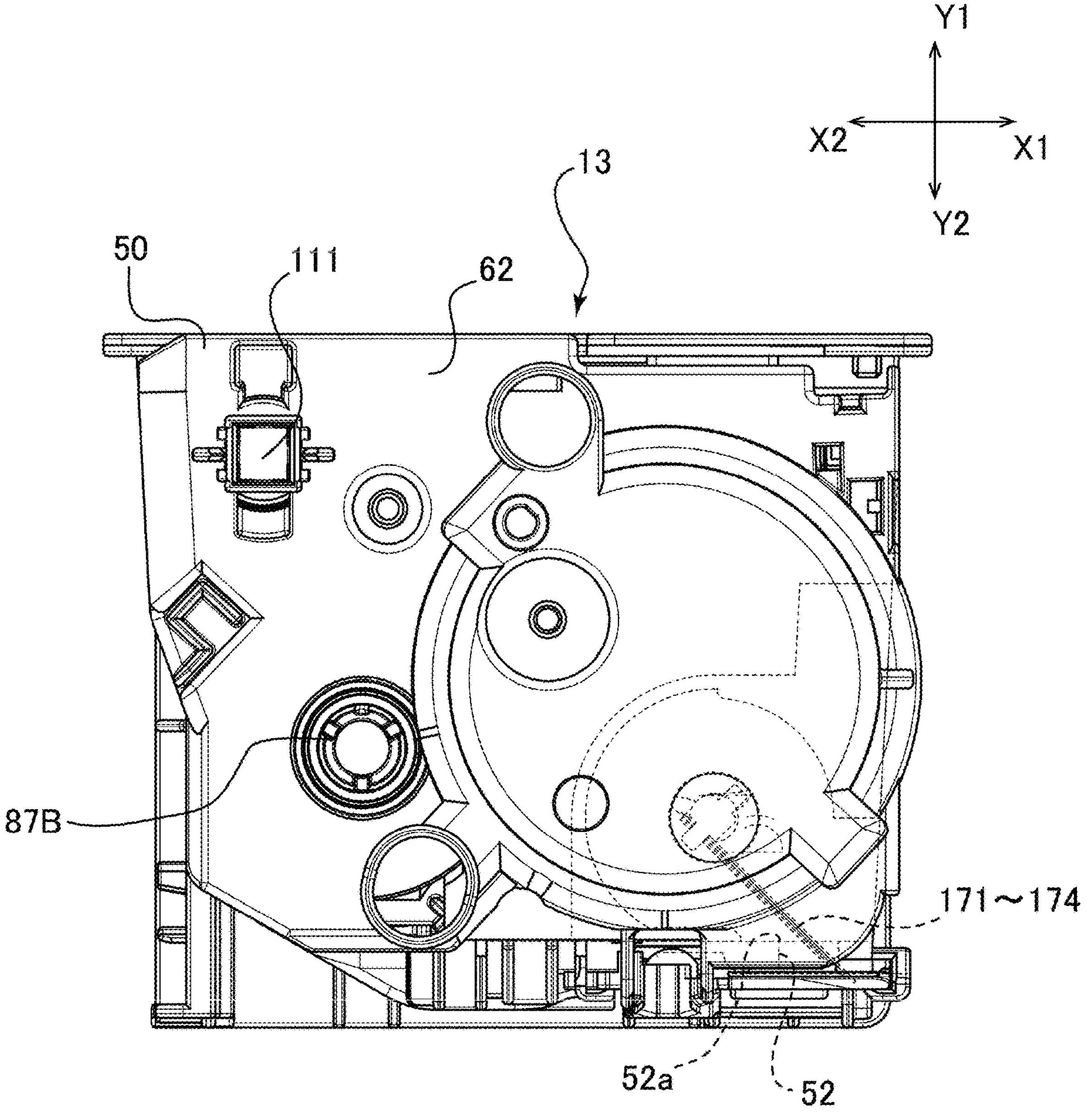

FIG. 39 is a side view showing the toner cartridge.

Figure 40:
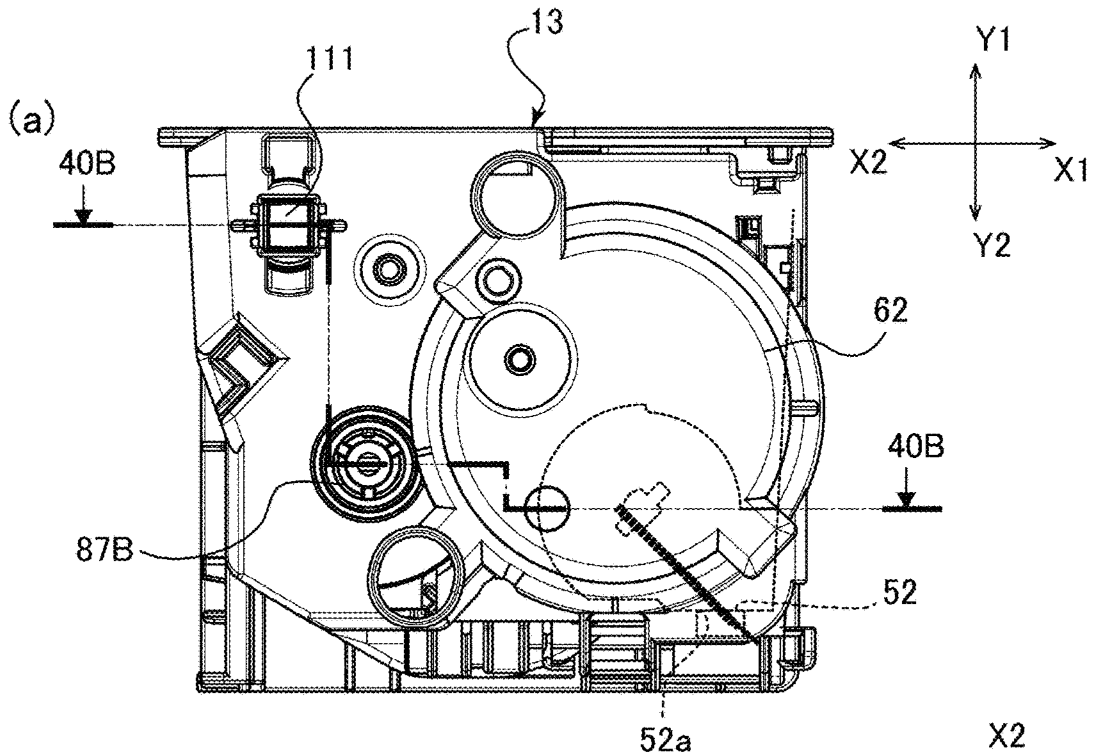
Figure 40:
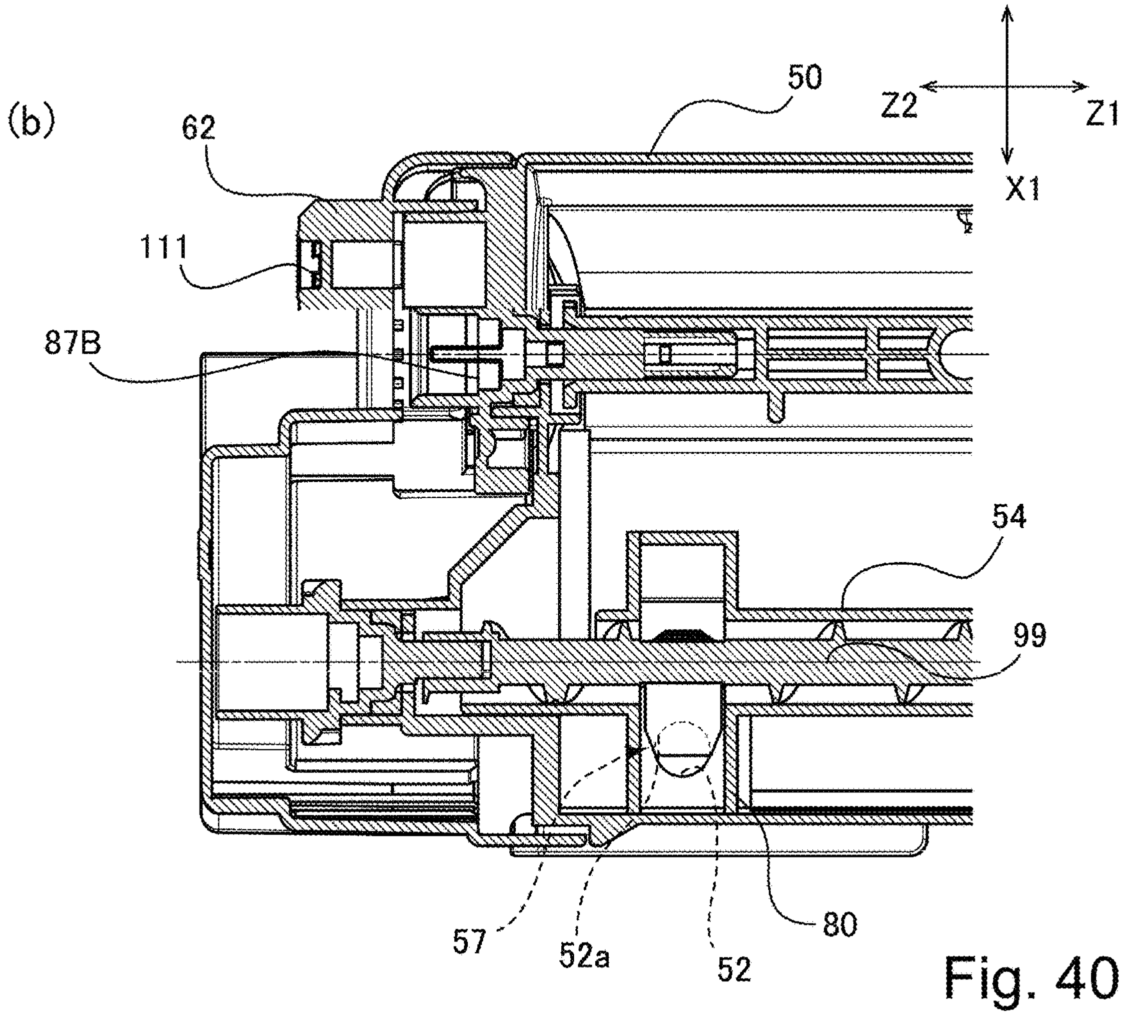

Part (a) of FIG. 40 is a side view of the toner cartridge, and part (b) of FIG. 40 is a cross-sectional view taken along a line 40B-40B indicated in part (a) of FIG. 40.

Figure 41:
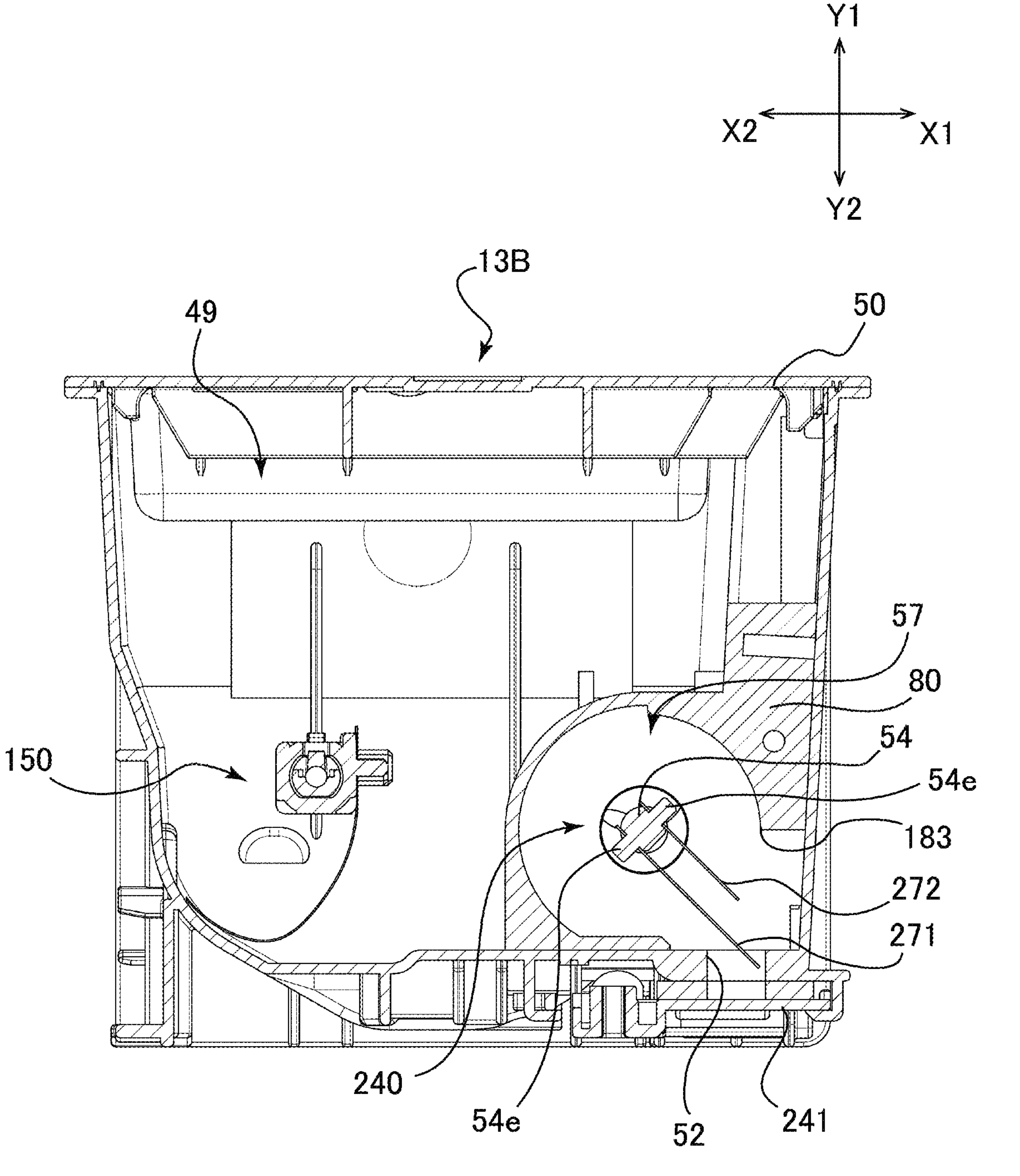

FIG. 41 is a cross-sectional view of the toner cartridge according to Embodiment 2.

Figure 42:
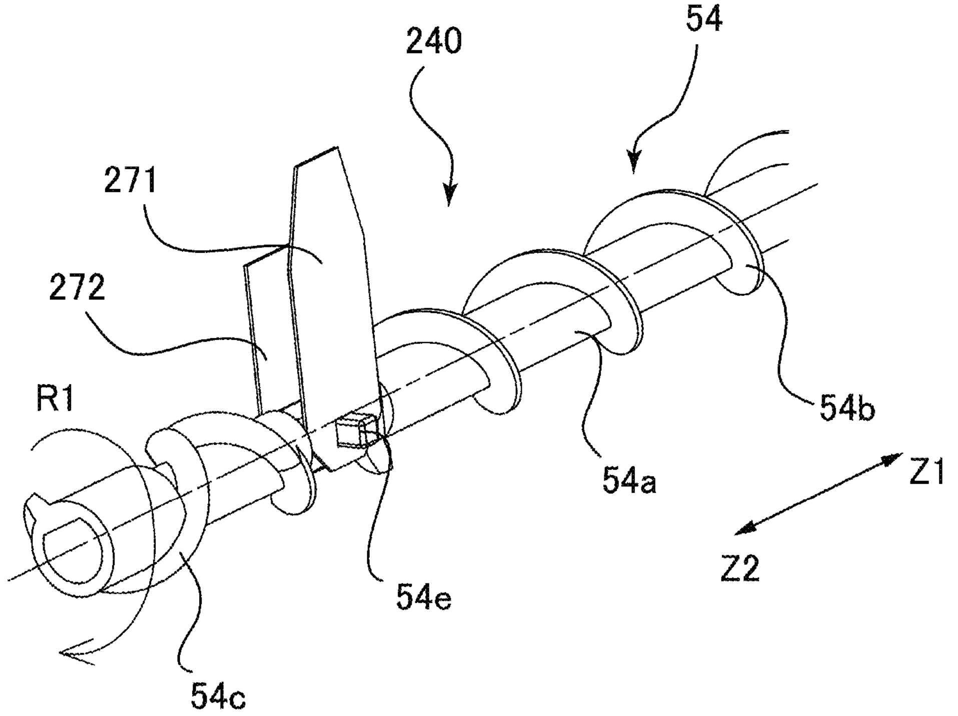
Figure 42:
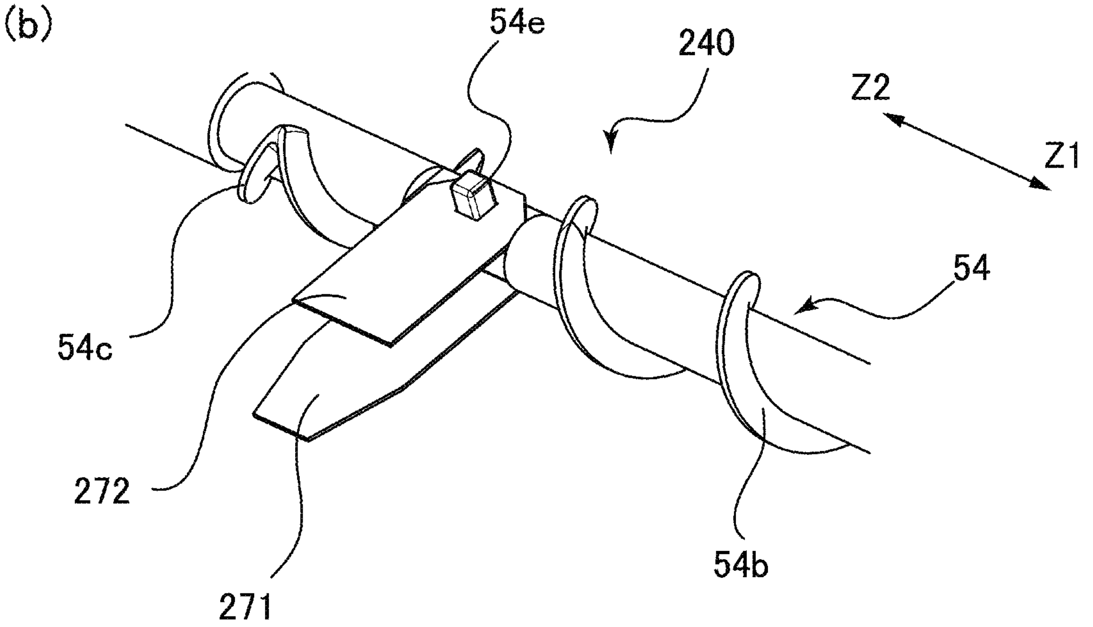

Part (a) of FIG. 42 is a perspective view of the screw unit, and part (b) of FIG. 42 is another perspective view of the screw unit.

Figure 43:
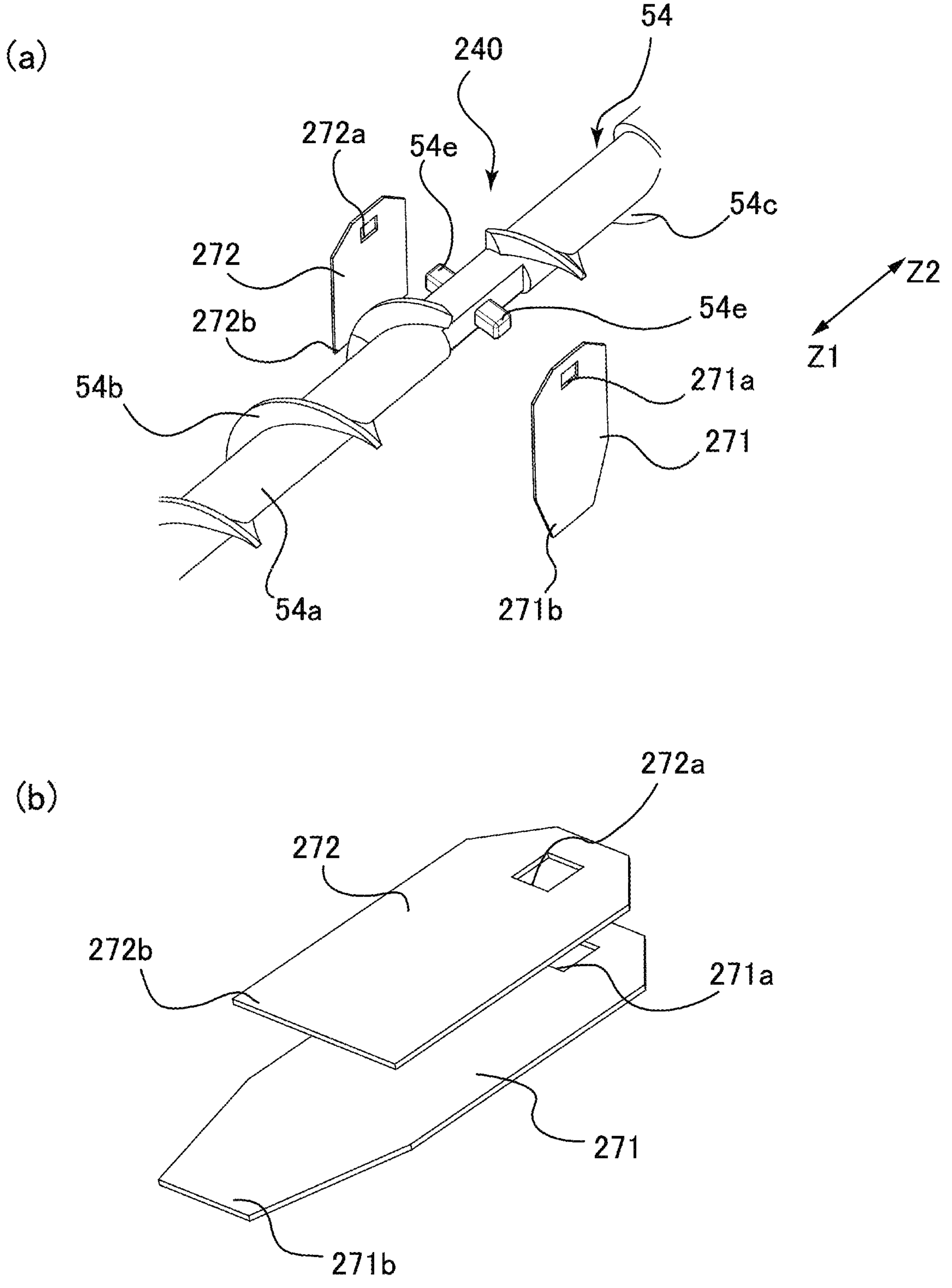

Part (a) of FIG. 43 is an exploded perspective view of the screw unit, and part (b) of FIG. 43 is a perspective view of the discharge sheet.

Figure 44:
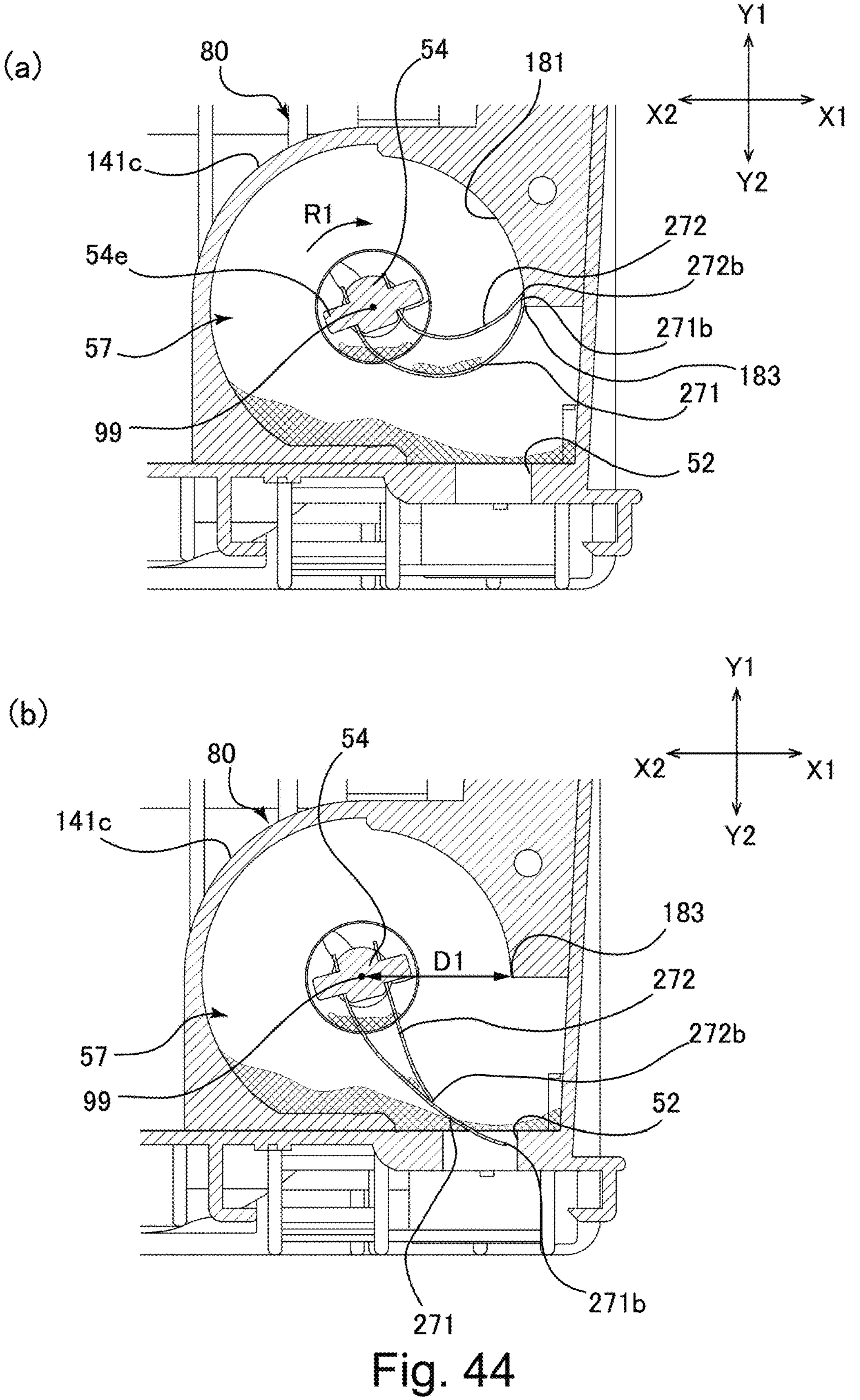

Part (a) of FIG. 44 and part (b) of FIG. 44 are cross-sectional views for illustrating operation of the discharge sheet.

Figure 45:
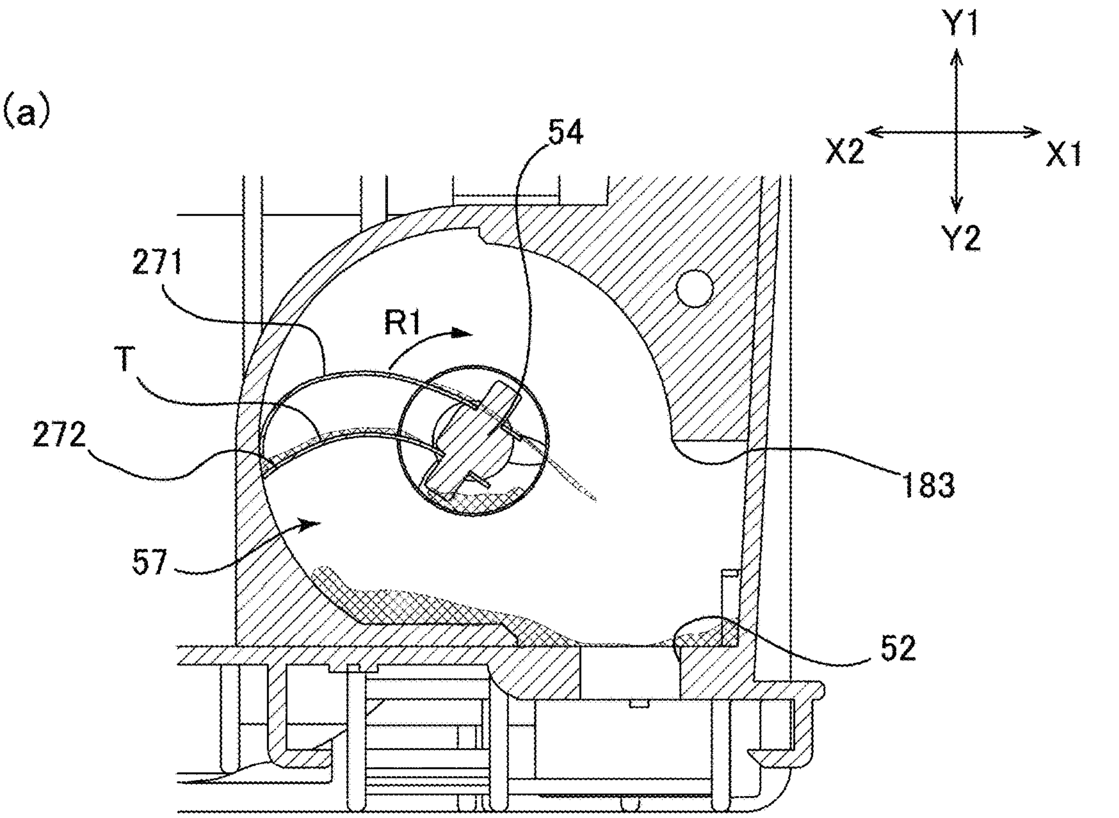
Figure 45:
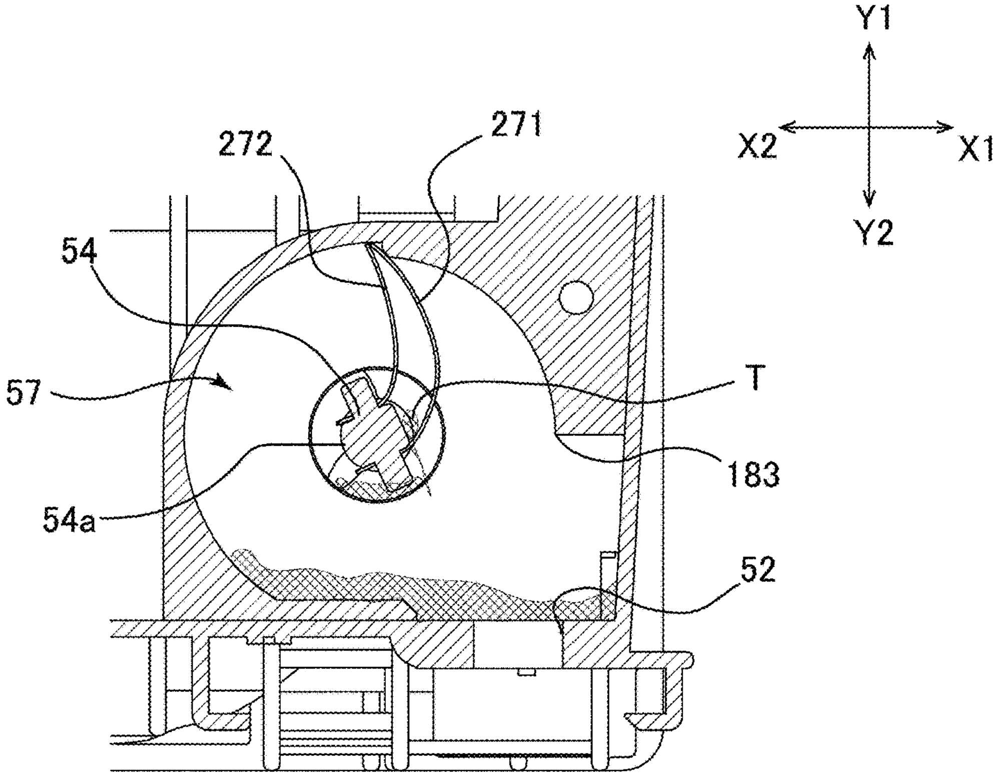

Part (a) of FIG. 45 and part (b) of FIG. 45 are cross-sectional views for illustrating the operation of the discharge sheet.

Figure 46:
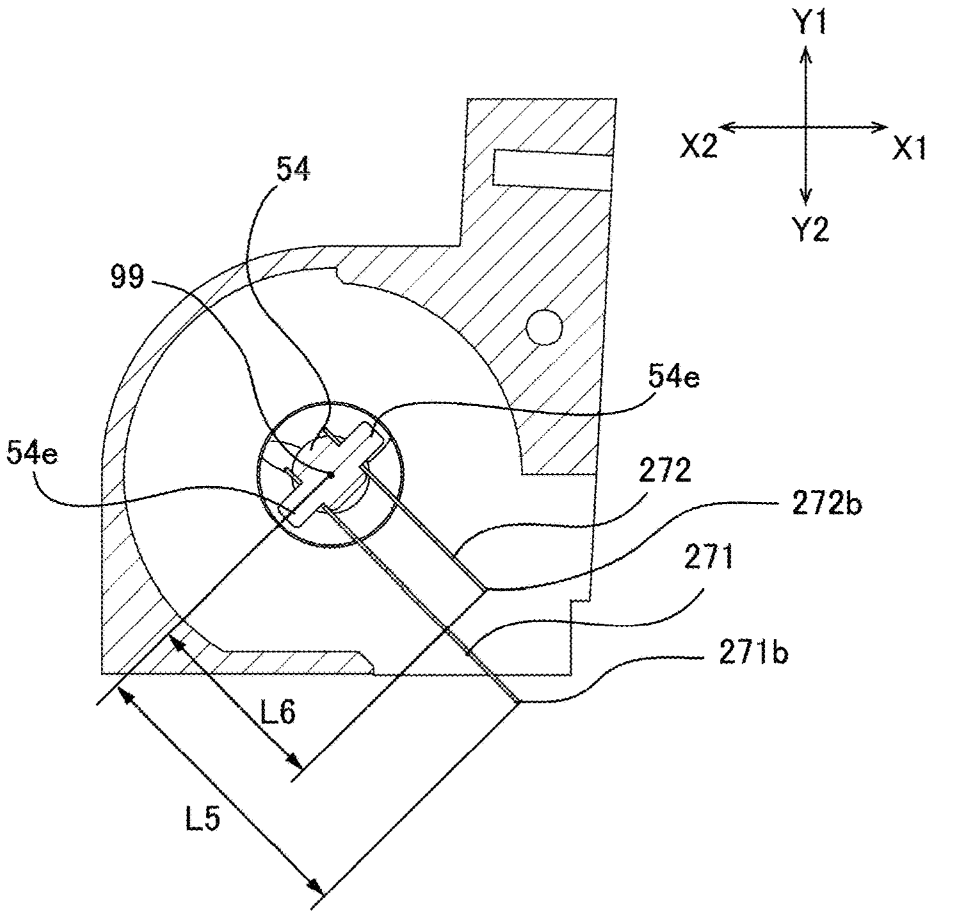
Figure 46:
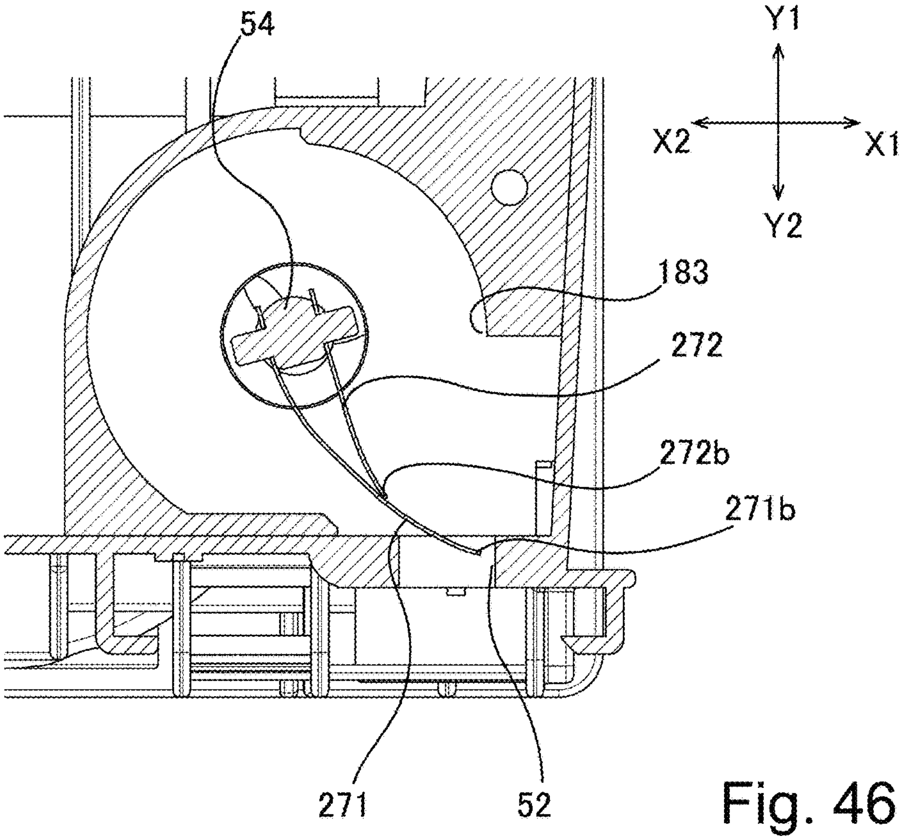

Part (a) of FIG. 46 is a cross-sectional view showing a discharge sheet in a free state, and part (b) of FIG. 46 is a cross-sectional view of the discharge sheet immediately after passing through the jump platform.

Figure 47:
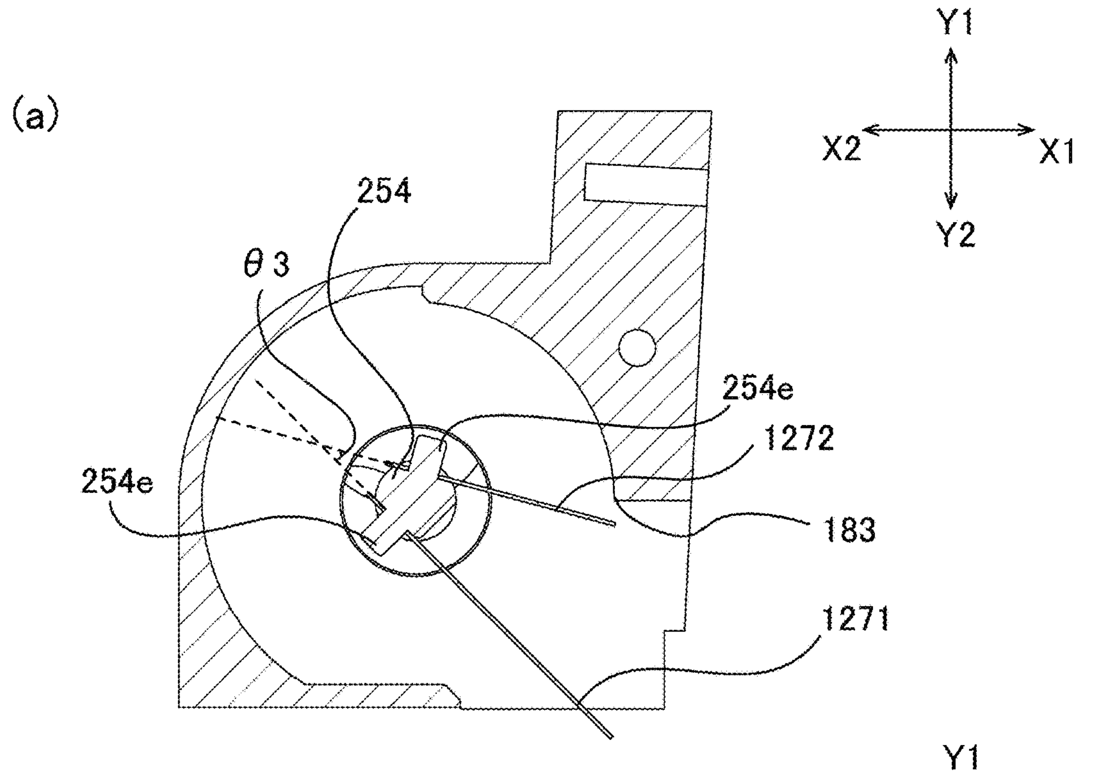
Figure 47:
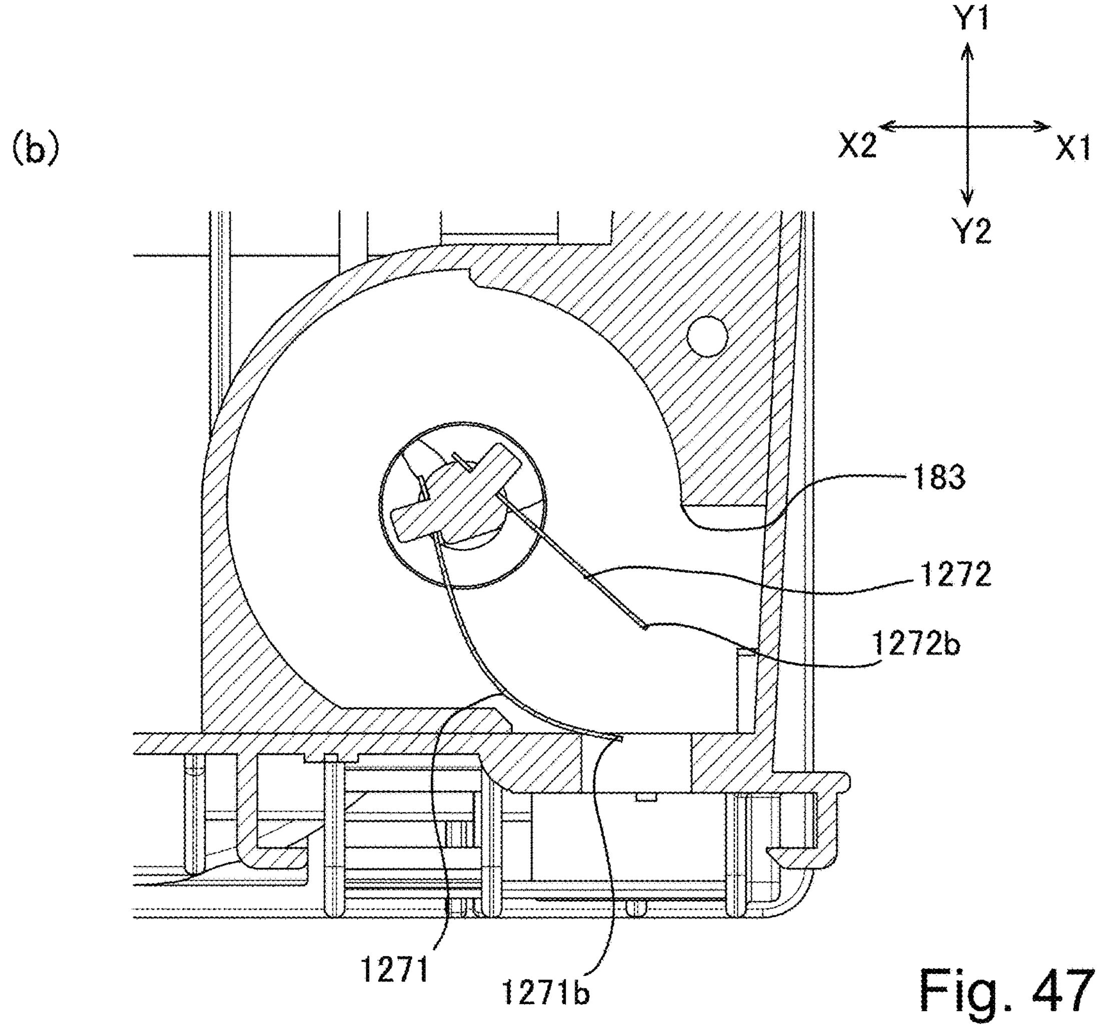

Part (a) of FIG. 47 is a cross-sectional view showing a discharge sheet as a comparative example, and part (b) of FIG. 47 is a cross-sectional view of the discharge sheet immediately after passing through the jump platform.

Figure 48:
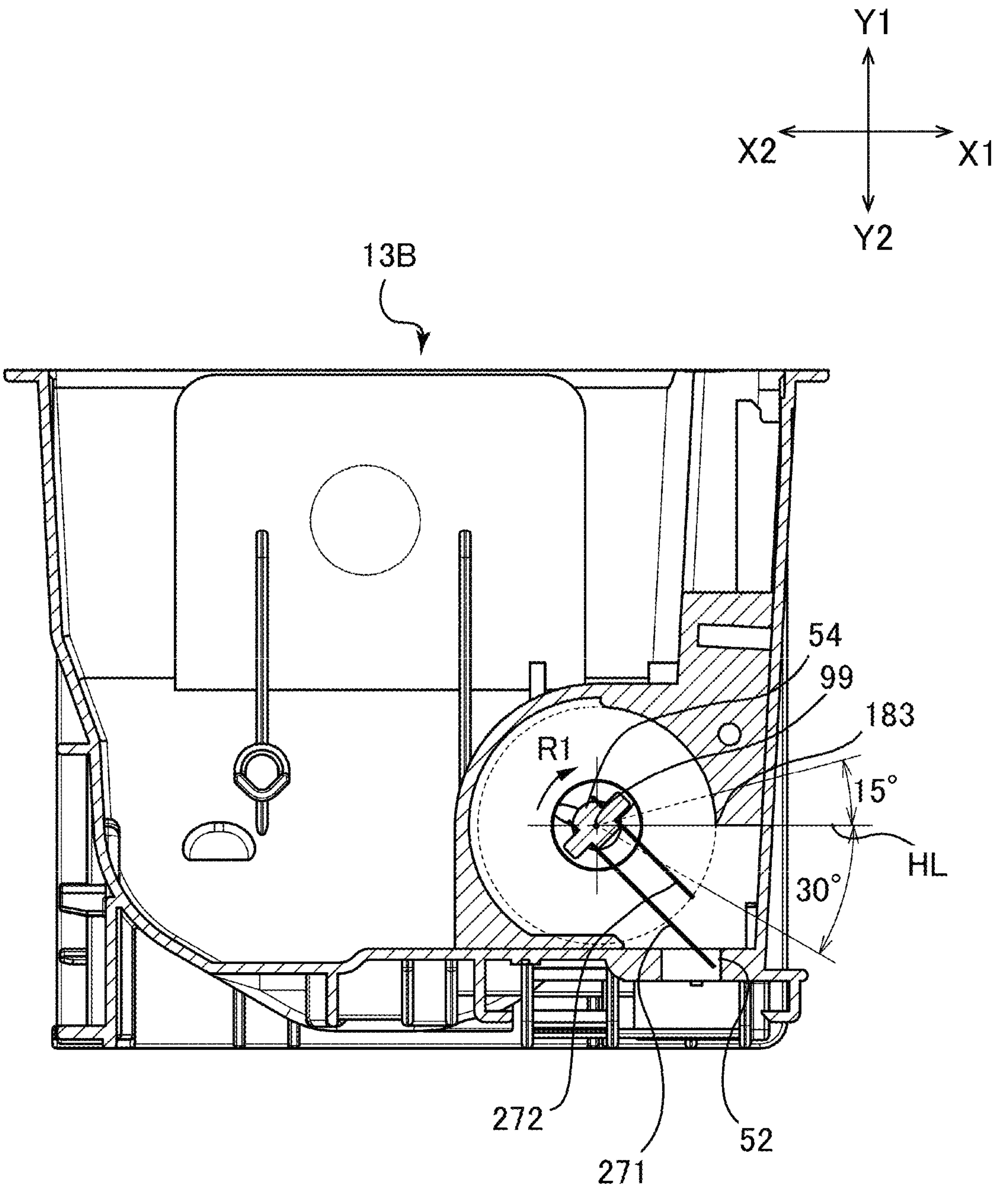

FIG. 48 is a cross-sectional view for illustrating arrangement of the jump platform.

EMBODIMENTS

Embodiment 1

In the following, Embodiment 1 will be described with reference to the accompanying drawings. The dimensions, materials, shapes, and relative arrangements of the components described in the embodiments may be appropriately changed depending on the structure of the device to which the invention is applied and various conditions, and the scope of the invention is not limited to the following embodiments.

[Overall Structure of Image Forming Apparatus]

Figure 1:
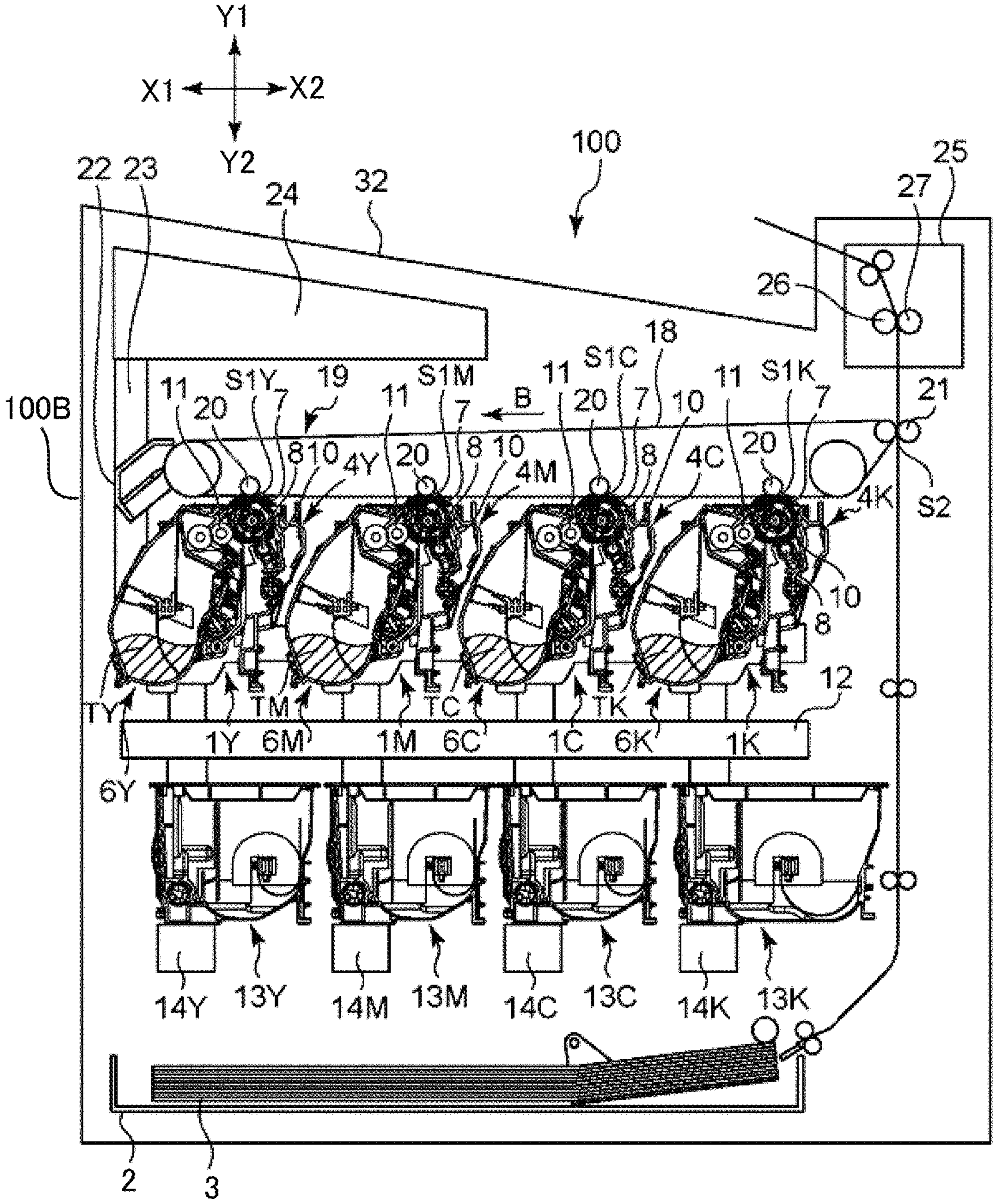
FIG. 1 is a schematic cross-sectional view of an image forming apparatus according to Embodiment 1.

Referring to FIG. 1, overall structure of an image forming apparatus 100 according to Embodiment 1 will be described. FIG. 1 is a schematic illustration showing the image forming apparatus 100, which is an electrophotographic printer according to Embodiment 1. In this embodiment, the process cartridge 1 and the toner cartridge 13 are detachably mounted to a main assembly 100B of the image forming apparatus 100. The image forming apparatus 100 excluding the cartridges (1, 13) may be referred to as the main assembly of the image forming apparatus 100 or the main assembly 100B. The main assembly 100B is structured to receive the toner discharged from the toner cartridge 13.

In this embodiment, the structures and operations of first to fourth image forming portions are substantially the same except that the colors of the images to be formed by them are different. Therefore, in the following, subscripts Y to K will be omitted and the description will be made generally, unless distinction between them is particularly required.

First to fourth process cartridges 1 are arranged in line horizontally. Each process cartridge 1 comprises a cleaning unit 4 and a developing unit 6. The cleaning unit 4 includes a photosensitive drum 7 as an image bearing member, a charging roller 8 as a charging means for uniformly charging the surface of the photosensitive drum 7, and a cleaning blade 10 as a cleaning means.

The developing unit 6 includes a developing roller 11 and a developer (hereinafter, toner) T, and includes a developing means for developing an electrostatic latent image on the photosensitive drum 7. The cleaning unit 4 and the developing unit 6 are supported so as to be able to swing relative to each other. The first process cartridge 1Y contains yellow (Y) toner in the developing unit 6. Similarly, the second process cartridge 1M contains magenta (M) toner, the third process cartridge 1C contains cyan (C) toner, and the fourth process cartridge 1K contains black (K) toner.

The process cartridge 1 is detachably mountable to the main assembly of the image forming apparatus 100 by way of mounting means such as a mounting guide (not shown) and a positioning member (not shown) provided in the main assembly of the image forming apparatus 100. In addition, a scanner unit 12 for forming an electrostatic latent image is provided below the process cartridge 1. Further, a waste toner conveying unit 23 is provided behind the process cartridge 1 in the image forming apparatus (on a side downstream of the process cartridge 1 in the mounting direction of the process cartridge 1)

The first to fourth toner cartridges 13 are arranged horizontally, below the process cartridges 1 in an order corresponding to the colors of the toner contained in the respective process cartridges 1. In the following description, the toner cartridges 13 may be simply called cartridges 13.

The first cartridge 13Y contains yellow (Y) toner, and similarly, the second cartridge 13M contains magenta (M) toner, the third cartridge 13C contains cyan (C) toner, and the fourth cartridge 13K contains black (K) toner. Each cartridge 13 supplies toner to the process cartridge 1 containing the same color toner.

The toner supply operation (supply operation) by the cartridge 13 is carried out when a remaining amount detection unit (not shown) provided in the apparatus main assembly 100B of the image forming apparatus 100 detects a shortage of toner in the process cartridge 1. The cartridge 13 is detachably mountable to the image forming apparatus 100 by way of mounting means such as a mounting guide (not shown) and a positioning member (not shown) provided on the main assembly of the image forming apparatus 100.

When the toner cartridge 13 and the process cartridge 1 are to be distinguished from each other, one may be called the first cartridge and the other the second cartridge. The process cartridge 1 and the cartridge 13 will be described in detail hereinafter.

Inside the main assembly of the image forming apparatus 100, the first to fourth toner conveying devices 14 are disposed below the first to fourth cartridges 13 corresponding to the respective cartridges 13. Above the process cartridge 1, an intermediary transfer unit 19 is provided as an intermediary transfer member. The intermediary transfer unit 19 is disposed extending substantially horizontally with the primary transfer portion S1 side facing downward.

The intermediary transfer belt 18 facing each photosensitive drum 7 is a rotatable endless belt stretched around a plurality of tension rollers. On the inner surface of the intermediary transfer belt 18, primary transfer rollers 20 as primary transfer members are provided at positions to form primary transfer portions S1 with the respective photosensitive drums 7 so as to interpose the intermediary transfer belt 18 therebetween. In addition, the secondary transfer rollers 21 as secondary transfer members contact the intermediary transfer belt 18 to form a secondary transfer portion S2 with the opposing roller with the intermediary transfer belt 18 therebetween. Furthermore, a cleaning unit 22 is provided on the opposite side of the secondary transfer portion S2 in the left-right direction (opposite from the secondary transfer portion S2 in the direction in which the intermediary transfer belt is extended)

A fixing unit 25 is provided above the intermediary transfer unit 19. The fixing unit 25 comprises a heating unit 26 and a pressure roller 27 which is in pressure contact with the heating unit 26. In addition, a discharge tray 32 is provided on the upper surface of the apparatus main assembly 100B, and a waste toner collection container 24 is provided between the discharge tray 32 and the intermediary transfer unit 19. Furthermore, a paper feed tray 2 for accommodating recording material 3 is provided at the bottom of the apparatus main assembly 100B.

Figure 2:
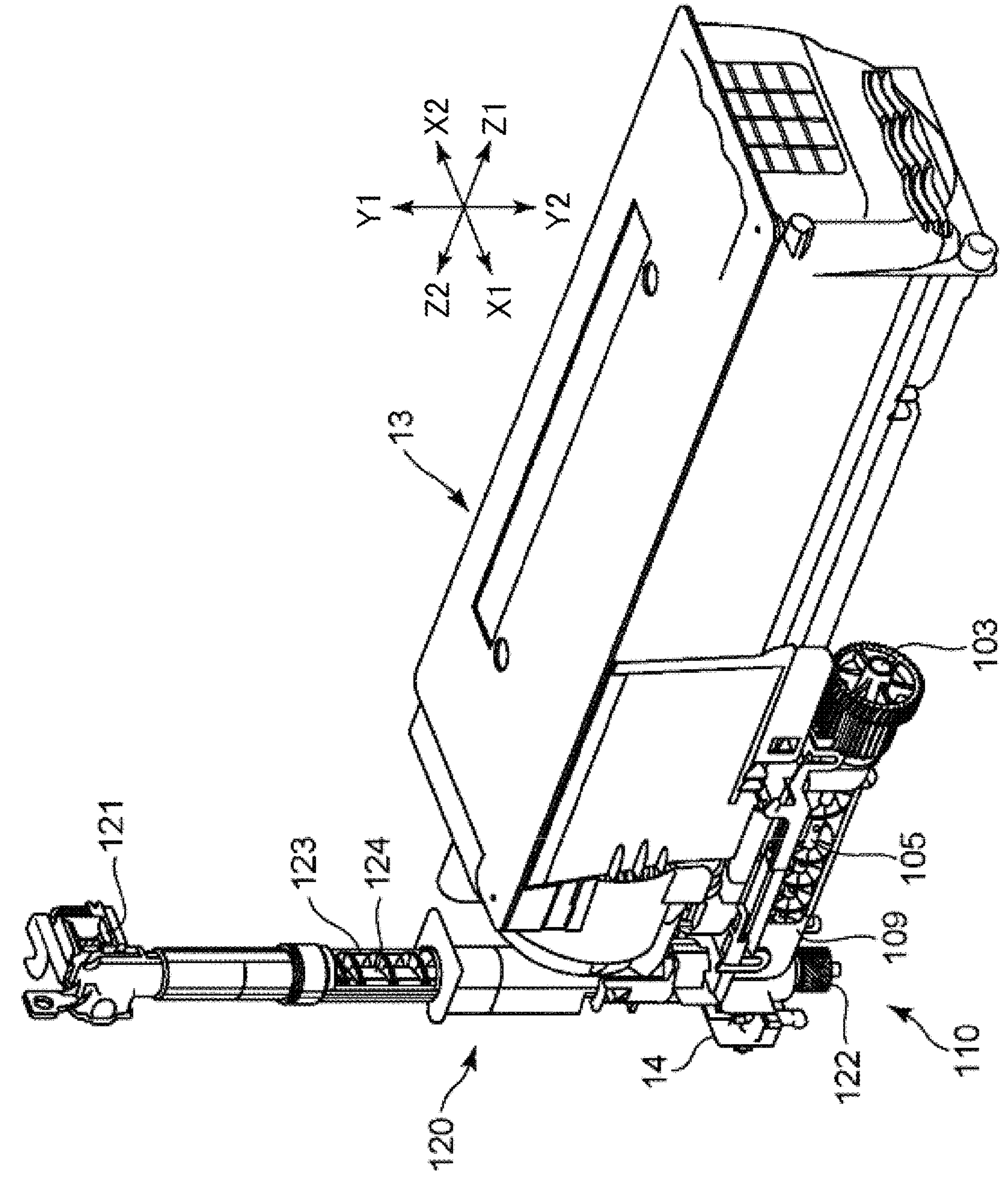
FIG. 2 is a schematic structure illustration of a toner feeding device mounted on an image forming apparatus.

FIG. 2 shows schematically a structure of the toner conveying device 14 mounted on the main assembly 100B of the image forming apparatus 100. Here, in FIG. 2, a part is cut away to show an internal structure of the toner conveying device 14. The toner conveying device 14 as a supply portion generally comprises an upstream conveying portion 110 and a downstream conveying portion 120.

A receiving port 247 (see FIG. 34) is provided on the upper surface of the upstream conveying portion 110. The toner supplied from the toner cartridge 13 (i.e., the toner discharged through the discharge opening 52 in part (a) of FIG. 8 which will be described hereinafter) is supplied into the storage container 109 inside the upstream conveying portion 110 through the receiving port 247. Here, in the state that the toner cartridge 13 is mounted to the main assembly 100B of the image forming apparatus, the discharge opening 52 opens downward.

The toner supplied to the storage container 109 is transported by the upstream screw 105 covered by the storage container 109. The upstream screw 105 is rotated by the upstream drive gear 103 and transports the toner toward the downstream conveying portion 120.

The downstream conveying portion 120 is provided with a downstream wall surface 123, and a downstream screw 124 is provided inside the downstream wall surface 123. The most upstream part of the downstream conveying portion 120 is connected to the most downstream part of the upstream conveying portion 110, and the toner transported by the upstream conveying portion 110 is transported by the downstream screw 124.

The downstream screw 124 is rotated by the downstream drive gear 122 to transport the toner in the direction opposite to gravity (Y1 direction). The downstream screw 124 supplies the toner transported in the direction against gravity (Y1 direction) to the process cartridge 1 shown in FIG. 1 through the main assembly discharge opening 121.

More specifically, the toner discharged through the main assembly discharge opening 121 is replenished into the developing unit 6 through the receiving port 40 provided in the developing unit 6 of the process cartridge 1 as a cartridge shown in part (b) of FIG. 5 described hereinafter.

In this way, the main assembly of the image forming apparatus receives the toner discharged from the toner cartridge 13 in the storage container 109, and then supplies the toner into the process cartridge 1 by the upstream screw 105 and the downstream screw 124. By this, the toner is transported between the different cartridges 13 and 1.

[Image Forming Process]

Next, Referring to FIG. 1 and FIG. 3, the image forming operation in the image forming apparatus 100 will be explained. During image formation, the photosensitive drum 7 is rotated at a predetermined speed in the direction of the arrow A in FIG. 3. The intermediary transfer belt 18 is rotated in the direction of the arrow B (the forward direction of the rotation of the photosensitive drum 7)

First, the surface of the photosensitive drum 7 is uniformly charged by the charging roller 8. Next, the surface of the photosensitive drum 7 is scanned and exposed with laser light irradiated from the scanner unit 12, so that an electrostatic latent image based on image information is formed on the photosensitive drum 7. The electrostatic latent image formed on the photosensitive drum 7 is developed into a toner image by the developing unit 6. At this time, the developing unit 6 is pressed by a development pressing unit (not shown) provided in the main assembly of the image forming apparatus 100. Then, the toner image formed on the photosensitive drum 7 is primarily transferred onto the intermediary transfer belt 18 by the primary transfer roller 20.

For example, when a full-color image is to be formed, the above-described process is sequentially performed in the image forming portions S1Y to S1K, which are the first to fourth primary transfer units, so that the toner images of respective colors are sequentially superimposed on the intermediary transfer belt 18.

Meanwhile, the recording material 3 stored in the paper feed tray 2 is fed at predetermined control timing and is conveyed to the secondary transfer portion S2 in synchronization with the movement of the intermediary transfer belt 18. Then, the four-color toner image on the intermediary transfer belt 18 is secondarily transferred all together onto the recording material 3 by the secondary transfer roller 21 which is in contact with the intermediary transfer belt 18 by way of the recording material 3.

Thereafter, the recording material 3 now having the transferred toner image is conveyed to the fixing unit 25. The fixing unit 25 heats and presses the recording material 3, thereby fixing the toner image on the recording material 3. Then, the recording material 3 now having the fixed toner image is conveyed to the discharge tray 32, thereby completing the image forming operation.

In addition, primary transfer residual toner (waste toner) remaining on the photosensitive drum 7 after the primary transfer operation is removed by the cleaning blade 10. The secondary transfer residual toner (waste toner) remaining on the intermediary transfer belt 18 after the secondary transfer operation is removed by the cleaning unit 22. The waste toner removed by the cleaning blade 10 and the cleaning unit 22 is transported by a waste toner conveying unit 23 provided in the main assembly of the apparatus and is accumulated in a waste toner collection container 24. The image forming apparatus 100 can also form a monochromatic or multi-color image by using only a desired single or some (not all) image forming units.

[Process Cartridge]

Figure 3:
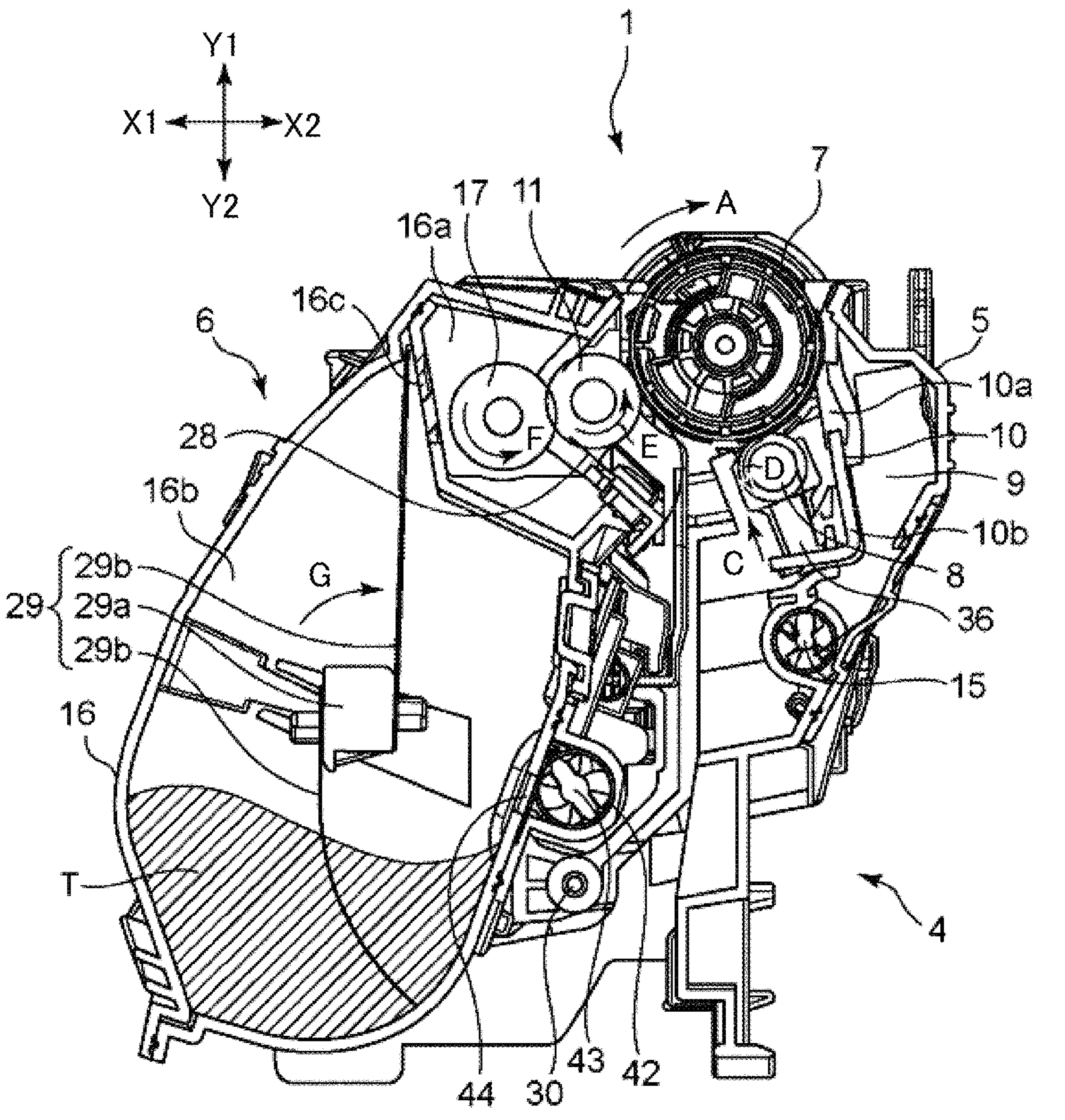
FIG. 3 is a cross-sectional view of a process cartridge.
Figure 4:
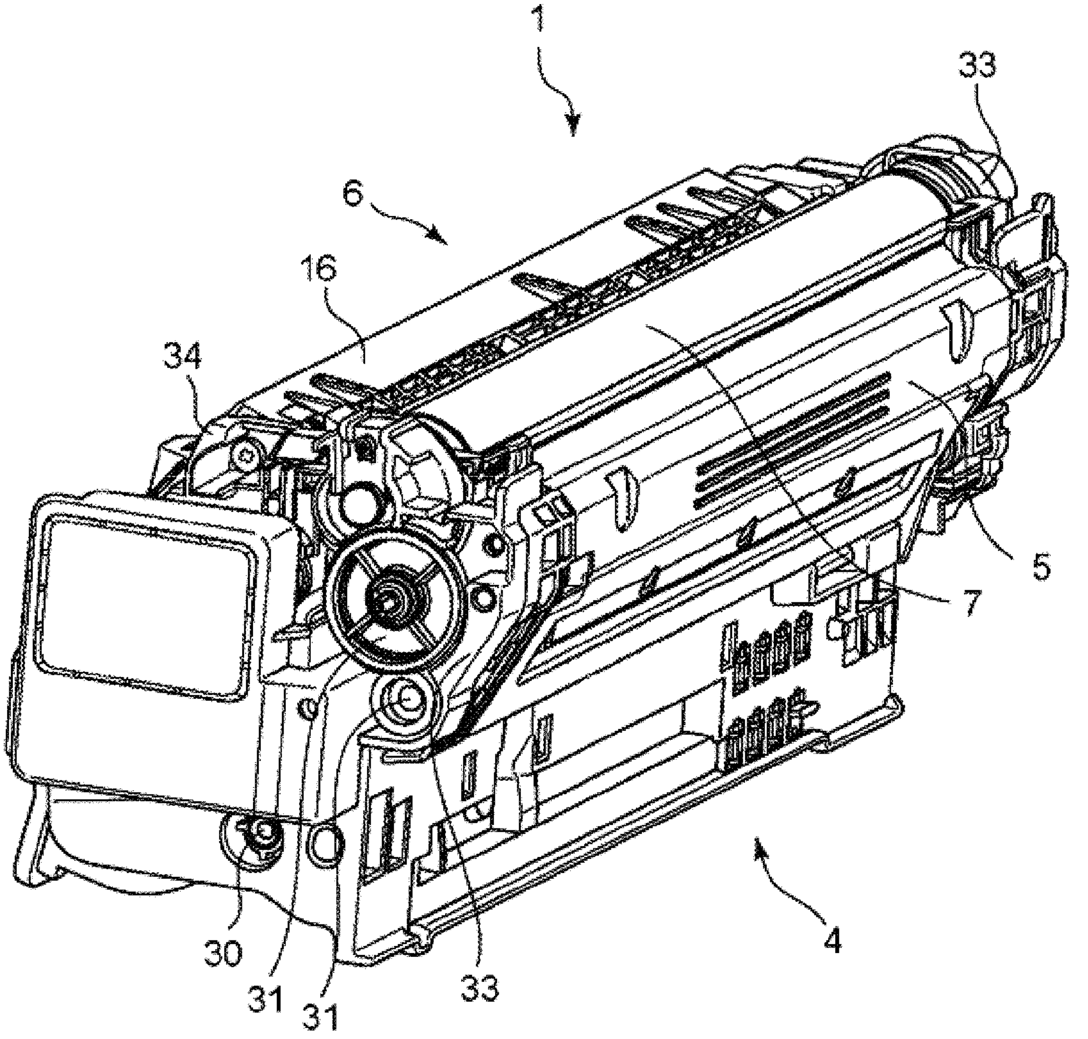
FIG. 4 is an overall perspective view of the process cartridge as viewed from a front side.

Referring to FIG. 3 to part (b) of FIG. 5, the overall structure of the process cartridge 1 to be mounted in the main assembly of the image forming apparatus 100 according to this embodiment will be described. FIG. 3 is a cross-sectional view of the process cartridge 1 according to this embodiment. FIG. 4 is a perspective view of the process cartridge 1 as viewed from an upstream side in a process cartridge mounting direction. Part (a) of FIG. 5 and part (b) of FIG. 5 are perspective views of the process cartridge 1 as viewed from a downstream side in the process cartridge mounting direction.

The process cartridge 1 comprises a cleaning unit 4 and a developing unit 6. The cleaning unit 4 and the developing unit 6 are coupled to each other swingably about a rotation support pin 30.

The cleaning unit 4 has a cleaning frame 5 supporting various members therein. The cleaning unit 4 includes the photosensitive drum 7, the charging roller 8, and the cleaning blade 10, and also includes a waste toner conveying screw 15 extending in a direction parallel to the rotation axis of the photosensitive drum 7. The cleaning frame 5 is provided with cleaning bearings 33 disposed at opposite ends of the cleaning unit 4, and the photosensitive drum 7 is rotatably supported by these cleaning bearings 33. The cleaning bearing 33 on the upstream side in the process cartridge mounting direction is provided with a cleaning gear train 31 for transmitting drive from the photosensitive drum 7 to the waste toner conveying screw 15.

The charging roller 8 provided in the cleaning unit 4 is urged in the direction of arrow C toward the photosensitive drum 7 by charging roller pressure springs 36 provided at respective ends. The charging roller 8 is provided to be driven by the photosensitive drum 7, and when the photosensitive drum 7 is rotated in the direction of arrow A during image forming operation, the charging roller 8 rotates in the direction of arrow D (the forward direction of the rotation of the photosensitive drum 7)

The cleaning blade 10 provided in the cleaning unit 4 comprises an elastic member 10*a* for removing residual toner (waste toner) remaining on the surface of the photosensitive drum 7 after the primary image transfer, and a support member 10*b* for supporting the elastic member 10*a*. The residual toner removed from the surface of the photosensitive drum 7 by the cleaning blade 10 is accommodated in a waste toner accommodating chamber 9 formed by the cleaning blade 10 and the cleaning frame 5. The waste toner accommodated in the waste toner accommodating chamber 9 is transported toward the rear of the image forming apparatus 100 (downstream in the mounting and demounting direction of the process cartridge 1) by the waste toner conveying screw 15 provided in the waste toner accommodating chamber 9. The transported waste toner is discharged from a waste toner discharge portion 35 and is delivered to the waste toner conveying unit 23 (see FIG. 1) provided in the main assembly of the image forming apparatus 100.

The developing unit 6 includes the developing frame 16 for supporting various members in the developing unit 6. The developing frame 16 is divided into a developing chamber 16*a* in which the developing roller 11 and the supply roller 17 are provided, and a toner accommodating chamber 16*b* in which the toner is stored and a stirring member 29 is provided.

The developing chamber 16*a* is provided with a developing roller 11, a supply roller 17, and a developing blade 28. The developing roller 11 carries the toner, rotates in the direction of an arrow E during image forming operation, and feeds the toner to the photosensitive drum 7 by contacting the photosensitive drum 7. The developing roller 11 is rotatably supported by the developing frame 16 at the opposite ends thereof in its longitudinal direction (rotation axis direction) by the developing bearing units 34.

The supply roller 17 is in contact with the developing roller 11 and is rotatably supported by the developing frame 16 by the developing bearing units 34, and rotates in the direction of an arrow F during image forming operation. The developing blade 28, which acts as a layer thickness restricting member for restricting the thickness of the toner layer formed on the developing roller 11, is provided so as to contact the surface of the developing roller 11.

The toner accommodating chamber 16*b* is provided with a stirring member 29 for stirring the stored toner T and feeding the toner to the supply roller 17 through the developing chamber communication port 16*c*. The stirring member 29 has a rotational shaft 29*a* parallel to the rotation axis direction of the developing roller 11, and a stirring sheet 29*b* which is a flexible sheet. One end of the stirring sheet 29*b* is attached to the rotational shaft 29*a*, and the other end of the stirring sheet 29*b* is a free end, and when the rotational shaft 29*a* rotates, the stirring sheet 29*b* rotates in the direction of the arrow G, and the toner is stirred by the stirring sheet 29*b*.

The developing unit 6 is provided with a developing chamber communication port 16*c* which communicates the developing chamber 16*a* and the toner accommodating chamber 16*b* with each other. In this embodiment, when the developing unit 6 is in a position in which it is normally used (position during use), the developing chamber 16*a* is located above the toner accommodating chamber 16*b*. The toner in the toner accommodating chamber 16*b* supplied up by the stirring member 29 is fed to the developing chamber 16*a* through the developing chamber communication port 16*c*.

Further, the developing unit 6 is provided with a receiving port 40 at one end downstream in the insertion direction of the cartridge 1. An inlet seal member 45 and an inlet shutter 41 movable in the front-rear direction are provided above the receiving port 40. The receiving port 40 is closed by the inlet shutter 41 when the process cartridge 1 is not mounted in the main assembly of the image forming apparatus 100. The inlet shutter 41 is structured to open when it is urged by the main assembly of the image forming apparatus 100 in conjunction with the mounting and dismounting operation of the process cartridge 1.

The developing unit 6 is provided with a receiving conveying path 42 communicating with the receiving port 40, and a receiving and feeding screw 43 is disposed inside the receiving conveying path 42. In addition, an accommodating chamber communication port 44 for supplying toner to the toner accommodating chamber 16*b* is provided in the neighborhood of the longitudinal center of the developing unit 6, and the accommodating chamber communication port 44 communicates the receiving conveying path 42 with the toner accommodating chamber 16*b*. The receiving and feeding screw 43 extends parallel to the directions of the rotation axes of the developing roller 11 and the supply roller 17, and conveys the toner received from the receiving port 40 into the toner accommodating chamber 16*b* through the accommodating chamber communication port 44.

In this embodiment, one process cartridge 1 has both the photosensitive drum 7 and the developing roller 11, but the present invention is not necessarily limited to such a structure. For example, the cleaning unit 4 having the photosensitive drum 7 and the developing unit 6 having the developing roller 11 may not be connected and may be separate cartridges. In such a case, the cartridge having the cleaning unit 4 may be called a drum cartridge, and the cartridge having the developing unit 6 may be called a developing cartridge. In this case, the toner is supplied from the cartridge 13 into the developing cartridge of the developing unit 6.

[Overall Structure of the Toner Cartridge]

Next, referring to part (a) of FIG. 6 to part (b) of FIG. 10, the description will be made as to the overall structure of the toner cartridge 13 mounted in the image forming apparatus 100 according to this embodiment. Part (a) of FIG. 6 is a perspective view of the toner cartridge 13. Part (b) of FIG. 6 is a front view of the toner cartridge 13.

FIG. 7 is a plan view of the toner cartridge 13 as viewed in the Y2 direction with the lid part 50*b* of the supply frame 50 omitted. Part (a) of FIG. 8 is a cross-sectional view taken along a line 8A-8A indicated in FIG. 7. Part (b) of FIG. 8 is a sectional view taken along a line 8B-8B indicated in FIG. 7. FIG. 9 is an enlarged view of part (b) of FIG. 8. Part (a) of FIG. 10 is a plan view of the toner cartridge 13 as viewed in the Y2 direction with the lid part 50*b* of the supply frame 50 and the screw case 80 omitted. Part (b) of FIG. 10 is a perspective view of the screw 54 and the discharging sheets 171, 172, 173, and 174.

The toner cartridge 13 contains toner (developer) in its internal space 51, and is attached to the main assembly 100B of the image forming apparatus 100 (see FIG. 1) in order to supply (supply) the toner to the apparatus main assembly 100B.

In describing the toner cartridge 13, unless otherwise specified, it is assumed that the toner cartridge 13 is in a normal position, that is, the position taken when it is installed into the apparatus main assembly, and directions (X1, X2, Y1, Y2, Z1, Z2) are defined as follows.

The up-down direction is indicated by Y axis. An arrow Y1 indicates the upward direction, and an arrow Y2 indicates the downward direction. The surface provided at the end of the toner cartridge 13 in the Y1 direction is referred to as top surface (upper surface), and the surface provided at the end in the Y2 direction is referred to as bottom surface (bottom, lower part, lower end). The top surface of the toner cartridge 13 faces up (Y1 direction), and the bottom surface faces down (Y2 direction). The Y1 direction and Y2 direction may be collectively referred to as the up-down direction, height direction, vertical direction, gravity direction, or Y direction or Y-axis direction.

The front-rear direction is indicated by Z axis. The direction toward the upstream side in the mounting direction when the toner cartridge 13 is mounted on the main assembly of the image forming apparatus 100 is indicated by the arrow Z1, and the direction toward the downstream side in the mounting direction is indicated by the Z2 direction. For convenience, the Z1 direction is indicated as the front, and the Z2 direction is indicated as the rear. In other words, the surface provided at the end of the toner cartridge 13 in the Z1 direction is referred to as the front surface (front part, front end) of the toner cartridge 13, and the surface provided at the end of the Z2 direction is referred to as the rear surface (rear surface, rear end, rear part). In addition, the Z1 direction side of the toner cartridge 13 may be referred to as the non-driven side, and the Z2 direction side of the toner cartridge 13 may be referred to as the driven side.

The front surface of the toner cartridge 13 faces forward (Z1 direction), and the rear surface faces backward (Z2 direction). An extending direction of the toner cartridge 13 from the front surface to the rear surface (extending in the Z axis direction) is longitudinal direction. The Z1 direction and the Z2 direction may be collectively referred to as the front-rear direction, longitudinal direction, vertical direction, or Z direction or Z-axis direction.

Furthermore, a left-right direction is indicated by the X-axis. For convenience, the direction to the left as viewed along the dismounting direction (i.e., the Z1 direction) in which the toner cartridge 13 is dismounted from the main assembly 100B of the image forming apparatus 100 is indicated by the arrow X1, and the direction to the right is indicated by the arrow X2. The surface at the end of the toner cartridge 13 in the X1 direction is called the left side surface (left surface, left end, left part), and the surface at the end of the X2 direction is referred to as right side surface (right surface, right part, right end) The left side surface of the toner cartridge 13 faces the left direction (X1 direction), and the right side surface faces the right direction (X2 direction). The direction from the left side surface to the right side surface of the toner cartridge 13 (i.e., the extension of the X-axis) is widthwise direction. The X1 direction and the X2 direction are sometimes collectively called the left-right direction, the widthwise direction, the horizontal direction, the X direction, the X-axis direction, and so on.

In other words, the distance between the front and rear surfaces of the toner cartridge 13 is longer than the distance between the right and left sides, and also longer than the distance between the top and bottom. However, this structure is not limiting to the present invention. For example, the distance between the right and left sides of the toner cartridge 13 may be the longest, or the distance between the top and bottom may be the longest.

The X-axis, Y-axis, and Z-axis are perpendicular to each other. For example, the X-axis is perpendicular to the Y-axis and also perpendicular to the Z-axis. Also, a plane perpendicular to the X-axis may be referred to as YZ plane, a plane perpendicular to the Y-axis may be referred to as ZX plane, and a plane perpendicular to the Z-axis may be referred to as XY plane. For example, the ZX plane is a horizontal plane. The X-direction and the Z-direction are directions along the horizontal ZX plane, i.e., horizontal directions.

In this embodiment, the first to third cartridges (13Y, 13M, 13C) which contain toner of colors other than black, namely yellow (Y), magenta (M), and cyan (C), respectively are used as examples for explanation.

The fourth cartridge (13K) that contains black (K) toner has a larger toner capacity than the first to third cartridges (13Y, 13M, 13C) and is otherwise substantially the same. Therefore, explanation of the fourth toner cartridge 13K is omitted.

The toner supplied to the main assembly of the image forming apparatus 100 by the toner cartridge 13 is supplied to the process cartridge 1 by the toner conveying device 14 (see FIG. 2) as described above. In other words, the toner cartridge 13 contains toner to be supplied (replenished) to the process cartridge 1.

As shown in part (a) of FIG. 6 to part (a) of FIG. 10, the toner cartridge 13 (13Y, 13M, 13C) of this embodiment includes a supply frame 50 as a casing. The supply frame 50 includes the container part 50*a* and the lid part 50*b*, and is formed by attaching the lid part 50*b* to the container part 50*a*. The container part 50*a* and the lid part 50*b* define an internal space 51 inside the supply frame 50. The lid part 50*b* is located at the end of the toner cartridge 13 in the Y1 direction, and provides the top surface of the toner cartridge 13 and the supply frame 50.

The toner cartridge 13 includes a screw unit 140 and a stirring unit 150, which are disposed in the internal space 51 of the supply frame 50. As shown in FIGS. 7, 9, and part (a) of FIG. 10 and part (b) of FIG. 10, the screw unit 140 includes a screw 54, a plurality of (four in this embodiment) discharging sheets 171-174 fixed to the screw 54, and a screw case 80. The screw 54 is disposed so as to penetrate the screw case 80, and the screw case 80 covers a part of the screw 54 and all of the discharging sheets 171-174.

The screw case 80 divides the internal space 51 of the supply frame 50 into a plurality of regions. That is, the internal space 51 is divided by the screw case 80 into a plurality of chambers, namely, the toner accommodating chamber 49, the communication passage 48, and the toner discharge chamber 57. The toner accommodating chamber 49 is a chamber for accommodating the toner (accommodating chamber). The toner discharge chamber 57 is a chamber in which the discharging sheets 171-174 are covered by the screw case 80 and the supply frame 50, and has a smaller volume than the toner accommodating chamber 49.

The toner discharge chamber 57 is formed by the screw case 80 and the supply frame 50, and is provided with the discharge opening 52 shown in part (a) of FIG. 8. The toner discharge chamber 57 is disposed downstream of the communication passage 48 in the Z2 direction, and communicates with the outside of the toner cartridge 13 through the discharge opening 52. The downstream end of the screw case 80 in the Z2 direction is opened by the opening (communication port, communication passage) 48*b* (see part (b) of FIG. 8), so that the toner discharge chamber 57 is a chamber which is in fluid communication with the toner accommodating chamber 49 through the opening 48*b*. The toner discharge chamber 57 also includes the discharging sheets 171-174, which rotate together with the screw 54 around the rotation axis 99 (see part (a) of FIG. 37) and have the function of vigorously discharging the toner fed into the toner discharge chamber 57 through the discharge opening 52 to the outside of the toner cartridge 13.

The communication passage 48 is a chamber in which part of the screw 54 is covered by the screw case 80, and provides a toner path which connects the toner accommodating chamber 49 and the toner discharge chamber 57. The above-described division of the internal space 51 of the supply frame 50 is merely an example, and the layout can be changed as needed.

As shown in FIG. 7 and part (a) of FIG. 8, the stirring unit 150 has a stirring shaft 151 rotatably supported by the supply frame 50, and a stirring sheet 152 fixed to the stirring shaft 151. The stirring shaft 151 extends in the Z direction. The stirring unit 150 rotates to stir the toner stored in the toner accommodating chamber 49 and transport the toner toward the screw 54.

As shown in FIG. 7 to part (b) of FIG. 10, the container part 50*a* of the supply frame 50 includes two walls 50*a*1, 50*a*2 which rise upward (in the Y1 direction) and are arranged side by side in the X direction. The screw 54 extending in the Z direction is disposed close to the walls 50*a*1, 50*a*2 and is disposed so as to be sandwiched between the walls 50*a*1, 50*a*2 in the X direction. The screw 54 can stably feed the toner around it by being sandwiched between the walls 50*a*1, 50*a*2.

In addition, there is provided a space between the walls 50*a*1, 50*a*2 and the lid part 50*b* of the supply frame 50. Therefore, the stirring unit 150 can feed the toner to the screw 54 through the space between the walls 50*a*1, 50*a*2 and the lid part 50*b*.

The toner in the toner accommodating chamber 49 is conveyed toward the screw 54 by the stirring unit 150, and is further conveyed by the screw 54 to the communication passage (communication port) 48. The tunnel shape of the communication passage 48 is formed to correspond to the outer shape of the screw 54. In other words, the communication passage 48 has a tunnel shape surrounding the periphery of the screw 54 and extends along the screw 54 in the Z-axis direction.

The communication passage 48 levels off the toner fed by the screw 54, thus restricting the amount of toner passing through the inside of the communication passage 48. In other words, the communication passage 48 has the function of metering the toner. In order to control the amount of toner passing through with greater precision, it is preferable that the communication passage 48 extends long along the Z direction, which is the toner feeding direction, but this is not necessarily limiting. For example, the length of the communication passage 48 in the toner transport direction may be very short.

A part of the toner conveyed by the screw 54 can enter the inside of the communication passage 48 and can move to the toner discharge chamber 57, but the rest of the toner cannot enter the communication passage 48, thus remaining in the toner accommodating chamber 49. The amount of toner entering the inside of the communication passage 48 can be appropriately determined by appropriately setting the ratio between the size of the opening of the tunnel formed by the communication passage 48 and the size of the screw 54. In other words, by the screw 54 passing through the inside of the communication passage 48, only the desired amount of toner can be supplied into the toner discharge chamber 57.

The screw 54 includes a rotational shaft 54*a*, and a first spiral 54*b* and a second spiral 54*c* formed integrally with the rotational shaft 54*a*. The first spiral 54*b* conveys the toner in a direction (Z2 direction) from the front surface (front end) of the toner cartridge 13 toward the rear surface (rear end)

thereof. The second spiral 54*c* conveys the toner in the direction (Z1 direction) from the rear surface (rear end) of the toner cartridge 13 toward the front surface (front end) thereof. The first spiral 54*b* is formed in a range from the downstream end of the rotational shaft 54*a* in the Z1 direction to a position downstream of the discharging sheets 171 to 174 in the Z2 direction. On the other hand, the second spiral 54*c* is formed only at the downstream end portion of the rotational shaft 54*a* in the Z2 direction and is disposed outside the screw case 80.

The toner conveyed into the toner discharge chamber 57 through the communication passage 48 by the first spiral 54*b* of the screw 54 is forcefully discharged through the discharge opening 52 to the outside of the toner cartridge 13 by the discharging sheets 171 to 174. Then, a part of the toner remaining in the toner discharge chamber 57 is further conveyed in the Z2 direction by the first spiral 54*b* and fed through the opening 48*b* to the outside of the screw case 80, i.e., to the toner accommodating chamber 49. That is, the screw 54 as the feeding member conveys the toner from the toner accommodating chamber 49 through the communication passage 48 into the toner discharge chamber 57 in the Z direction (Z2 direction), which is the axial direction of a coupling 87B (see part (b) of FIG. 14 which will be described hereinafter.

As described above, the toner discharge chamber 57 is in fluid communication with the communication passage 48 and the toner accommodating chamber 49 at the ends in the Z1 and Z2 directions, respectively. That is, the toner discharge chamber 57 is not a space sealed by the screw case 80 and the supply frame 50. When, for example, the amount of toner conveyed from the communication passage 48 by the screw 54 is greater than the amount of the toner discharged through the discharge opening 52, the toner in the toner discharge chamber 57 can be released to the toner accommodating chamber 49 through the opening 48*b*. This can prevent the toner from clogging the toner discharge chamber 57.

And, in the toner accommodating chamber 49, the toner conveyed in the Z2 direction by the first spiral 54*b* and the toner conveyed in the Z1 direction by the second spiral 54*c* collide with each other, and these toners are urged to move in a radial direction perpendicular to the rotation axis direction (Z direction) of the screw 54. This allows the toner to circulate again into the stirring unit 150, and the toner in the supply frame 50 can be efficiently stirred. In addition, since the toner is conveyed in the Z1 direction by the second spiral 54*c*, it is possible to prevent the toner from leaking out of the toner accommodating chamber 49 toward the drive train 160 (see FIG. 11)

If the amount of toner conveyed from the communication passage 48 to the toner discharge chamber 57 by the screw 54 is small as compared with the amount of toner discharged to the outside the discharge opening 52, clogging of the toner in the toner discharge chamber 57 may not tend to occur. In such a case, it is not necessary to release the toner in the toner discharge chamber 57 into the toner accommodating chamber 49, and therefore, there is no need to connect the toner discharge chamber 57 to the toner accommodating chamber 49 by way of the opening 48*b*, and for this reason, the opening 48*b* is not necessary. Therefore, the provision or non-provision of the opening 48*b* can be appropriately determined depending on the amount of toner conveyed into the toner discharge chamber 57.

As shown in part (a) of FIG. 6 to part (a) of FIG. 10, the drive train 160 (see FIG. 11) and the side cover 62 covering the drive train 160 are mounted to the end (rear end, rear surface) of the supply frame 50 on the Z2 side. Furthermore, the shutter member 241 is mounted to the bottom surface 50*d*, which is the end of the supply frame 50 on the Y2 side. A shutter support portion 50*g* (see part (a) of FIG. 6 and FIG. 8) which supports the shutter member 241 so that it can move in the Z direction but cannot move in the X and Y directions, and a spring seat 50*j* is formed on the bottom surface 50*d* (see part (a) of FIG. 6) of the supply frame 50.

The shutter member 241 includes a shielding portion 241*a* which is provided so as to be able to shield the discharge opening 52, a spring support portion 241*b* which supports the shutter spring 243 between itself and the spring seat 50*j*, and a shutter hole 241*c*. A flat, elastic shutter seal may be attached to the shielding portion 241*a*.

The shutter spring 243 (see FIG. 9) as an urging portion is lightly press-fitted into the spring support portion 241*b* and is compressed between the shutter member 241 and the spring seat 50*j* of the supply frame 50. The shutter member 241 is urged in the mounting direction of the toner cartridge 13 (Z2 direction) by the urging force of the shutter spring 243. When the toner cartridge 13 is not installed in the image forming apparatus 100, the shutter member 241, urged by the shutter spring 243, is positioned at the blocking position by abutting against a stopper 62*a* of the side cover 62.

When the toner cartridge 13 is being mounted in the image forming apparatus 100, the shutter member 241 is pressed by a pressing portion (not shown) provided in the image forming apparatus 100. This causes the shutter member 241 to move from the blocking position to the open position against the urging force of the shutter spring 243.

When the toner cartridge 13 is not installed in the image forming apparatus 100, the shutter member 241 is positioned at the blocking position by the urging force of the shutter spring 243. At this time, the shielding portion 241*a* of the shutter member 241 closes the discharge opening 52 (see part (a) of FIG. 8 formed in the bottom surface 50*d* of the supply frame 50, thereby restricting the discharge of toner from the toner cartridge 13. In other words, when the shutter member 241 is placed at the shielding position, the shielding portion 241*a* is positioned so as to overlap the discharge opening 52 as viewed from a bottom, and the shutter hole 241*c* (see FIG. 6) is positioned so as not to overlap the discharge opening 52. That is, the discharge opening 52 is closed and shielded by the shielding portion 241*a* of the shutter member 241 placed at the shielding position.

When the toner cartridge 13 is mounted to the apparatus main assembly 100B of the image forming apparatus 100, the shutter member 241 is pressed by a pressing portion of the apparatus main assembly 100B, by which the shutter member 241 is moved from the shielding position to the open position. As the shutter member 241 moves to the open position, the shielding portion 241*a* opens the discharge opening 52, allowing the toner to be discharged from the toner cartridge 13. In other words, the arrangement is such that when the shutter member 241 is in the open position, the shielding portion 241*a* does not overlap the discharge opening 52, and the shutter hole 241*c* overlaps the discharge opening 52, as viewed from the bottom side. That is, the discharge opening 52 communicates with the outside of the toner cartridge 13 through of the shutter hole 241*c*. The shutter member 241 is in a state in which the discharge opening 52 is opened by the shutter hole 241*c*.

The discharge opening 52 is a frame opening (container opening) provided in the supply frame 50 of the toner cartridge 13. In the case of a structure in which a shutter hole 241*c* is provided in the shutter member 241 as in this embodiment, when the shutter member 241 is in the open position, the shutter hole 241*c* is connected to the discharge opening 52 (frame opening/container opening), and therefore, the shutter hole 241*c* can also be considered as part of the discharge opening 52.

In addition, the shutter member 241 has the shutter hole 241*c*, but this is not inevitable. For example, when the shutter member 241 is in the open position, the entire shutter member 241 may not overlap the discharge opening 52. In this way, the discharge opening 52 can be opened even if the shutter member 241 does not have the shutter hole 241*c*.

In addition, the shutter member 241 itself is not inevitable. However, it is desirable for the toner cartridge 13 to have the shutter member 241 for closing the discharge opening 52 in order to prevent toner from scattering through the discharge opening 52 when the toner cartridge 13 is being mounted to or dismounted from the main assembly 100B of the image forming apparatus 100, or when the toner cartridge 13 is out of the main assembly 100B of the image forming apparatus 100.

[Detailed Structure of the Toner Cartridge]

Next, referring to FIGS. 11 to 32, the detailed structure of each part of the toner cartridge 13 will be described. FIG. 11 is an exploded perspective view of the toner cartridge 13 with the side cover 62 omitted, and part (a) of FIG. 12 is a perspective view of the container part 50*a* of the supply frame 50. Part (b) of FIG. 12 is a perspective view of the support structure for the drive train 160 by the container part 50*a*. Part (a) of FIG. 13 is a perspective view of the side cover 62, and part (b) of FIG. 13 is another perspective view of the side cover 62.

As shown in FIG. 11 and part (b) of FIG. 12, the end surface 50*m* in the Z2 direction of the container part 50*a* of the supply frame 50 is provided with a first cylindrical portion 81, a second cylindrical portion 82, a third cylindrical portion 83, a first circular columnar portion 84, a second circular columnar portion 85, and a boss portion 90 which project in the Z2 direction. In addition, two screw holes 91 and 92 are provided in the end surface 50*m*, and the screw hole 92 is provided at an axial center of the first circular columnar portion 84.

The first cylindrical portion 81 rotatably supports a screw gear 86 for transmitting a driving force to the screw 54 (see FIG. 7). The second cylindrical portion 82 rotatably supports a stirring gear 87 for transmitting a driving force to the stirring shaft 151 (see FIG. 7). The first circular columnar portion 84 and the second columnar portion 85 rotatably support idler gears 88, 89, respectively. The idler gear 88 is in meshing engagement with the stirring gear 87 and the idler gear 89, and the idler gear 89 is in meshing engagement with the idler gear 88 and the screw gear 86. That is, the rotation of the stirring gear 87 is transmitted to the screw gear 86 by way of the idler gears 88, 89.

As shown in part (a) of FIG. 12 and part (b) of FIG. 12, the container part 50*a* of the supply frame 50 has a rectangular box shape and is open at the top side. The Z1 direction side end, i.e., the end on the non-driving side of the container part 50*a*, is provided with cylindrical portions 93, 94 which rotatably support one end of the screw 54 and one end of the stirring shaft 151, respectively. The bottom surface 50*d* of the container part 50*a* is provided with the above-described walls 50*a*1, 50*a*2, the discharge opening 52, and two bosses 95, 96 which are juxtaposed with a gap therebetween in the Z direction. In addition, two square holes 97, 98 are provided in the end (in the Y1 direction) surface of the container part 50*a* on the X1 direction side.

The discharge opening 52 is disposed closer to the driving side (downstream side in the Z2 direction) than the center of the container part 50*a* in the Z direction. In addition, the cylindrical portion supporting the screw 54 is disposed downstream of the discharge opening 52 in the X2 direction. In other words, the discharge opening 52 is disposed offset in the X direction with respect to the rotation axis 99 of the screw 54, and more specifically, is disposed downstream of the rotation axis 99 in the X1 direction.

As shown in part (a) of FIG. 13, the surface of the side cover 62 on the Z1 direction side (non-drive side) is provided with a first corner recess 101, a first cylindrical portion 102, a second cylindrical portion 133, and a third cylindrical portion 104. The first corner recess 101 and the first cylindrical portion 102 engage with the boss portion 90 and the third cylindrical portion 83 formed on the container part 50*a* of the supply frame 50, respectively. This is effective to position the side cover 62 with respect to the container part 50*a*. The second cylindrical portion 133 and the third cylindrical portion 104 function as retainers for the idler gear 89 and the stirring gear 87, respectively.

As shown in part (b) of FIG. 13, the surface of the side cover 62 on the Z2 direction side (drive side) is provided with a second corner recess 135, a fourth cylindrical portion 106, and an oblong cylindrical portion 107. The side cover 62 is also provided with through holes 108, 119, and 139. The second corner recess 135 is provided with a memory tag 111 (see FIG. 39)

The fourth cylindrical portion 106 and the oblong cylindrical portion 107 are used to position the toner cartridge 13 in the apparatus main assembly 100B (see FIG. 1). A coupling (not shown) of the apparatus main assembly 100B is inserted into the through hole 108. The third cylindrical portion 104 is formed around the through hole 108.

Screws for fixing the side cover 62 to the container part 50*a* of the supply frame 50 are inserted into the through holes 119 and 139. Specifically, as shown in FIG. 11, part (b) of FIG. 12 and part (b) of FIG. 13, two screws (not shown) penetrate the through holes 139 and 119 and are screwed into the screw holes 91 and 92 of the container part 50*a*, thereby fixing the side cover 62 to the container part 50*a*.

Next, referring to part (a) of FIG. 14 to part (b) of FIG. 16, each gear constituting the drive train 160 (see FIG. 11) will be described in detail. Part (a) of FIG. 14 and part (b) of FIG. 14 are perspective views of the stirring gear 87, and FIG. 15 is a perspective view of the idler gears 88 and 89. Part (a) of FIG. 16 and part (b) of FIG. 16 are perspective views of the screw gear 86. As shown in part (a) of FIG. 14 and part (b) of FIG. 14, the stirring gear 87 includes a gear portion 87*a*, a first cylindrical portion 87*b* coaxial with the gear portion 87*a* and extending in the Z2 direction, and includes a first circular columnar portion 87*d* coaxial with the gear portion 87*a* and extending in the Z1 direction. The gear portion 87*a* comprises a helical gear.

Inside the first cylindrical portion 87*b*, three ribs (protrusions) 87*h* are provided which protrude toward the rotation axis of the first cylindrical portion 87*b* and extend in the Z direction. The first cylindrical portion 87*b* and the three ribs (protrusions) 87*h* constitute a coupling 87B (driving force receiving member) for receiving a driving force from a driving shaft (main assembly side coupling, driving force applying member) (not shown) of the apparatus main assembly 100B. That is, the coupling 87B of the toner cartridge 13 receives a driving force from the outside. The stirring gear 87 provided with the coupling 87B is rotated by the driving force received by the coupling 87B.

The coupling 87B is a recessed coupling having a non-circular opening inside the first cylindrical portion 87*b*, and can be engaged with a convex-shaped coupling. That is, the driving shaft of the apparatus main assembly 100B is a protruded coupling with a plurality of grooves formed on its outer periphery, and can be engaged with the coupling 87B of the toner cartridge 13. When the toner cartridge 13 is mounted to the apparatus main assembly 100B, the drive shaft of the apparatus main assembly 100B enters the inside of the first cylindrical portion 87*b*.

Three ribs 87*h* provided on the inner circumference of the first cylindrical portion 87*b* engage with three grooves formed on the outer circumference of the drive shaft, so that the drive shaft and the coupling 87B are connected. The coupling 87B receives the drive force from the drive shaft by way of the three ribs 87*h* which are the drive force receiving portion.

From the standpoint of stable drive transmission, it is preferable that the coupling 87B has three ribs 87*h*, but this is not limiting, and the number of ribs 87*h* may be one, two, or four or more. In the embodiment, the coupling 87B has a non-circular recessed shape by providing a plurality of ribs 87*h* inside the first cylindrical portion 87*b*. However, the coupling 87B may have another shape.

For example, a coupling of a triangular projecting portion may be provided on the toner cartridge 13, and a triangular recessed coupling may be provided on the free end portion of the drive shaft of the main assembly 100B of the apparatus, in which these couplings may be coupled with each other. Alternatively, a gear may be used as the driving force receiving member, instead of a coupling. In such a case, the driving force may be transmitted by meshing one of the gears of the toner cartridge 13 constituting the drive train 160 with a gear of the main assembly 100B of the apparatus.

Furthermore, the stirring gear 87 has a first circular columnar portion 87*d* disposed inside the first circular columnar portion 87*d* and extending in the Z1 direction, a second circular columnar portion 87*e* having a smaller diameter than the first circular columnar portion 87*d* and extending from the first circular columnar portion 87*d* in the Z1 direction, and a third circular columnar portion 87*f* having a smaller diameter than the second circular columnar portion 87*e* and extending from the second circular columnar portion 87*e* in the Z1 direction. The first circular columnar portion 87*d*, the second circular columnar portion 87*e*, and the third circular columnar portion 87*f* are coaxial with the gear portion 87*a*, the first cylindrical portion 87*b*, and the first circular columnar portion 87*d*. The free end portion of the third circular columnar portion 87*f* in the Z1 direction has a double-sided chamfered shape.

As shown in FIG. 15, the idler gears 88 and 89 are cylindrical helical gears. As shown in part (a) of FIG. 16 and part (b) of FIG. 16, the screw gear 86 includes a gear portion 86*a*, a first cylindrical portion 86*b* extending in the Z2 direction coaxially with the gear portion 86*a*, and a first circular columnar portion 86*c*, a second circular columnar portion 86*d*, and a third circular columnar portion 86*e* extending in the Z1 direction coaxially with the gear portion 86*a*. The gear portion 86*a* has a helical gear. The first circular columnar portion 86*c* extends from the gear portion 86*a* in the Z1 direction, and the second circular columnar portion 86*d* has a smaller diameter than the first circular columnar portion 86*c* and extends from the first circular columnar portion 86*c* in the Z1 direction. The third circular columnar portion 86*e* has a smaller diameter than the second circular columnar portion 86*d* and extends from the second circular columnar portion 86*d* in the Z1 direction, with a free end portion thereof in the Z1 direction being a single chamfered.

Next, referring to FIG. 17 to part (c) of FIG. 18, the stirring unit 150 will be described. FIG. 17 is a perspective view of the toner cartridge 13 with the lid part 50*b* omitted. Part (a) of FIG. 18 is a perspective view of the stirring unit 150, part (b) of FIG. 18 is a front view of the stirring shaft 151, and part (c) of FIG. 18 is a front view of the stirring sheet 152.

As shown in FIG. 17 and part (a) of FIG. 18, the stirring unit 150 comprises the stirring shaft 151 for rotating by the driving force transmitted from the stirring gear 87, and the stirring sheet 152 which is fixed to the stirring shaft 151 and rotates integrally with the stirring shaft 151. As shown in part (a) of FIG. 18 and part (b) of FIG. 18, the stirring shaft 151 has a circular columnar portion 151*a* provided at the end in the Z1 direction and a gear mounting portion 151*b* provided at the end in the Z2 direction. The gear mounting portion 151*b* is provided with a hole 151*c* with two chamfered sides therein, and the hole 151*c* and the circular columnar portion 151*a* are concentric with the rotation axis 153 of the stirring shaft 151.

In addition, the stirring shaft 151 is provided with a plurality of bosses 154 aligned on a straight line parallel to the rotation axis 153, and two positioning bosses 155*a*, 155*b*. The two positioning bosses 155*a*, 155*b* are aligned on a straight line parallel to the rotation axis 153, but are slightly offset from the bosses 154 in the radial direction perpendicular to the axial direction of the rotation axis 153.

As shown in part (a) of FIG. 18 and part (c) of FIG. 18, the stirring sheet 152 is formed in a substantially rectangular sheet shape. The stirring sheet 152 has multiple elongated holes 156 aligned on a straight line parallel to the rotation axis 153 of the stirring shaft 151, a positioning hole 157*a*, and a positioning elongated hole 157*b*. The positioning hole 157*a* and the positioning elongated hole 157*b* are aligned in the Z direction, but are slightly offset from the multiple elongated holes 156 in the radial direction perpendicular to the axial direction of the rotation axis 153. The elongated hole 156, the positioning hole 157*a*, and the positioning elongated hole 157*b* are placed at the fixed end of the stirring sheet 152.

Furthermore, the stirring sheet 152 has an end 158 on the radially opposite side to the plurality of elongated holes 156. The end 158 is a free end of the stirring sheet 152, and is an end on the radially far side from the rotation axis 153. The end 158 has a first straight portion 158*a* extending in the Z direction and a second straight portion 158*b* inclined with respect to the Z direction. The first straight portion 158*a* is positioned downstream of the second straight portion 158*b* in the Z1 direction. The second straight portion 158*b* extends closer to the rotation axis 153 and the fixed end of the stirring sheet 152 as goes in the Z2 direction.

In addition, the stirring sheet 152 is provided with two slits 159*a*, 159*b* extending from its free end toward its rotation axis and its fixed end. That is, the slits 159*a* and 159*b* extend from the end 158, which is the free end of the stirring sheet 152, toward the fixed end of the stirring sheet 152 at which the multiple elongated holes 156 are provided, and toward the rotation axis 153 of the stirring sheet 152. The slits 159*a* and 159*b* extend parallel to each other, and extend at an angle with respect to the Z direction so as to approach the rotation axis 153 and the fixed end of the stirring sheet 152 as they go in the Z2 direction. These slits 159*a* and 159*b* are disposed closer to the Z2 direction side (driving side)

When assembling the stirring unit 150, the positioning bosses 155*a* and 155*b* of the stirring shaft 151 are inserted into the positioning hole 157*a* and the positioning elongated hole 157*b* of the stirring sheet 152, respectively. By this, the stirring shaft 151 and the stirring sheet 152 are positioned relative to each other in the Z direction and in the radial direction perpendicular to the Z direction. After that, the bosses 154 of the stirring shaft 151 are inserted into the elongated holes 156 of the stirring sheet 152. In this state, the bosses 154 are melted and crushed by heat, and the stirring sheet 152 is prevented from disengaging off the stirring shaft 151.

Next, referring to FIG. 19 to part (b) of FIG. 21, the detailed structure of the screw unit 140 will be described. FIG. 19 is an enlarged perspective view of the screw unit 140. Part (a) of FIG. 20 is a perspective view of a first case 141 of the screw case 80, and part (b) of FIG. 20 is a perspective view of a second case 142 of the screw case 80. Part (c) of FIG. 20 is an exploded perspective view of the screw 54 and the discharging sheets 171 to 174. Part (a) of FIG. 21 is an exploded perspective view of the screw unit 140, and part (b) of FIG. 21 is a perspective view of the screw unit 140 after assembly.

As shown in FIG. 19, the screw 54 is partially covered by a screw case 80, which forms the above-described communication passage 48 and toner discharge chamber 57. The downstream end of the screw 54 in the Z2 direction protrudes from the screw case 80, and is provided with the above-described second spiral 54*c* and gear mounting portion 54*d*. The second spiral 54*c* has the same diameter as the first spiral 54*b*. The gear mounting portion 54*d* is provided with a hole having a substantially D-shaped cross section in which the screw gear 86 is mounted.

As shown in part (c) of FIG. 20, the screw 54 has an angular boss 54*e*. Although one angular boss 54*e* is shown in part (c) of FIG. 20, the screw 54 is provided with a pair of such angular bosses 54*e* which are arranged 180 degrees out of phase with each other in the circumferential direction, and the other angular boss 54*e* is not shown. In this embodiment, the screw 54 is provided with the pair of angular bosses 54*e*, but only one angular boss 54*e* may be provided.

The discharging sheets 171-174 are attached to one of the angular bosses 54*e*. Specifically, the discharging sheets 171-174 are sheets made of, for example, polycarbonate, each have a thickness of 250 μm, and are flexible.

The discharging sheets 171-174 are provided with angular holes 171*a*-174*a*, respectively, into which the angular boss 54*e* serving as the mounting portion of the screw 54 is inserted. The discharging sheets 171-174 are attached to the angular boss 54*e* of the screw 54 in this order from the discharging sheet 174. That is, the discharging sheet 174 is disposed so that, among the discharging sheets 171-174, the discharging sheet 174 is located closest to the rotational shaft 54*a* of the screw 54, and the discharging sheet 171 is located farthest from the rotational shaft 54*a*.

The discharging sheets 171 to 174 have tapered end portions 171*b* to 174*b* on the side opposite the square holes 171*a* to 174*a*. The lengths of the ends 171*b* to 174*b* in the Z direction are all 6 mm or less. In this embodiment, the discharging sheets 171 to 174 all have the same width in the Z direction, but this is not inevitable.

Furthermore, the dimensions of the discharging sheets 171 to 174 measured along their longitudinal direction, that is, the lengths measured along the surfaces of the discharging sheets 171 to 174 from the square holes (171*a* to 174*a*), which are the fixed portions of the discharge sheets, to the ends 171*b* to 174*b*, which are the free ends of the discharge sheets, are different from one another. Of the discharging sheets 171 to 174, the discharging sheet 174 is the longest, and the discharging sheet 171 is the shortest. For example, in the longitudinal direction of the discharge sheets, the discharging sheet 171 as the first sheet is shorter than the discharging sheet 172 as the second sheet.

After the discharging sheets 171-174 are fitted around the angular boss 54*e* of the screw 54, the angular boss 54*e* is melted by heat so that the discharging sheets 171-174 do not slip out of the angular boss 54*e*. As a result, one end portions of the discharging sheets 171-174 in the longitudinal direction, i.e., the fixed end portions, are fixed to the screw 54. In this state, the discharging sheets 171-174 are structured to be movable and displaceable independently of each other.
That is, the fixed end side of each discharge sheet is fixed to the screw 54 by the angular boss 54*e*, while the free end portions 171*b*-174*b* of the discharging sheets 171-174 are movable relative to each other as free ends. The discharge sheets are merely overlapped with each other, and are not fixed to each other.

In addition, the discharging sheets 171-174 are arranged overlapping each other so that they are contactable with adjacent discharge sheets. The first spiral 54*b* of the screw 54 is provided on both the upstream side and the downstream side in the Z2 direction, sandwiching the angular boss 54*e*. The second spiral 54*c* is provided further downstream of the first spiral 54*b*, which is placed downstream of the angular boss 54*e* in the Z2 direction.

The method of fixing the discharging sheets 171-174 to the screw 54 is not limited to melting the angular boss with heat, and may be by adhesion, welding, clamping, or other means, and is not particularly limited.

As shown in FIG. 19 to part (b) of FIG. 20, the screw case 80 comprises the first case 141 and the second case 142. As shown in FIG. 19 and part (a) of FIG. 20, the first case 141 includes a cylindrical portion 141*a*, a mounting portion 141*b*, and an end portion 141*c*. The cylindrical portion 141*a* extends in the Z direction, and forms a communication passage 48 (see FIG. 7) therein. The mounting portion 141*b* extends radially outward from the cylindrical portion 141*a*, and has an oblong hole 141*b*1 and a round hole 141*b*2 on its bottom surface.

The end portion 141*c* is disposed downstream of the cylindrical portion 141*a* and the mounting portion 141*b* in the Z2 direction, and is connected to the cylindrical portion 141*a*. The end portion 141*c* has an end face 141*c*1 in the Z2 direction, and a recess 141*c*2 recessed from the end face 141*c*1 in the Z1 direction. The recess 141*c*2 has a substantially circular cross section centered on the cylindrical portion 141*a*. The end face 141*c*1 is provided with two bosses 143 and 144 disposed to interpose the recess 141*c*2, and a screw hole 145 disposed on the same side of the recess 141*c*2 as the boss 144.

As shown in FIG. 19 and part (b) of FIG. 20, the second case 142 includes a plate portion 142*a* formed in a plate shape and a cylindrical portion 142*b* protruding in the Z2 direction from the plate portion 142*a*. The plate portion 142*a* is provided with a round hole 146 and an oblong hole 147 arranged to interpose the cylindrical portion 142*b*, and is provided with a hole 148 arranged at a position corresponding to the screw hole 145 of the first case 141. The cylindrical portion 142*b* has a semicircular cut-away portion 149.

As shown in part (a) of FIG. 21 and part (b) of FIG. 21, the first case 141 is fitted around the screw 54 in the Z2 direction so that the screw 54 is inserted into the cylindrical portion 141*a*. The second case 142 is fitted around the screw 54 in the Z1 direction relative so that the screw 54 is inserted into the cylindrical portion 142*b*. Then, the first case 141 and the second case 142 are put together so that the discharging sheets 171 to 174 are surrounded by the first case 141 and the second case 142.

At this time, the bosses 143 and 144 of the first case 141 are inserted into the round hole 146 and the oblong hole 147 of the second case 142, respectively, and the second case 142 is positioned relative to the first case 141. In this state, screws (not shown) are threaded into the screw holes 145 of the first case 141 and the holes 148 of the second case 142, so that the second case 142 is fixed to the first case 141. As a result, the toner discharge chamber 57 (see FIG. 7) is formed by the end 141*c* of the first case 141 and the plate portion 142*a* of the second case 142, with the discharging sheets 171 to 174 accommodated in the toner discharge chamber 57.

[Toner Cartridge Assembly Procedure]

Next, the toner cartridge 13 assembly procedure will be described. Part (a) of FIG. 22 is a perspective view showing how the screw unit 140 is being assembled to the supply frame 50, and part (b) of FIG. 22 is a sectional view showing how the screw unit 140 is being assembled to the supply frame 50. FIG. 23 is a sectional view of the screw unit 140 having been assembled to the supply frame 50.

As shown in part (a) of FIG. 22 and part (b) of FIG. 22, the screw unit 140 is assembled to the container part 50*a* of the supply frame 50 from the downstream end in the Z1 direction. That is, the circular columnar portion 54*f* provided at the downstream end in the Z1 direction of the screw 54 of the screw unit 140 is inserted into the cylindrical portion 93 of the container part 50*a*. Then, the gear mounting portion 54*d* is inserted into the container part 50*a* of the supply frame 50 while rotating around the circular columnar portion 54*f* engaged with the cylindrical portion 93. At this time, the screw 54 is inserted into the container part 50*a* while being deformed.

Then, as shown in part (a) of FIG. 22 to FIG. 23, two bosses 95, 96 provided on the bottom surface of the container part 50*a* are inserted into the oblong hole 141*b*1 and the round hole 141*b*2 provided on the bottom surface of the first case 141 of the screw unit 140. By this, the screw unit 140 is positioned with respect to the container part 50*a* of the supply frame 50. The screw unit 140 has a play in the Z direction with respect to the container part 50*a*. That is, the circular columnar portion 54*f* of the screw 54 is movable in the Z1 direction until it hits the bottom surface of the cylindrical portion 93 of the container part 50*a*, and the gear mounting portion 54*d* of the screw 54 movable in the Z2 direction until it hits the side surface of the container part 50*a*. The total play (gap) in the Z direction between the screw 54 and the container part 50*a* is set to about 1 mm.

Part (a) of FIG. 24 is a perspective view showing the screw case 80 adhered to the container part 50*a* of the supply frame 50, and part (b) of FIG. 24 is a perspective view of the bottom side of the screw case 80. As shown in part (b) of FIG. 24, the screw case 80 has a bonding portion 80*a* which is adhered to the container part 50*a* by an adhesive, and the bonding portion 80*a* is indicated by a chain line in part (b) of FIG. 24. The bonding portion 80*a* is adhered to the container part 50*a*, so that the gap between the screw case 80 and the container part 50*a* is filled. As a result, the toner in the toner discharge chamber 57 is prevented from leaking through the gap between the screw case 80 and the container part 50*a*, so that an appropriate amount of toner can be stored in the toner discharge chamber 57.

Next, as shown in FIG. 25, the stirring unit 150 is mounted to the container part 50*a* of the supply frame 50. FIG. 25 is a perspective view showing how the stirring unit 150 is mounted to the container part 50*a*. As shown in part (a) of FIG. 12, part (a) of FIG. 18, and FIG. 25, the circular columnar portion 151*a* provided at the end of the stirring shaft 151 of the stirring unit 150 in the Z1 direction is mounted to the cylindrical portion 94 provided in the container part 50*a*.

Next, each gear of the drive train 160 is assembled to the container part 50*a* of the supply frame 50. Part (a) of FIG. 26 is an exploded perspective view showing the gears of the drive train 160 and the container part 50*a*, and part (b) of FIG. 26 is a front view of the assembled drive train 160. Part (a) of FIG. 27 is a perspective view showing how the screw gear 86 is mounted to the gear mounting portion 54*d* of the screw unit 140.

part (b) of FIG. 27 is a perspective view showing the screw gear 86, and part (c) of FIG. 27 is a perspective view of the gear mounting portion 54*d* of the screw 54. Part (a) of FIG. 28 is a perspective view showing the stirring gear 87 mounted on the gear mounting portion 151*b* of the stirring unit 150. Part (b) of FIG. 28 is a perspective view of the stirring gear 87, and part (c) of FIG. 28 is a perspective view showing the gear mounting portion 151*b* of the stirring shaft 151.

As shown in part (a) of FIG. 26 and part (b) of FIG. 26, the stirring gear 87, the idler gears 88 and 89, and the screw gear 86 of the drive train 160 are assembled to the second cylindrical portion 82, the first circular columnar portion 84, the second columnar portion 85, and the first cylindrical portion 81 provided in the container part 50*a* of the supply frame 50, respectively.

As shown in part (b) of FIG. 27 and part (c) of FIG. 27, the hole of the third circular columnar portion 86*e* of the screw gear 86 and the gear mounting portion 54*d* of the screw 54 are each chamfered on one side to form a substantially D-shaped cross section. The third circular columnar portion 86*e* of the screw gear 86 mounted to the first cylindrical portion 81 penetrates the first cylindrical portion 81 and projects into the inside of the container part 50*a*. As shown in part (a) of FIG. 27, the third circular columnar portion 86*e* of the screw gear 86 is fitted into the gear mounting portion 54*d* of the screw 54. By this arrangement, the screw 54 is rotatable integrally with the screw gear 86.

As shown in part (b) of FIG. 28 and part (c) of FIG. 28, the third circular columnar portion 87*f* of the stirring gear 87 and the hole (hole portion) 151*c* of the gear mounting portion 151*b* of the stirring shaft 151 each have a double sided chamfer shape. The third circular columnar portion 87*f* of the stirring gear 87 attached to the second cylindrical portion 82 penetrates the second cylindrical portion 82 and projects into the inside of the container part 50*a*. As shown in part (a) of FIG. 28, the third circular columnar portion 87*f* of the stirring gear 87 is fitted into a hole 151*c* of a gear mounting portion 151*b* of the stirring shaft 151.

By this arrangement, the stirring shaft 151 is rotatable integrally with the stirring gear 87. By assembling the drive train 160 in this manner, the rotation received from a coupling (not shown) of the main assembly 100B to the stirring gear 87 is transmitted to the gears of the drive train 160. The gears of the drive train 160 rotate in the directions of the arrows in part (b) of FIG. 26.

Next, the toner is filled into the container part 50*a* of the supply frame 50, and the lid part 50*b* is connected to the container part 50*a* by a method such as welding or adhesion. Part (a) of FIG. 29 is an exploded perspective view of the supply frame 50, and part (b) of FIG. 29 is an enlarged view showing the positioning structure of the container part 50*a* and the lid part 50*b*. Part (a) of FIG. 29 and part (b) of FIG.

29, the positioning holes 55*a* and 55*b* are formed in the top surface of the container part 50*a* of the supply frame 50, and the positioning bosses 56*a* and 56*b* are provided on the bottom surface of the lid part 50*b*.
The positioning bosses 56*a* and 56*b* of the lid part 50*b* are fitted into the positioning holes 55*a* and 55*b* of the container part 50*a*, respectively. This positions the lid part 50*b* relative to the container part 50*a*. In this state, the top surface of the container part 50*a* and the bottom surface of the lid part 50*b* are welded or bonded together, and the container part 50*a* and the lid part 50*b* are integrated together.

Finally, as shown in FIG. 11 to part (b) of FIG. 13, the side cover 62 is attached to the supply frame 50 from the drive side. Then, two screws (not shown) is penetrated through the through holes 139, 119 of the side cover 62 and is threaded into the screw holes 91, 92 of the container part 50*a*, thereby fixing the side cover 62 to the container part 50*a*. As a result, the assembling of the toner cartridge 13 is completed.

[Positioning of Each Part in the Z Direction]

Next, referring to part (b) of FIG. 26, and FIGS. 30, 31, and 32, the positioning structure of each part of the toner cartridge 13 in the Z direction (axial direction) will be described. FIG. 30 is a sectional view taken along a line 30A-30A indicated in part (b) of FIG. 26. FIG. 31 is a sectional view taken along a line 31A-31A indicated in part (b) of FIG. 26. FIG. 32 is a sectional view taken along a line 32A-32A indicated in part (b) of FIG. 26.

As shown in part (a) of FIG. 14 and part (b) of FIG. 14, part (b) of FIG. 26, and FIG. 30, the stirring gear 87 is pressed in the Z1 direction by being rotated by a drive shaft (driving force applying member, main assembly side coupling) (not shown) of the apparatus main assembly 100B as follows. The gear portion 87*a* (see part (a) of FIG. 14 and part (b) of FIG. 14) of the stirring gear 87 transmits a rotational force to the idler gear 88 by rotating. At that time, the gear portion 87*a* receives a reaction force of the rotation load from the idler gear 88. Here, since the gear portion 87*a* is a helical gear, part of this reaction force is oriented in the Z1 direction. Due to the component force acting in the Z1 direction, i.e., the thrust force, the bottom surface 87*g* of the stirring gear 87 abuts against the end surface 82*a* of the second cylindrical portion 82 of the supply frame 50, and the stirring gear 87 is positioned in the Z direction.

In the XY plane perpendicular to the Z direction, the inner peripheral surface of the first circular columnar portion 87*d* of the stirring gear 87 is supported by the outer peripheral surface of the second cylindrical portion 82 of the supply frame 50. A stirring seal 82*b* made of a cylindrical sponge, for example, may be provided on the bottom surface of the second cylindrical portion 82 of the supply frame 50. The stirring seal 82*b* is crushed in the Z1 direction by the first columnar portion 87*d* of the stirring gear 87, and is crushed in the radial direction perpendicular to the Z direction by the second columnar portion 87*e*. By providing such a stirring seal 82*b*, it is possible to prevent the toner filled in the supply frame 50 from leaking out of the toner cartridge 13.

In addition as shown in FIGS. 15, 26(*b*) and 31, the idler gear 88 is a helical gear, and therefore, it receives a thrust force in the Z2 direction. As a result, the end surface 88*a* of the idler gear 88 abuts against the end surface 62*b* of the side cover 62, by which the idler gear 88 is positioned in the Z direction. In the XY plane perpendicular to the Z direction, the inner peripheral surface of the idler gear 88 is supported by the outer peripheral surface of the first circular columnar portion 84 of the supply frame 50. As shown in FIG. 32, the idler gear 89 receives a thrust force in the Z1 direction. As a result, the end surface 89*a* of the idler gear 89 abuts against the side surface of the supply frame 50, by which the idler gear 89 is positioned in the Z direction.

As shown in part (a) of FIG. 16, part (b) of FIG. 16, part (b) of FIG. 26, and FIG. 32, the screw gear 86 receives a thrust force in the Z2 direction. As a result, the end surface 86*f* of the first cylindrical portion 86*b* of the screw gear 86 abuts against the side cover 62, so that the screw 54 is positioned in the Z direction. The screw 54 is structured to be movable within the range of a play between the screw gear 86 and the supply frame 50.

In the XY plane perpendicular to the Z direction, the outer peripheral surface of the first circular columnar portion 86*c* of the screw gear 86 is supported by the inner peripheral surface of the first cylindrical portion 81 of the supply frame 50. A screw seal 81*b* made of a cylindrical sponge, for example, may be mounted on the bottom surface of the first cylindrical portion 81 of the supply frame 50. The screw seal 81*b* is crushed in the Z1 direction by the first circular columnar portion 86*c* of the screw gear 86, and is crushed in the radial direction perpendicular to the Z direction by the second circular columnar portion 86*d*.

By providing such a screw seal 81*b*, it is possible to prevent the toner filled in the supply frame 50 from leaking out of the toner cartridge 13.

[Toner Receiving Structure of Image Forming Apparatus]

Next, referring to FIGS. 33 and 34, the toner receiving structure of the image forming apparatus 100 for receiving the toner discharged from the toner cartridge 13 will be described. FIG. 33 is a side view of the toner conveying device 14 and the toner cartridge 13. FIG. 34 is a partially enlarged sectional view taken along a line 34A-34A in FIG. 33.

As shown in FIGS. 33 and 34, a cylindrical receiving portion 246 is provided inside the image forming apparatus 100 at a position facing the toner cartridge 13 to be mounted. The receiving portion 246 is made of an elastic sealing member, and has a receiving port 247 for receiving toner discharged from the toner cartridge 13.

As shown in FIG. 34, the toner having fallen from the discharge opening 52 of the toner cartridge 13 is discharged toward the receiving port 247. The toner having passed through the receiving port 247 flows into a pipe portion 248 which is provided in the image forming apparatus 100 and bent into an L-shape. The toner is then supplied into the process cartridge 1 from the pipe portion 248 through an upstream conveying portion 110 and a downstream conveying portion 120. That is, the toner conveying device 14 has a bent pipe portion 248.

In this embodiment, the toner discharged from the discharge opening 52 can be vigorously flowed into the pipe portion 248 by the discharging sheets 171 to 174. As a result, the toner can smoothly pass through the inside of the pipe portion 248. Such a pipe portion 248 is an example of the layout of the toner convey path inside the apparatus main assembly 100B.

It is also possible to configure the pipe portion 248 as a thin tube shape without bending it into an L shape, or to configure it extending along a complex curve. Even when such a toner convey path is provided inside the apparatus main assembly 100B, the toner discharged from the discharge opening 52 can be smoothly pass through, by the discharging sheets 171-174 vigorously discharging the toner. By using such a toner cartridge 13, the latitude in the layout of the toner convey path inside the apparatus main assembly 100B can be enhanced, which in turn makes it easier to increase the latitude in the design of the apparatus main assembly 100B.

In addition, the upstream conveying portion 110 of this embodiment has a toner discharge detection window 251 provided in a part of the wall surface of the storage container 109, and a detecting portion (not shown) comprising an optical sensor or the like for detecting the toner having been discharged from the toner cartridge 13 into the upstream conveying portion 110 through the toner discharge detection window 251. Furthermore, the upstream conveying portion 110 has a rotatable member 252 which is rotatable in engagement with the upstream screw 105, and a wiping member 253 fixed to the rotatable member 252. Therefore, by rotating the rotatable member 252 together with the upstream screw 105, the wiping member 253 can clean the toner discharge detection window 251.

This makes it possible to prevent, for example, the toner from adhering to the toner discharge detection window 251 and reducing the detection accuracy of the detecting portion in detecting the toner discharge.

[Discharge of Toner by Discharge Sheet]

Next, referring to FIG. 35 to part (b) of FIG. 40, the structure and operation for discharging the toner through the discharge opening 52 of the toner cartridge 13 by the discharging sheets 171-174 will be described in detail. FIG. 35 is a sectional view showing the screw unit 140. Part (a) of FIG. 36 is a cross-sectional view taken along a line 36A-36A indicated in FIG. 35, and part (b) of FIG. 36 is a cross-sectional view taken along a line 36B-36B indicated in FIG. 35. Part (a) of FIG. 37 and part (b) of FIG. 37 are cross-sectional views for explaining the operation of the discharging sheets 171-174. FIG. 38 is a cross-sectional view for explaining the arrangement of the jump platform 183. FIG. 39 is a side view showing the toner cartridge 13. Part (a) of FIG. 40 is a side view showing the toner cartridge 13, and part (b) of FIG. 40 is a cross-sectional view taken along a line 40B-40B indicated in part (a) of FIG. 40.

As shown in FIG. 35, the toner in the toner accommodating chamber 49 is conveyed by the screw 54 through the communication passage 48 into the toner discharge chamber 57. As shown in part (a) of FIG. 36, the outer diameter of the screw 54 is set to be slightly smaller than the inner diameter of the cylindrical portion 141*a* which forms the communication passage 48. Therefore, the toner conveyed by the screw 54 is scraped off by the opening 48*a*(see FIG. 35) of the cylindrical portion 141*a*, and the amount of toner conveyed into the communication passage 48 is confined. By this arrangement, a constant amount of toner can be supplied into the toner discharge chamber 57 through the communication passage 48.

At this time, as shown in part (a) of FIG. 36 and part (b) of FIG. 36, the cross-sectional area SA1 of the space in the communication passage 48 is set to be smaller than the cross-sectional area SA2 of the space in the toner discharge chamber 57 (SA1<SA2). The cross-sectional area SA1 is the cross-sectional area in the YX plane of the space between the cylindrical portion 141*a* and the screw 54 in the communication passage 48. The cross-sectional area SA2 is the cross-sectional area in the YX plane of the space between the end 141*c* of the first case 141 and the screw 54 in the toner discharge chamber 57.

Preferably, in a cross section parallel to the YX plane perpendicular to the Z direction, a minimum cross-sectional area SA1 of the space in the communicating passage 48 is smaller than half the maximum cross-sectional area SA2 of the space in the toner discharge chamber 57 (SA1 min<(SA2 max)/2). In this embodiment, the cross-sectional area SA2 is set to about 12 times the cross-sectional area SA1.

As described above, in the communicating passage 48, in order to convey a constant amount of toner, the toner is pushed in a high-density state by the screw 54. Then, the toner compressed in the communicating passage 48 is discharged through the communicating passage 48 into the toner discharge chamber 57 by the screw 54. At this time, since the cross-sectional area SA2 of the toner discharge chamber 57 is larger than the cross-sectional area SA1 of the communication passage 48, the toner discharged from the communication passage 48 is mixed with the air in the toner discharge chamber 57 and becomes less dense. In other words, the toner conveyed into the toner discharge chamber 57 is in a loosened state and is not aggregated, so that it is easily discharged through the discharge opening 52.

As shown in part (a) of FIG. 20 and part (b) of FIG. 36, the inner circumferential surface of the first case 141 is provided with a circumferential surface 181 as a contact surface, a flat surface 182 as a separation surface, and a jump platform 183 which is a boundary portion between the circumferential surface 181 and the flat surface 182. The circumferential surface 181 is an arc-shaped surface formed centered on the rotation axis 99 of the screw 54, and is contactable with the discharging sheets 171-174. The flat surface 182 is continuous with the circumferential surface 181 and extends in a substantially horizontal direction.

In other words, the flat surface 182 extends in a direction away from the rotation axis 99. The screw case 80 is bonded to the supply frame 50, so that the flat surface 182 extends to the side wall 50*c* of the supply frame 50. Therefore, the jump platform 183 in this embodiment functions as a bent portion provided between the circumferential surface 181 and the flat surface 182, and is a region where the distance from the rotation axis 99 of the screw 54 changes. For this reason, for example, on a plane of in part (b) of FIG. 36, when the screw 54 rotates clockwise, the distance from the rotation axis 99 of the screw 54 to the inner wall of the toner discharge chamber 57 changes at the jump platform 183. Specifically, on the plane perpendicular to the rotation axis 99, the distance from the rotation axis 99 to the farthest part of the surface 182 is longer than the distance from the rotation axis 99 to the circumferential surface 181.

As shown in part (a) of FIG. 37, the screw 54 and the discharging sheets 171 to 174 attached to the screw 54 rotate in the direction of the arrow R1. For the discharging sheets 171 to 174, the one on the upstream side in the direction of the arrow R1 has a larger length, and the one on the downstream side has a smaller in length. The length of the discharging sheets 171-174 mentioned here is the length measured along the longitudinal direction of the discharging sheets 171-174 themselves.

Moreover the discharging sheets 171-174 are not curved and are straight when no external force is applied thereto, and are structured to be displaceable independently of each other. Here, a distance from the rotation axis 99 of the screw 54 to the jump platform 183 is D1, and the distances from the rotation axis 99 to the respective free ends 171*b*-174*b* of the discharging sheets 171-174 in their free state (see part (c) of FIG. 20 and part (b) of FIG. 36) in the longitudinal direction of the discharge sheets are distances L1-L4, respectively. At this time, the distance D1 is shorter than any of the distances L1-L4.

Since the distances D1 and L1-L4 are set in this manner, when the screw 54 rotates in the direction of the arrow R1, the discharging sheets 171-174 rub against the circumferential surface 181. At this time, for example, when the discharging sheets 171 and 172 are both in contact with the circumferential surface 181, they can contact each other.

Due to the frictional force between the circumferential surface 181, the discharging sheets 171 to 174 are flexed into an arc shape so as to be convex downstream in the direction of the arrow R1 between the angular boss 54*e* and the free ends 171*b* to 174*b*.

Then, when the free end 171*b* of the discharging sheet 171 passes the jump platform 183, the free end 171*b* separates from the inner circumferential surface (inner wall) including the circumferential surface 181 of the first case 141. Then, the frictional force between the free end 171*b* and the circumferential surface 181 disappears, and therefore, the discharging sheet 171 tends to elastically restore to a straight shape. In other words, when the discharging sheet 171 makes one rotation around the rotation axis 99, it comes into contact with the inner wall of the toner discharge chamber 57 and flexes, and then separates from the inner wall, thereby releasing the flexure. At this time, the elastic restoring force of the discharging sheet 171 causes the free end 171*b* of the discharging sheet 171 to forcefully feed the toner existing adjacent the discharge opening 52 into the discharge opening 52 together with the air.

As shown in part (a) of FIG. 37 and part (b) of FIG. 37, after the free end 171*b* of the discharging sheet 171 passes the jump platform 183, the free end 172*b* of the discharging sheet 172, the free end 173*b* of the discharging sheet 173, and the free end 174*b* of the discharging sheet 174 pass the jump platform 183 sequentially. The discharging sheet 172 is structured to be displaceable and contactable with respect to the discharging sheet 171. Then, like the free end 171*b*, the free ends 172*b* to 174*b* move away from the inner circumferential surface including the circumferential surface 181 of the first case 141, and the elastic restoring force of each of the discharge sheets 172 to 174 forcefully feed the toner existing adjacent the discharge opening 52 into the discharge opening 52 together with the air.

That is, each of the discharge sheets 172 to 174 accelerates the toner toward the discharge opening 52 by at least partially releasing its own elastic deformation. In addition, the free end portions 171*b* to 174*b* are tapered so that they can enter the discharge opening 52, so that the toner can be efficiently fed into the discharge opening 52. The discharging sheets 171 to 174 according to this embodiment employ a tapered free end shape, but the present invention is not limited to this.

For example, the shape of the discharging sheets 171 to 174 may be any as long as it does not have a significant effect such as a large decrease in the amount of toner discharged from the discharge opening 52. For example, the widths of the discharging sheets 171 to 174 may be the same from the base side close to the rotation axis of the screw 54 to the free end 171*b* to 174*b*. Also, the discharging sheets 171 to 174 may be structured such that the degrees (dimension) of the tapering of the free end portions 171*b* to 174*b* are different from each other. In other words, the discharging sheets 171 to 174 in this embodiment will suffice if it is flexed when they contact the jump platform 183 and so on at a certain timing during rotation, and then the flexure of the discharge sheets is released at a timing when the rotation continues thereafter.

In this way, by continuously feeding toner to the discharge opening 52 by the four discharging sheets 171-174, the toner fed to the discharge opening 52 during one full rotation of the screw 54 can be distributed, so that toner clogging at the pipe portion 248 (see FIG. 34) of the image forming apparatus 100 can be reduced. Also, each of the discharging sheets 171-174 feeds only the toner which it can forcefully push into the discharge opening 52, and therefore, the toner clogging can be reduced. Also, the toner is discharged from the discharge opening 52 by the discharging sheets 171-174 in four separate times, the total amount of toner fed to the discharge opening 52 by one full-rotation of the screw 54 can be increased.

Also, in this embodiment, the toner in the toner discharge chamber 57 is fed toward the discharge opening 52 by the discharging sheets 171-174, and therefore, the structure can be simplified and reduced in cost as compared with a structure in which toner is discharged using a pump or the like.

In addition, in this embodiment, the discharging sheets 171 to 174 are arranged so as to overlap at one point of the angular boss 54*e*, and the discharge sheet located upstream in the rotation direction indicated by the arrow R1 has a larger longitudinal dimension. Therefore, the discharging sheets 171 to 174 can pass the jump platform 183 continuously and elastically restore (releasing the deflection) in a short period of time. For this reason, immediately after the first discharging sheet 171, for example, reaches the discharge outlet 5 the second discharging sheet 172 can reach the discharge opening 52 2, and an appropriate amount of toner in the neighborhood of the discharge opening 52 can be reliably fed to the discharge opening 52.

Also, if there is a time interval between the first discharging sheet 171 and the second discharging sheet 172, the toner around the discharge opening 52 will flow excessively into the discharge opening 52. However, in this embodiment, the time interval between the first discharging sheet 171 and the second discharging sheet 172 is short, so that it is possible to suppress the flow of excessive toner into the discharge opening 52. That is, when the screw 54 makes one full-rotation, the discharging sheets 171-174 can forcefully feed a constant amount of toner into the discharge opening 52 in multiple times (four times in this embodiment)

Before the free ends 171*b*-174*b* of the discharging sheets 171-174 pass the jump platform 183, the discharging sheets 171-174 are deformed so as to displace the free ends 171*b*-174*b* upstream in the rotation direction indicated by the arrow R1. On the other hand, immediately after the free ends 171*b*-174*b* pass the jump platform 183, the discharging sheets 171-174 release the deformation thereof. That is, the discharging sheets 171-174 use their elastic force (elastic restoring force) to move the free end portions 171*b*-174*b*, which have been displaced upstream in the rotation direction, downstream in the rotation direction. By utilizing acceleration of the free end portions 171*b*-174*b* toward the downstream in the rotation direction, the discharging sheets 171-174 can accelerate the toner around the free end portions 171*b*-174*b* toward the discharge opening 52. In other words, the discharging sheets 171-174 apply the elastic forces of themselves (elastic restoring forces) to the toner, thereby moving the toner from the jump platform 183 toward the discharge opening 52 downstream in the rotation direction.

When the discharging sheets 171-174 pass the jump platform 183, the flexure and elastic deformation of the discharging sheets 171-174 do not necessarily need to be completely released. If the flexure and elastic deformation of the discharging sheets 171-174 are at least partially released, the discharging sheets 171-174 can feed the toner around them to the discharge opening 52 during that process.

The more downstream the discharging sheets 171-174 are in the rotation direction indicated by the arrow R1, the shorter the length and radius are in the natural state not subjected to external forces. That is, the discharging sheet 171 has the shortest distance from the rotation axis 99 to the free end 171*b*, and the discharging sheet 174 has the longest distance from the rotation axis 99 to the free end 174*b*. As a result, the more downstream the discharge sheet is in the rotation direction, the earlier the free end portion separates from the inner wall of the toner discharge chamber 57; and the more upstream the discharge sheet is, the later the free end portion separates from the inner wall of the toner discharge chamber 57.

By shifting the timing so that the deflection is released in sequence from the discharge sheet located downstream in the rotation direction, the toner can be conveyed continuously from around the jump platform 183 toward the discharge opening 52. And, the time period during which the toner moves toward the discharge opening 52 by one full rotation of the discharging sheets 171-174 can be made longer.

In this embodiment, the discharge sheets are structured so that the radial length is larger as they are placed further upstream in the direction of rotation. In other words, the radial lengths L1, L2, L3, and L4 of the discharging sheets 171 to 174 are stepwise different to satisfy L1<L2<L3<L4. It is particularly preferable that the relationship in which the radial length is longer as the sheet is placed further upstream in the direction of rotation is satisfied in any combinations of discharge sheets. However, the above relationship does not necessarily have to be satisfied in all combinations of discharge sheets.

For example, it is possible to make the length L2 of the discharging sheet 172 and the length L3 of the discharging sheet 173 the same, so that L1<L2=L3<L4 is satisfied. In such a case, the above relationship is not satisfied between the discharging sheet 172 and the discharging sheet 173, but it can be said that the above relationship is satisfied in other combinations of sheets. Although the function of the discharging sheet 173 may be weaker, such a structure is acceptable as long as the discharging sheets 171, 172, and 174 can convey the required amount of toner.

Alternatively, the length L2 of the discharging sheet 172 may be the shortest, so that L2<L1<L3<L4 is satisfied. In such a case, the above relationship is not satisfied between the discharging sheet 172 and the other discharge sheets. However, the above relationship is satisfied between the discharging sheets 171, 173, and 174. Although the function of the discharging sheet 172 may be weaker, such a structure is acceptable as long as the discharging sheets 171, 173, and 174 can convey the required amount of toner.

Among the multiple discharge sheets stacked in this manner, it will suffice if there is at least one combination of a first sheet and a second sheet which is longer than the first sheet and which is located upstream of the first sheet in the rotation direction. However, it is more preferable that the discharging sheet 171 located at the most downstream side is not the longest sheet, and that there is another discharge sheet that is longer than the discharging sheet 171. In other words, it is more preferable that the length of any one of the discharge sheets 172, 173, and 174 located upstream is longer than the discharging sheet 171 located at the most downstream side. The lengths of the discharging sheets 171 to 174 may be approximately the same. The length of the discharging sheets 171 to 174 in the direction away from the rotation axis 99 of the screw 54 may be any length as long as the amount of toner discharged from the discharge opening 52 is not extremely small.

In this embodiment, a step is formed between the circumferential surface 181 and the flat surface 182 in the jump platform 183, and the free ends 171*b* to 174*b* of the discharging sheets 171 to 174 pass the jump platform 183, thereby releasing the deflection of the discharging sheets 171 to 174. In other words, when the screw 54 rotates one full turn, the deflection of the discharging sheets 171 to 174 is released suddenly from the deflected state. In order to accomplish this, it is preferable that a step like jump platform 183 is formed in the toner discharge chamber 57.

For example, it is preferable that the inner wall of the toner discharge chamber 57 (including the inner circumferential surface of the first case 141 and the side wall 50*c*) has a portion where the distance from the rotation axis 99 is shorter than the distance L1 and a portion where the distance is longer than the distance L4. Further for example, as shown in part (a) of FIG. 37, it is preferable that the distance D2 from the rotation axis 99 to the lower end of the side wall 50*c* is longer than the distance L4. However, if the free ends 171*b* to 174*b* which have passed the jump platform 183 do not come into contact with the inner wall of the toner discharge chamber 57 before reaching the discharge opening 52, the distance D2 may be set to be equal to or shorter than the distance L4.

When the distance from the rotation axis 99 of each discharge sheet to the inner wall is measured, the distance D2 downstream of the jump platform 183 in the rotation direction indicated by the arrow R1 is longer than the distance D1 upstream of the jump platform 183. And, the distance from the rotation axis 99 of each discharge sheet to the inner wall changes discontinuously with the jump platform 183 as a boundary. This arrangement is preferable in terms of reliably separating the free ends 171*b* to 174*b* of the discharging sheets 171 to 174 having different lengths, from the inner wall of the toner discharge chamber 57 at the jump platform 183.

In this embodiment, the jump platform 183 is provided as a portion for flexing each discharging sheet 171 to 174 and releasing it from the flexed state, but this is not inevitable. For example, the surface 182 may not be provided on the inner wall of the toner discharge chamber 57 in a plane perpendicular to the rotation axis 99. More particularly, for example, the inner wall of the toner discharge chamber 57 may be structured so that the distance between the inner wall of the toner discharge chamber 57 and the rotation axis 99 changes smoothly (continuously)

In such a case, a protrusion protruding from the circumferential surface 181 toward the rotation axis 99 may be provided, such that as the discharging sheets 171-174 rotates, they come into contact with the protrusion, thereby causing them to flex, and they ride over the protrusion to release the flexure. In other words, another member having the same function as the jump platform 183 may be used. With such a structure, the toner can be effectively discharged by the moving force of the discharging sheets 171-174 as they rotate and ride over the protrusion.

There may be a case in which the free ends 171*b*-174*b* of the discharging sheets 171-174 come into contact with the inner wall of the toner discharge chamber 57 midway between passing the jump platform 183 and reaching the discharge opening 52. For example, it may be considered that the free ends 171*b*-174*b* may come into only temporarily or very lightly contact with the inner wall of the toner discharge chamber 57 before reaching the discharge opening 52. Even in such a case, if the influence of such contact on the release of the flexure of the discharging sheets 171-174 is relatively small, the toner feeding performance of the discharging sheets 171-174 can be maintained.

However, in order to further enhance the toner feeding performance of the discharging sheets 171-174, it is desirable that there exists a timing when the free ends 171*b*-174*b* are separated from the inner wall of the toner discharge chamber 57. In particular, it is more desirable that the free ends 171*b*-174*b* do not come into contact with the inner wall at all between the time when they pass the jump platform 183 and the time when they come into contact with the surface (bottom surface) in which the discharge opening 52 is formed or the edge of the discharge opening 52.

In FIG. 38, the center of the container part 50*a* of the supply frame 50 in the X direction is indicated by a center line CP. The center line CP is a straight line which passes through the center between the upstream end and the downstream end of the container part 50*a* in the X1 direction and extends in the Y direction. The rotation axis 99 of the screw 54 and the discharge opening 52 are disposed on the same side with respect to the center line CP.

In addition, in the X direction, the distance D4 between the center line CP and the edge of the discharge opening 52 is longer than the distance D3 between the center line CP and the rotation axis 99. In other words, when the toner cartridge 13 is in an orientation in which the discharge opening 52 faces downward and viewed along the Z direction (axial direction), the rotation axis 99 is closer to the center line CP of the toner cartridge 13 than the discharge opening 52 in the X direction (horizontal direction)

Furthermore, as viewed along the Z direction (axial direction) in the attitude of the toner cartridge 13 with the discharge opening 52 facing downward, the jump platform 183 is placed on the same side as the discharge opening 52 with respect to the rotation axis 99 in the X direction (horizontal direction). That is, in FIG. 38 in which the toner cartridge 13 is viewed in the Z direction (axial direction) in the attitude of the toner cartridge 13 during use thereof, the jump platform 183 is placed on the right side of the rotation axis 99, just like the discharge opening 52. In addition, in this embodiment, the discharge opening 52 is disposed directly below the jump platform 183.

In other words, the jump platform 183 is disposed at a position overlapping the discharge opening 52 in the X direction (horizontal direction). With this arrangement, the discharging sheets 171 to 174, which have been released from flexure by the jump platform 183 and have gained momentum, collide with the discharge opening 52. Then, the discharging sheets 171 to 174 forcefully feed the toner together with air to the discharge opening 52, thereby making it possible to prevent toner clogging.

It is preferable to dispose the discharge opening 52 directly below the jump platform 183, but it is not necessary to dispose it there. As long as the jump platform 183 and the discharge opening 52 are disposed on the same side of the rotation axis 99, it is possible to obtain substantially the same effect.

Also, in FIG. 38, a straight line passing through the rotation axis 99 and extending in the X direction (horizontal direction) is indicated by a straight line HL. In this embodiment, the jump platform 183 is disposed at a position where at least a part of it overlaps with the screw 54 in the Y direction (vertical direction) as viewed along the Z direction (axial direction) in the attitude of the toner cartridge 13 with the discharge opening 52 facing downward. In other words, the jump platform 183 is disposed at the same height as a part of the screw 54.

More specifically, the jump platform 183 is disposed on the straight line HL, that is, it is disposed at substantially the same height as the rotation axis 99 in the vertical direction. The desirable disposition of the jump platform 183 is not limited to this example. For example, it is desirable to dispose the jump platform 183 within a range of an angle θ1 upstream from the straight line HL in the direction of the arrow R1 to an angle θ2 downstream from the straight line HL in the direction of the arrow R1. The angles θ1 and θ2 will be explained in the following.

In FIG. 38, the distance from the rotation axis 99 to the jump platform 183 is the same distance D1 as in this embodiment (see part (a) of FIG. 37). When the jump platform 183 is arranged on an imaginary circle with a radius of the distance D1, the movement direction of the toner conveyed from the jump platform 183 by the discharging sheets 171-174 is as follows. The toner ejected by the discharging sheets 171-174 moves from the jump platform 183 in a direction roughly the same as the tangent direction of the imaginary circle at the jump platform 183, spreading out radially to a certain extent. The discharge opening 52 is downstream from the jump platform 183 in the Y2 direction, and therefore, by reducing the angle between the tangent direction and the Y2 direction, the amount of toner moving from the jump platform 183 toward the discharge opening 52 can be increased, and the momentum of the toner discharged from the discharge opening 52 can be maintained.

In view of this, as shown in FIG. 38, it is desirable that the jump platform 183 is disposed between positions Q1 and Q2. The positions Q1 and Q2 are on a circle having a predetermined radius (distance D1) centered on the rotation axis 99. A tangent line N1 of the circle at the position Q1 passes through the lower end 50*e* of the side wall 50*c*.

The tangent line N2 of the circle at the position Q2 passes through an edge of the discharge opening 52. When the positions Q1 and Q2 are determined in this manner, the angle θ1 is 15° and the angle θ2 is 30°. More preferably, the jump platform 183 is disposed in a range between the angle θ1 of 15° and the angle θ2 of 15°. Further, preferably, the jump platform 183 is disposed at a position close to a straight line HL extending horizontally from the rotation axis 99.

When viewed in the Z direction (axial direction) in the attitude of the toner cartridge 13 with the discharge opening 52 facing downward, it is also preferable that the tangent line to the inner wall of the toner discharge chamber 57 at the jump platform 183 is as follows. That is, it is preferable that the tangent to the jump platform 183 intersects with the discharge opening 52 or the bottom surface (lower surface, floor surface) of the toner discharge chamber 57 in which the discharge opening 52 is provided. FIG. 38 illustrates an example in which the tangent line N2 to the jump platform 183 passes through the discharge opening 52 when the jump platform 183 is placed at position Q2. Also, it illustrates an example in which the tangent line N1 passes through the bottom surface of the toner discharge chamber 57 when the jump platform 183 is disposed at position Q1.

In addition, in FIG. 38, when the tangent line N1 of the toner discharge chamber 57 intersects with the bottom surface at the intersection K1, it is preferable that the intersection K1 and the rotation axis 99 are on opposite sides of the discharge opening 52 in the horizontal direction (X direction). In other words, the rotation axis 99 is downstream in the X2 direction from the discharge opening 52, whereas the intersection K1 is downstream in the X1 direction from the discharge outlet.

As shown in FIG. 39, the coupling 87B and its rib 87*h* (see FIG. 14) are disposed between the memory tag 111 and the discharge opening 52 in the X direction, which is the horizontal direction perpendicular to the Z direction. In other words, the coupling 87B is disposed between the memory tag 111 and the abutment portion 52*a* which abuts against the discharging sheet 171 of the discharge opening 52 in the X direction. The memory tag 111 functioning as a storage unit stores information relating to the toner cartridge 13, such as information relating to whether the toner cartridge 13 has been used or has not been unused, and an amount of toner remaining in the toner cartridge 13.

Also, as shown in part (a) of FIG. 40 and part (b) of FIG. 40, the coupling 87B and its rib 87*h* (see FIG. 14) are disposed between the memory tag 111 and the discharge opening 52 both in the Y direction and in the Z direction. In other words, the coupling 87B and its rib (driving force receiving portion) 115*a*87*h* are disposed between the memory tag 111 and the abutment portion 52*a* (see FIG. 39) both in the Y direction and in the Z direction.

When the toner cartridge 13 is mounted to the apparatus main assembly 100B, the coupling 87B is connected to a coupling (driving force imparting member, driving shaft) (not shown) of the apparatus main assembly 100B. Therefore, the vibrations produced by the repeated collision of the discharging sheets 171-174 with the abutment portion 52*a* are suppressed by the coupling 87B held by the coupling of the apparatus main assembly 100B, and the influence of the vibrations on the memory tag 111 can be reduced. In order to stably electrically contact the memory tag 111 with the electrical contacts (main assembly side contacts) provided in the apparatus main assembly 100B for reading information, it is preferable not to propagate the vibrations to the memory tag 111.

The coupling 87B has a contact portion contacting the driving shaft (driving force imparting member, main assembly side coupling) of the apparatus main assembly 100B, and therefore, suppresses the movement of the toner cartridge 13 relative to the apparatus main assembly 100B. By disposing the coupling 87B, which acts to suppress the movement of the toner cartridge 13, between the abutment portion 52*a*, which is the vibration source, and the memory tag 111, which is desirably not subjected to vibration, it is possible to suppress the propagation of vibration to the memory tag 111. This prevents the memory tag 111 from vibrating relative to the main assembly side contacts, thereby suppressing wear of the memory tag 111 and lengthening the life thereof, and stabilizing the electrical connection between the memory tag 111 and the main assembly side contacts.

Finally, the dimensions in this embodiment are shown as examples: D1=13 mm, D2=21.9 mm, D3=19.7 mm, D4=26.8 mm, L1=19 mm, L2=20 mm, L3=22 mm, L4=23.5 mm.

Embodiment 2

Next, Embodiment 2 of the present invention will be described, and in Embodiment 2, discharging sheets 271 and 272 are provided in place of the discharging sheets 171 to 174 of Embodiment 1. Therefore, the same structure as Embodiment 1 will be omitted from the illustration or will be described by using the same reference numerals in the drawings.

[Screw Unit]

FIG. 41 is a cross-sectional view of a toner cartridge 13B according to Embodiment 2. Part (a) of FIG. 42 is a perspective view of a screw unit 240, and part (b) of FIG. 42 is another perspective view of the screw unit 240. Part (a) of FIG. 43 is an exploded perspective view of the screw unit 240, and part (b) of FIG. 43 is a perspective view of the discharging sheets 271 and 272.

As shown in FIG. 41 to part (b) of FIG. 43, the toner cartridge 13B comprises a supply frame 50, a stirring unit 150, and a screw unit 240. The screw unit 240 includes a screw 54, a screw case 80, and discharging sheets 271, 272. The screw 54 is provided with a pair of angular bosses 54*e* as a first mounting portion and a second mounting portion arranged with a phase difference of 180 degrees in the circumferential direction, as in Embodiment 1. Discharge sheets 271, 272 are attached to the angular bosses 54*e*, respectively. Since the pair of angular bosses 54*e* are provided on the screw 54, they can rotate around the rotation axis 99, and are spaced apart from each other with the rotation axis 99 therebetween as viewed in the Z direction (axial direction)

The discharging sheets 271, 272 are sheets formed of polycarbonate resin, for example, have a thickness of 250 μm, and are flexible. The discharging sheet 271 may be called the first sheet, and the discharging sheet 272 may be called the second sheet. The discharging sheets 271, 272 are cased in a toner discharge chamber 57 formed by the screw case 80 and the supply frame 50. The screw case 80, the toner discharge chamber 57, and the communication passage 48 (see FIG. 35) have the same structures as in Embodiment 1.

As shown in part (a) of FIG. 43 and part (b) of FIG. 43, the discharging sheets 271, 272 have angolar holes 271*a*, 272*a*, respectively, which are fitted around the angular bosses 54*e* of the screw 54. After the discharging sheets 271, 272 are fitted around the pair of square bosses 54*e* of the screw 54, the pair of angular bosses 54*e* are melted by heat. This prevents the discharging sheets 271, 272 from disengages out of the pair of angular bosses 54*e*, so that one side ends (fixed ends) of the discharging sheets 271, 272 in the longitudinal direction is fixed to the screw 54.

Since the pair of angular bosses 54*e* are arranged at 180 degrees opposite each other in the circumferential direction of the screw 54, the angular holes 271*a*, 271*b* fixed to the angular bosses 54*e* are also arranged at 180 degrees opposite each other. As a result, the discharging sheets 271, 272 are arranged apart from each other by the thickness of the rotational shaft 54*a*, and a gap is provided between the surfaces of the discharging sheets 271, 272. That is, the discharging sheets 271, 272 do not contact each other, at least in a free state in which the discharging sheets 271, 272 are not flexed.

The free end portion 271*b* of the discharging sheet 271 on the opposite side to the angular hole 271*a* has a tapered shape. On the other hand, the free end portion 272*b* of the discharging sheet 272 on the opposite side to the angular hole 272*a* does not have a tapered shape and has a uniform width in the shortwise direction. In addition, the free end portion 272*b* is structured not to enter the discharge opening 52.

The length of the free end 271*b* in the Z direction is 6 mm or less. The discharging sheet 272 is shorter than the discharging sheet 271 in the longitudinal direction thereof. In other words, in a free state where the deflection is released, the distance from the rotation axis 99 to the free end 271*b* of the discharging sheet 272 is shorter than the distance from the rotation axis 99 to the free end 271*b* of the discharging sheet 271.

[Discharge of Toner by Discharge Sheet]

Next, referring to part (a) of FIG. 44 to part (b) of FIG. 47, the structure and operation for discharging toner from the discharge opening 52 of the toner cartridge 13B by the discharging sheets 271, 272 will be described in detail. Part (a) of FIG. 44 to part (b) of FIG. 45 are cross-sectional views for explaining the operation of the discharging sheets 271, 272. Part (a) of FIG. 46 is a cross-sectional view showing the discharging sheets 271, 272 in the free state thereof, and part (b) of FIG. 46 is a cross-sectional view showing the discharging sheets 271, 272 immediately after passing the jump platform 183. Part (a) of FIG. 47 is a cross-sectional view showing the discharging sheets 1271, 1272 as a comparative example, and part (b) of FIG. 47 is a cross-sectional view showing the discharging sheets 1271, 1272 immediately after passing the jump platform 183.

As shown in part (a) of FIG. 44, the screw 54 and the discharging sheets 271, 272 attached to the screw 54 rotate in the direction of the arrow R1. Here, the distance from the rotation axis 99 of the screw 54 to the jump platform 183 is D1 (see part (b) of FIG. 44), and the distances from the rotation axis 99 to the free ends 271*b*, 272*b* of the discharging sheets 271, 272 in the free state thereof in the longitudinal direction of the discharge sheets are the distances L5, L6 (see part (a) of FIG. 46). At this time, the distance D1 is shorter than any of the distances L5, L6.

Since the distances D1, L5, and L6 are selected in this manner, the discharging sheets 271, 272 rubs against the circumferential surface 181, when the screw 54 rotates in the direction of the arrow R1. Then, the discharging sheets 271, 272 are flexed into an arc shape between the angular boss 54*e* and the free end portions 271*b*, 272*b* so as to convex downstream in the direction of the arrow R1 by the frictional force between the circumferential surface 181 and the free end portions 271*b*, 272*b*.

When the free end 271*b* of the discharging sheet 271 passes the jump platform 183, the free end 271*b* separates from the inner circumferential surface including the circumferential surface 181 of the first case 141. Since the frictional force between the free end 271*b* and the circumferential surface 181 disappears, the discharging sheet 271 elastically tends to restore to a straight shape. In other words, when the discharging sheet 271 as the first sheet makes one full turn around the rotation axis 99, it comes into contact with the inner wall of the toner discharge chamber 57 and flexes, and then it separates from the inner wall so that the flexure is released. Due to the elastic restoring force of the discharging sheet 271 at this time, the free end portion 271*b* of the discharging sheet 271 feeds the toner existing around the discharge opening 52 into the discharge opening 52 together with the air forcefully.

Also, a length of the discharging sheet 272 provided upstream of the discharging sheet 271 in the direction of the arrow R1 is shorter than that of the discharging sheet 271 as described above. In addition, the discharging sheet 272 as the second sheet is structured to be displaceable relative to and contactable to the discharging sheet 271. More specifically, the discharging sheets 271 and 272 can partially contact each other when they are in contact with the circumferential surface 181.

That is, the free end portions of the discharging sheets 271 and 272 can contact each other. Therefore, almost simultaneously with the free end 271*b* of the discharging sheet 271 passes the jump platform 183, the free end 272*b* of the discharging sheet 272 also passes the jump platform 183. At this time, as shown in part (b) of FIG. 44, the free end 272*b* of the discharging sheet 272, which is going to elastically restore, presses the discharging sheet 271 from the upstream side in the direction of the arrow R1.

That is, while the discharging sheet 271 is moving toward the discharge opening 52 after releasing its flexure at the jump platform 183, a part of the discharging sheet 272 comes into contact with the discharging sheet 271. This assists in the elastic restoration of the discharging sheet 271, and the free end portions 271*b* of the discharging sheet 271 can be fed into the discharge opening 52 more forcefully.

In this embodiment, the free end portion 272*b* of the discharging sheet 272 does not enter the discharge opening 52, but only presses the discharging sheet 271, and therefore does not have a tapered shape. Therefore, the discharging sheet 272 can stably press the discharging sheet 271. In addition, the free end portion 271*b* of the discharging sheet 271 has a tapered shape so that it can enter the discharge opening 52, and therefore, the toner can be fed into the discharge opening 52 efficiently.

In this embodiment, the lengths of the discharging sheets 271 and 272 are selected so that the free end 272*b* of the discharging sheet 272 also passes the jump platform 183 substantially simultaneously with the free end 271*b* of the discharging sheet 271 passing the jump platform 183. As a result, the discharging sheet 271 is pushed from behind by the discharging sheet 272, and the momentum of the free end 271*b* of the discharging sheet 271 toward the discharge opening 52 can be increased. As long as the discharging sheet 272 comes into contact with the discharging sheet 271 before the discharging sheet 271 reaches the discharge opening 52, the timing at which the discharging sheet 271 and the discharging sheet 272 pass the jump platform 183 may be different from each other.

In this way, by assisting the momentum of the preceding discharging sheet 271 by the subsequent discharging sheet 272, a desired amount of toner can be the forcefully fed to the discharge opening 52 at once when the screw 54 makes one full rotation, and toner clogging in the pipe portion 248 (see FIG. 34) of the image forming apparatus 100 can be reduced.

Also, as shown in part (a) of FIG. 45, the toner T is conveyed in the direction of the arrow R1 between the discharging sheets 271 and 272 which have passed the discharge opening 52. As shown in part (b) of FIG. 45, the toner T between the discharging sheets 271, 272 spills down in the Z direction from the discharging sheets 271, 272. At this time, the toner T which has spilled down to a downstream side, in the X1 direction, of the rotational shaft 54*a* of the screw 54 falls to the neighborhood of the discharge opening 52. This makes it possible to increase the amount of toner forcefully fed into the discharge opening 52 by the free end portion 271*b* of the discharging sheet 271.

As shown in part (a) of FIG. 46, in this embodiment, in a free unflexed state, the discharging sheets 271 and 272 are arranged parallel to and spaced apart from each other. In such an arrangement of the discharging sheets 271 and 272, the discharging sheet 272 can assist the discharging sheet 271, as shown in part (b) of FIG. 46.

On the other hand, as shown in part (a) of FIG. 47, the discharging sheets 1271 and 1272 according to the comparative example are mounted to the corner bosses 254*e* and 254*e* of the screw 254, respectively. In a free unflexed state, the discharging sheets 1271 and 1272 are arranged parallel to and spaced apart from each other. More specifically, the angle between the discharging sheets 1271 and 1272 is θ3 (≠0°)

For example, when the angle θ3 is 30°, the distance between the free ends of the discharging sheets 1271 and 1272 is longer than in this embodiment. Therefore, as shown in part (b) of FIG. 47, the discharging sheet 1272 does not contact the discharging sheet 1271 and cannot assist the discharging sheet 1271. Therefore, in order for the discharging sheet 1272 to assist the discharging sheet 1271, it is desirable that the angle θ3 is less than 30°.

That is, in order for the discharging sheet 1272 to contact the discharging sheet 1271 when passing through the jump platform 183, it is preferable that the range of the angle θ3 is less than 30°. Note that there is no particular lower limit for the angle θ3, and it may be negative. When the angle θ3 is a negative value, the distance between the free end portions of the discharging sheets 1271 and 1272 is shorter than the distance between the base portions of the discharging sheets 1271 and 1272. Even with this structure, the discharging sheet 1272 can assist the discharging sheet 1271.

FIG. 48 is a cross-sectional view for explaining the arrangement of the jump platform 183. As explained in FIG. 38, the jump platform 183 is preferably disposed close to the straight line HL extending horizontally from the rotation axis 99. The jump platform 183 may be disposed within a range between an angle of 15° upstream from the straight line HL in the direction of the arrow R1 and an angle of 30° downstream from the straight line HL in the direction of the arrow R1.

More preferably, the jump platform 183 is disposed within a range between the angle of 15° upstream from the straight line HL in the direction of the arrow R1 and an angle of 15° downstream from the straight line HL in the direction of the arrow R1. The reason for selecting the preferable angle range is the same as that explained in Embodiment 1 with reference to FIG. 38.

As an example, L5 and L6 in this embodiment are L5=20 mm and L6=13 mm.

Other Embodiments

In all of the above-described embodiments, the discharging sheets 171-174, 271, and 272 are mounted to the screw 54, but this is not inevitable. For example, a shaft member which is rotatable by the driving force from the coupling 87B may be provided separately from the screw 54, and the discharging sheets 171-174, 271, and 272 may be mounted to the shaft member.

In Embodiment 1, the four discharging sheets 171-174 are arranged on the screw 54 in a stacked manner, but this is not inevitable. For example, the number of discharge sheets mounted to one angular boss 54*e* of the screw 54 may be two to three, or five or more. The greater the number of discharge sheets mounted to the screw 54 in a stacked state, the higher the toner conveying performance tends to is, but the fewer the number of stacked discharge sheets, the easier it is to fix them to the rotational shaft 54*a*. In view of this, the number of stacked discharge sheets is selected to be four in Embodiment 1.

In Embodiment 2, the discharging sheets 271 and 272 are mounted to a pair of angular bosses 54*e* of the screw 54, but this is not inevitable. More than two discharge sheets may be disposed in the toner discharge chamber 57. For example, three or more angular bosses 54*e* may be provided on the screw 54, and the discharge sheets may be mounted to these angular bosses 54*e*, respectively. Although one discharge sheet is mounted to one angular boss 54*e* in the above embodiment, it is also possible to mount the multiple discharge sheets to one angular boss 54*e*. In this case, at least one of the multiple discharge sheets mounted to one of the angular bosses 54*e* of the pair corresponds to the discharging sheet 271 in Embodiment 2. At least one of the multiple discharge sheets mounted to the other angular boss 54*e* corresponds to the discharging sheet 272 in Embodiment 2.

The disclosure of this embodiment also includes the following structure and method examples.

(Structure 1)

A toner cartridge for supplying toner to outside, comprising:

- a toner accommodating chamber for accommodating toner;
- a toner discharge chamber having a smaller volume than the toner accommodating chamber;
- a communication passage for fluid communication between the toner accommodating chamber and the toner discharge chamber;
- a discharge opening which is provided in the toner discharge chamber and through which the toner is capable of discharging from the toner discharge chamber to the outside of the toner cartridge;
- a coupling for receiving a driving force from outside;
- a feeding member for feeding the toner from the toner accommodating chamber to the toner discharge chamber through the communication passage in an axial direction of the coupling; and
- a first sheet and a second sheet which are provided in the toner discharge chamber and rotatable about a rotation axis to discharge the toner to the outside of the toner cartridge through the discharge opening,
- wherein as viewed along the rotation axis with the toner cartridge in an orientation with the discharge opening facing downward, the rotation axis is closer to a central portion of the toner cartridge than the discharge opening in a horizontal direction,
- wherein the first sheet is configured to be flexed by contacting an inner wall of the toner discharge chamber and the flexure is then released, when the first sheet makes one full rotation about the rotation axis, and
- wherein the second sheet is configured to be displaceable relative to and contactable with the first sheet.

(Structure 2)

The toner cartridge according to Structure 1, in which in a cross section perpendicular to a direction of the rotation axis, a minimum cross-sectional area of a space in the communication passage is smaller than half a maximum cross-sectional area of a space in the toner discharge chamber.

(Structure 3)

The toner cartridge according to Structure 1 or 2, wherein the first sheet and the second sheet are mounted to the feeding member.

(Structure 4)

The toner cartridge according to any one of structures 1 to 3, wherein the first sheet is configured to be flexed by contacting an inner wall of the toner discharge chamber and then to be released by separating from the inner wall.

(Structure 5)

The toner cartridge according to any one of structures 1 to 4, wherein the inner wall has a contact surface capable of being contacted by the first sheet and the second sheet, and a separation surface which is continuous with the contact surface as viewed in the axial direction and extends in a direction away from the rotation axis, and the first sheet and the second sheet is released in their flexure by separating from a boundary portion between the contact surface and the separation surface.

(Structure 6)

The toner cartridge according to structure 5, wherein the boundary portion is at a position where at least a part of the boundary portion overlaps with the feeding member in a vertical direction as viewed along the axial direction in an orientation of the toner cartridge with the discharge opening facing downward.

(Structure 7)

The toner cartridge according to structure 5 or 6, wherein the boundary portion is at substantially the same height as the rotation axis in the vertical direction as viewed along the axial direction in an orientation of the toner cartridge with the discharge opening facing downward.

(Structure 8)

The toner cartridge according to any one of structures 5 to 7, wherein the boundary portion is on the same side of the rotation axis as the discharge opening in the horizontal direction as viewed along the axial direction in an orientation of the toner cartridge with the discharge opening facing downward.

(Structure 9)

The toner cartridge according to structure 8, wherein the boundary portion is at a position overlapping the discharge opening in the horizontal direction as viewed along the axial direction in an orientation of the toner cartridge with the discharge opening facing downward.

(Structure 10)

The toner cartridge according to any one of structures 5 to 9, wherein the first sheet and the second sheet are capable of contacting each other when they are in contact with the contact surface.

(structure 11)

The toner cartridge according to any one of structures 1 to 10, further comprising a storing unit for storing information about the toner cartridge, wherein, in an orientation of the toner cartridge with the discharge opening facing downward, the coupling is disposed between the storing unit and an abutment portion of the discharge opening which abuts against the first sheet both in the axial direction and in the horizontal direction perpendicular to the axial direction.

(Structure 12)

The toner cartridge according to any one of structures 1 to 11, wherein the first sheet and the second sheet have different lengths in the longitudinal direction of the first sheet and the second sheet.

(Structure 13)

The toner cartridge according to structure 12, wherein the first sheet is shorter than the second sheet in the longitudinal direction.

(Structure 14)

The toner cartridge according to structure 13, wherein the first sheet is placed downstream of the second sheet in a rotation direction of the first sheet and the second sheet.

(Structure 15)

The toner cartridge according to structure 13 or 14, comprising a mounting portion to which the first sheet and the second sheet are mounted and which is rotatable about the rotation axis, and wherein the first sheet and the second sheet are overlapped at least at the mounting portion.

(Structure 16)

The toner cartridge according to structure 15, wherein the mounting portion is provided on the feeding member.

(Structure 17)

The toner cartridge according to any one of structures 13 to 16, wherein free ends of the first sheet and the second sheet in the longitudinal direction are tapered and can enter the discharge opening.

(Structure 18)

The toner cartridge according to structure 12, wherein the second sheet is shorter than the first sheet in the longitudinal direction.

(Structure 19)

The cartridge according to structure 18, wherein the first sheet is placed downstream of the second sheet in the rotation direction of the first sheet and the second sheet, and the first sheet and the second sheet are placed to provide a gap between the surfaces thereof.

(Structure 20)

The toner cartridge according to structure 18 or 19, wherein the second sheet is configured to come into contact with the first sheet from the upstream side in the rotation direction of the first sheet and the second sheet while the first sheet moves toward the discharge opening after releasing of the flexure.

(Structure 21)

The toner cartridge according to any one of structures 18 to 20, comprising a first mounting portion to which the first sheet is mounted and which is rotatable about the rotation axis, and a second mounting portion to which the second sheet is mounted and which is rotatable about the rotation axis, the first mounting portion and the second mounting portion being spaced apart from each other across the rotation axis as viewed in the axial direction.

(Structure 22)

The toner cartridge according to structure 21, wherein the first mounting portion and the second mounting portion are provided on the feeding member.

(Structure 23)

The toner cartridge according to any one of structures 18 to 22, wherein a free end portion of the first sheet in the longitudinal direction has a tapered shape and is capable of entering the discharge opening and a free end portion of the second sheet in the longitudinal direction is configured not to enter the discharge opening.

(Structure 24)

The toner cartridge according to any one of structures 1 to 23, comprising a shutter member movable between a blocking position for blocking the discharge opening and an opening position for opening the discharge opening.

(Structure 25)

The toner cartridge according to structure 24, further comprising an urging portion for urging the shutter member to the blocking position.

(Structure 26)

A toner cartridge for supplying toner to outside, comprising:

- a toner accommodating chamber for accommodating toner;
- a toner discharge chamber having a smaller volume than the toner accommodating chamber;
- a communication passage for fluid communication between the toner accommodating chamber and the toner discharge chamber;
- a discharge opening which is provided in the toner discharge chamber and through which the toner is capable of discharging from the toner discharge chamber to the outside of the toner cartridge;
- a coupling for receiving a driving force from outside;
- a feeding member for feeding the toner from the toner accommodating chamber to the toner discharge chamber through the communication passage in an axial direction of the coupling; and
- a plurality of sheets which are provided in the toner discharge chamber in a state of overlapping each other and rotatable about a rotation axis to discharge the toner to the outside of the toner cartridge through the discharge opening, wherein as viewed along the rotation axis with the toner cartridge in an orientation with the discharge opening facing downward, the rotation axis is closer to a central portion of the toner cartridge than the discharge opening in a horizontal direction, the plurality of the sheets are configured to be flexed by contacting an inner wall of the toner discharge chamber and the flexure is then released, when the sheets make one full rotation about the rotation axis, and wherein the plurality of sheets include (i) a first sheet and (ii) a second sheet which is placed upstream of the first sheet in a rotation direction thereof, and in a state that the flexures of the first sheet and the second sheet are released, a distance from the rotation axis to a free end of the second sheet is longer than a distance from the rotation axis to a free end of the first sheet.

(Structure 27)

A toner cartridge for supplying toner to outside, comprising: a toner accommodating chamber for accommodating toner;

a toner discharge chamber having a smaller volume than the toner accommodating chamber;

a communication passage for fluid communication between the toner accommodating chamber and the toner discharge chamber;

a discharge opening which is provided in the toner discharge chamber and through which the toner is capable of discharging from the toner discharge chamber to the outside of the toner cartridge;

a coupling for receiving a driving force from outside;

a feeding member for feeding the toner from the toner accommodating chamber to the toner discharge chamber through the communication passage in an axial direction of the coupling; and a plurality of sheets which are provided in the toner discharge chamber and rotatable about a rotation axis to discharge the toner to the outside of the toner cartridge through the discharge opening, wherein as viewed along the rotation axis with the toner cartridge in an orientation with the discharge opening facing downward, the rotation axis is closer to a central portion of the toner cartridge than the discharge opening in a horizontal direction, wherein the plurality of sheets include (i) a first sheet and (ii) a second sheet which is placed upstream of the first sheet in a rotation direction thereof, and in a state that the flexures of the first sheet and the second sheet are released, a distance from the rotation axis to a free end of the second sheet is shorter than a distance from the rotation axis to a free end of the first sheet, wherein the plurality of the sheets are configured to be flexed by contacting an inner wall of the toner discharge chamber and the flexure is then released, when the sheets make one full rotation about the rotation axis, wherein the first sheet is configured to be flexed by contacting an inner wall of the toner discharge chamber when the first sheet makes one full rotation about the rotation axis, and then release the flexure, and wherein the second sheet is configured to come into contact with the first sheet from the upstream side in the rotation direction of the first sheet and the second sheet while the first sheet moves toward the discharge opening after releasing of the flexure.

(Structure 28)

An image forming apparatus comprising a toner cartridge according to any one of structures 1 to 27; and an apparatus main assembly configured to receive the toner cartridge and to receive the toner discharged from the toner cartridge.

(Structure 29)

The image forming apparatus according to structure 28, wherein the apparatus main assembly includes another cartridge provided with a developing roller, and a supply unit configured to supply the toner discharged from the toner cartridge to said another cartridge.

(Structure 30)

The image forming apparatus according to structure 29, wherein the supply unit includes a bent pipe portion, into which the toner discharged from the discharge opening flows.

(Structure 31)

The image forming apparatus according to any one of structures 28 to 30, wherein the discharge opening is open downward when the toner cartridge is mounted to the apparatus main assembly.

INDUSTRIAL APPLICABILITY

According to the present invention, a cartridge for supplying toner and an image forming apparatus are provided.

The present invention is not limited to the above-described embodiment, and various changes and modifications are possible without departing from the spirit and scope of the present invention. Therefore, the following claims are attached to clarify the scope of the present invention.

This application claims priority based on Japanese Patent Application No. 2022-165826 filed on Oct. 14, 2022, and Japanese Patent Application No. 2023-155615 filed on Sep. 21, 2023, the entire contents of which are incorporated herein by reference.

The invention claimed is:

1. A toner cartridge for supplying toner to outside, comprising:

a toner accommodating chamber for accommodating toner;

a toner discharge chamber having a smaller volume than the toner accommodating chamber;

a communication passage for fluid communication between the toner accommodating chamber and the toner discharge chamber;

a discharge opening which is provided in the toner discharge chamber and through which the toner is capable of discharging from the toner discharge chamber to the outside of the toner cartridge;

a coupling for receiving a driving force from outside;

a feeding member for feeding the toner from the toner accommodating chamber to the toner discharge chamber through the communication passage in an axial direction of the coupling; and a first sheet and a second sheet which are provided in the toner discharge chamber and rotatable about a rotation axis to discharge the toner to the outside of the toner cartridge through the discharge opening, wherein as viewed along the rotation axis with the toner cartridge in an orientation with the discharge opening facing downward, the rotation axis is closer to a central portion of the toner cartridge than the discharge opening in a horizontal direction, wherein the first sheet is configured to be flexed by contacting an inner wall of the toner discharge chamber and then be released from flexure, when the first sheet makes one full rotation about the rotation axis, and wherein the second sheet is configured to be displaceable relative to and contactable with the first sheet.

2. The toner cartridge according to claim 1, wherein in a cross section perpendicular to a direction of the rotation axis, a minimum cross-sectional area of a space in the communication passage is smaller than half a maximum cross-sectional area of a space in the toner discharge chamber.

3. The toner cartridge according to claim 1, wherein the first sheet and the second sheet are mounted to the feeding member.

4. The toner cartridge according to claim 1, wherein the first sheet is configured to be flexed by contacting an inner wall of the toner discharge chamber and then be released from flexure by separating from the inner wall.

5. The toner cartridge according to claim 1, wherein the inner wall has a contact surface capable of being contacted by the first sheet and the second sheet, and a separation surface which is continuous with the contact surface as viewed in the axial direction and extends in a direction away from the rotation axis, and wherein the first sheet and the second sheet are released in their flexure by separating from a boundary portion between the contact surface and the separation surface.

6. The toner cartridge according to claim 5, wherein the boundary portion is at a position where at least a part of the boundary portion overlaps with the feeding member in a vertical direction as viewed along the axial direction in an orientation of the toner cartridge with the discharge opening facing downward.

7. The toner cartridge according to claim 5, wherein the boundary portion is at substantially the same height as the rotation axis in a vertical direction as viewed along the axial direction in an orientation of the toner cartridge with the discharge opening facing downward.

8. The toner cartridge according to claim 5, wherein the boundary portion is on the same side of the rotation axis as the discharge opening in the horizontal direction as viewed along the axial direction in an orientation of the toner cartridge with the discharge opening facing downward.

9. The toner cartridge according to claim 8, wherein the boundary portion is at a position overlapping the discharge opening in the horizontal direction as viewed along the axial direction in an orientation of the toner cartridge with the discharge opening facing downward.

10. The toner cartridge according to claim 5, wherein the first sheet and the second sheet are capable of contacting each other when they are in contact with the contact surface.

11. The toner cartridge according to claim 1, further comprising a storing unit for storing information about the toner cartridge, wherein in an orientation of the toner cartridge with the discharge opening facing downward, the coupling is disposed between the storing unit and an abutment portion of the discharge opening which abuts against the first sheet both in the axial direction and in the horizontal direction perpendicular to the axial direction.

12. The toner cartridge according to claim 1, wherein the first sheet and the second sheet have different lengths as measured in a longitudinal direction of the first sheet and the second sheet.

13. The toner cartridge according to claim 12, wherein the first sheet is shorter than the second sheet in the longitudinal direction.

14. The toner cartridge according to claim 13, wherein the first sheet is placed downstream of the second sheet in a rotation direction of the first sheet and the second sheet.

15. The toner cartridge according to claim 13, comprising a mounting portion to which the first sheet and the second sheet are mounted and which is rotatable about the rotation axis, and wherein the first sheet and the second sheet are overlapped at least at the mounting portion.

16. The toner cartridge according to claim 15, wherein the mounting portion is provided on the feeding member.

17. The toner cartridge according to claim 13, wherein free end portions of the first sheet and the second sheet in the longitudinal direction are tapered and can enter the discharge opening.

18. The toner cartridge according to claim 12, wherein the second sheet is shorter than the first sheet in the longitudinal direction.

19. The toner cartridge according to claim 18, wherein the first sheet is placed downstream of the second sheet in the rotation direction of the first sheet and the second sheet, and the first sheet and the second sheet are placed to provide a gap between surfaces thereof.

20. The toner cartridge according to claim 18, wherein the second sheet is configured to come into contact with the first sheet from an upstream side in the rotation direction of the first sheet and the second sheet while the first sheet moves toward the discharge opening after releasing of the flexure.

21. The toner cartridge according to claim 18, comprising a first mounting portion to which the first sheet is mounted and which is rotatable about the rotation axis, and a second mounting portion to which the second sheet is mounted and which is rotatable about the rotation axis, the first mounting portion and the second mounting portion being spaced apart from each other across the rotation axis as viewed in the axial direction.

22. The toner cartridge according to claim 21, wherein the first mounting portion and the second mounting portion are provided on the feeding member.

23. The toner cartridge according to claim 18, wherein a free end portion of the first sheet in the longitudinal direction is tapered and is capable of entering the discharge opening, and a free end portion of the second sheet in the longitudinal direction is configured not to enter the discharge opening.

24. The toner cartridge according to claim 1, comprising a shutter member movable between a blocking position for blocking the discharge opening and an opening position for opening the discharge opening.

25. The toner cartridge according to claim 24, further comprising an urging portion for urging the shutter member to the blocking position.

26. A toner cartridge for supplying toner to outside, comprising:

- a toner accommodating chamber for accommodating toner;
- a toner discharge chamber having a smaller volume than the toner accommodating chamber;
- a communication passage for fluid communication between the toner accommodating chamber and the toner discharge chamber;
- a discharge opening which is provided in the toner discharge chamber and through which the toner is capable of discharging from the toner discharge chamber to the outside of the toner cartridge;
- a coupling for receiving a driving force from outside;
- a feeding member for feeding the toner from the toner accommodating chamber to the toner discharge chamber through the communication passage in an axial direction of the coupling; and
- a plurality of sheets which are provided in the toner discharge chamber in a state of overlapping each other and rotatable about a rotation axis to discharge the toner to the outside of the toner cartridge through the discharge opening, wherein as viewed along the rotation axis with the toner cartridge in an orientation with the discharge opening facing downward, the rotation axis is closer to a central portion of the toner cartridge than the discharge opening in a horizontal direction, the plurality of the sheets are configured to be flexed by contacting an inner wall of the toner discharge chamber and then be released from flexure, when the sheets make one full rotation about the rotation axis, and wherein the plurality of sheets include (i) a first sheet and (ii) a second sheet which is placed upstream of the first sheet in a rotation direction thereof, and in a state that flexures of the first sheet and the second sheet are released, a distance from the rotation axis to a free end of the second sheet is longer than a distance from the rotation axis to a free end of the first sheet.

27. A toner cartridge for supplying toner to outside, comprising: a toner accommodating chamber for accommodating toner;

a toner discharge chamber having a smaller volume than the toner accommodating chamber;

a communication passage for fluid communication between the toner accommodating chamber and the toner discharge chamber;

a discharge opening which is provided in the toner discharge chamber and through which the toner is capable of discharging from the toner discharge chamber to the outside of the toner cartridge;

a coupling for receiving a driving force from outside;

a feeding member for feeding the toner from the toner accommodating chamber to the toner discharge chamber through the communication passage in an axial direction of the coupling; and a plurality of sheets which are provided in the toner discharge chamber and rotatable about a rotation axis to discharge the toner to the outside of the toner cartridge through the discharge opening, wherein as viewed along the rotation axis with the toner cartridge in an orientation with the discharge opening facing downward, the rotation axis is closer to a central portion of the toner cartridge than the discharge opening in a horizontal direction, wherein the plurality of sheets include (i) a first sheet and (ii) a second sheet which is placed upstream of the first sheet in a rotation direction thereof, and in a state that flexures of the first sheet and the second sheet are released, a distance from the rotation axis to a free end of the second sheet is shorter than a distance from the rotation axis to a free end of the first sheet, wherein the plurality of the sheets are configured to be flexed by contacting an inner wall of the toner discharge chamber and then be released from flexure, when the sheets make one full rotation about the rotation axis, wherein the first sheet is configured to be flexed by contacting an inner wall of the toner discharge chamber and then be released from flexure, when the first sheet makes one full rotation about the rotation axis, and wherein the second sheet is configured to come into contact with the first sheet from an upstream side in the rotation direction of the first sheet and the second sheet while the first sheet moves toward the discharge opening after releasing from the flexure.

28. An image forming apparatus comprising: a toner cartridge according to any one of claims 1 to 27; and an apparatus main assembly configured to receive the toner cartridge and to be supplied with the toner discharged from the toner cartridge.

29. The image forming apparatus according to claim 28, wherein the apparatus main assembly includes another cartridge provided with a developing roller, and a supply unit configured to supply the toner discharged from the toner cartridge to the another cartridge.

30. The image forming apparatus according to claim 29, wherein the supply unit includes a bent pipe portion, into which the toner discharged through the discharge opening flows.

31. The image forming apparatus according to claim 28, wherein the discharge opening is open downward when the toner cartridge is mounted to the apparatus main assembly.

* * * * *